(12) United States Patent
Rudd

(10) Patent No.: US 7,580,988 B2
(45) Date of Patent: Aug. 25, 2009

(54) SYSTEM AND METHODS FOR MANAGING THE DISTRIBUTION OF ELECTRONIC CONTENT

(75) Inventor: James M. Rudd, San Francisco, CA (US)

(73) Assignee: Intertrust Technologies Corporation, Sunnyvale, CA (US)

( * ) Notice: Subject to any disclaimer, the term of this patent is extended or adjusted under 35 U.S.C. 154(b) by 487 days.

(21) Appl. No.: 10/118,215

(22) Filed: Apr. 5, 2002

(65) Prior Publication Data

US 2002/0152173 A1 Oct. 17, 2002

Related U.S. Application Data

(60) Provisional application No. 60/282,257, filed on Apr. 5, 2001.

(51) Int. Cl.
*G06F 15/16* (2006.01)
*H04L 9/00* (2006.01)
*G06F 7/04* (2006.01)

(52) U.S. Cl. .................. 709/217; 709/227; 713/170; 726/30

(58) Field of Classification Search .......... 713/200, 713/170; 726/31, 30; 709/217, 227
See application file for complete search history.

(56) References Cited

U.S. PATENT DOCUMENTS

| 4,827,508 A | 5/1989 | Shear |
| 4,977,594 A | 12/1990 | Shear |
| 5,003,405 A * | 3/1991 | Wulforst ............ 358/400 |
| 5,050,213 A | 9/1991 | Shear |
| 5,410,598 A | 4/1995 | Shear |
| 5,440,634 A | 8/1995 | Jones et al. |
| 5,530,235 A | 6/1996 | Stefik et al. |
| 5,534,975 A | 7/1996 | Stefik et al. |
| 5,615,268 A | 3/1997 | Bisbee et al. |
| 5,623,547 A | 4/1997 | Jones et al. |
| 5,629,980 A | 5/1997 | Stefik et al. |
| 5,634,012 A | 5/1997 | Stefik et al. |
| 5,638,443 A | 6/1997 | Stefik et al. |

(Continued)

FOREIGN PATENT DOCUMENTS

EP 0 715 247 A1 6/1996

(Continued)

OTHER PUBLICATIONS

Maheshwari et al., "A Trusted Database for an Untrusted Storage System," U.S. Appl. No. 09/617,148, filed Jul. 17, 2000, 60 pages.

(Continued)

*Primary Examiner*—William C Vaughn, Jr.
*Assistant Examiner*—Ranodhi N Serrao
(74) *Attorney, Agent, or Firm*—Finnegan, Henderson, Farabow, Garrett & Dunner LLP

(57) ABSTRACT

The present invention provides systems and methods for transfering electronic information from one location to another such that only one original work exists at a given time. The methods and systems of the present invention allow distribution of originals without requiring a registration authority or other entity to vouch for what constitutes an "original" piece of information, thus reducing (or eliminating entirely) the need to centrally record changes in ownership each time originals change hands.

23 Claims, 33 Drawing Sheets

U.S. PATENT DOCUMENTS

| | | | |
|---|---|---|---|
| 5,715,403 A | 2/1998 | Stefik | |
| 5,724,425 A * | 3/1998 | Chang et al. | 705/52 |
| 5,748,738 A | 5/1998 | Bisbee et al. | |
| 5,765,152 A * | 6/1998 | Erickson | 707/9 |
| 5,778,067 A | 7/1998 | Jones et al. | |
| 5,892,900 A | 4/1999 | Ginter et al. | |
| 5,910,987 A | 6/1999 | Ginter et al. | |
| 5,915,019 A | 6/1999 | Ginter et al. | |
| 5,917,912 A | 6/1999 | Ginter et al. | |
| 5,920,861 A | 7/1999 | Hall et al. | |
| 5,933,498 A * | 8/1999 | Schneck et al. | 705/54 |
| 5,940,504 A | 8/1999 | Griswold | |
| 5,943,422 A | 8/1999 | Van Wie et al. | |
| 5,949,876 A | 9/1999 | Ginter et al. | |
| 5,982,891 A | 11/1999 | Ginter et al. | |
| 5,999,949 A | 12/1999 | Crandall | |
| 6,069,952 A * | 5/2000 | Saito et al. | 705/57 |
| 6,112,181 A | 8/2000 | Shear et al. | |
| 6,138,119 A | 10/2000 | Hall et al. | |
| 6,157,721 A | 12/2000 | Shear et al. | |
| 6,185,683 B1 | 2/2001 | Ginter et al. | |
| 6,236,971 B1 * | 5/2001 | Stefik et al. | 705/1 |
| 6,237,786 B1 | 5/2001 | Ginter et al. | |
| 6,240,185 B1 | 5/2001 | Van Wie et al. | |
| 6,253,193 B1 | 6/2001 | Ginter et al. | |
| 6,292,569 B1 | 9/2001 | Shear et al. | |
| 6,363,488 B1 | 3/2002 | Ginter et al. | |
| 6,366,894 B1 | 4/2002 | Everett et al. | |
| 6,389,402 B1 | 5/2002 | Ginter et al. | |
| 6,427,140 B1 | 7/2002 | Ginter et al. | |
| 6,449,367 B2 | 9/2002 | Van Wie et al. | |
| 6,618,484 B1 | 9/2003 | Van Wie et al. | |
| 6,640,304 B2 | 10/2003 | Ginter et al. | |
| 6,658,403 B1 * | 12/2003 | Kuroda et al. | 707/2 |
| 6,658,568 B1 | 12/2003 | Ginter et al. | |
| 6,668,325 B1 | 12/2003 | Collberg et al. | |
| 6,697,806 B1 * | 2/2004 | Cook | 707/10 |
| 6,785,815 B1 | 8/2004 | Serret-Avila et al. | |
| 6,832,316 B1 | 12/2004 | Sibert | |
| 7,065,505 B2 * | 6/2006 | Stefik et al. | 705/54 |
| 2001/0002485 A1 * | 5/2001 | Bisbee et al. | 713/167 |
| 2001/0042043 A1 | 11/2001 | Shear et al. | |
| 2001/0051996 A1 * | 12/2001 | Cooper et al. | 709/217 |
| 2002/0023214 A1 | 2/2002 | Shear et al. | |
| 2002/0048369 A1 | 4/2002 | Ginter et al. | |
| 2002/0087859 A1 | 7/2002 | Weeks et al. | |
| 2002/0112171 A1 | 8/2002 | Ginter et al. | |
| 2003/0023856 A1 | 1/2003 | Horne et al. | |
| 2003/0041239 A1 | 2/2003 | Shear et al. | |
| 2003/0046244 A1 | 3/2003 | Shear et al. | |
| 2003/0069748 A1 | 4/2003 | Shear et al. | |
| 2003/0069749 A1 | 4/2003 | Shear et al. | |
| 2003/0084003 A1 | 5/2003 | Pinkas et al. | |
| 2003/0105721 A1 | 6/2003 | Ginter et al. | |
| 2003/0163431 A1 | 8/2003 | Ginter et al. | |
| 2004/0054630 A1 | 3/2004 | Ginter et al. | |
| 2004/0059951 A1 | 3/2004 | Pinkas et al. | |
| 2004/0073813 A1 | 4/2004 | Pinkas et al. | |
| 2004/0103305 A1 | 5/2004 | Ginter et al. | |
| 2004/0107356 A1 | 6/2004 | Shamoon et al. | |
| 2004/0123129 A1 | 6/2004 | Ginter et al. | |
| 2004/0133793 A1 | 7/2004 | Ginter et al. | |
| 2005/0027871 A1 | 2/2005 | Bradley et al. | |
| 2005/0050332 A1 | 3/2005 | Serret-Avila et al. | |
| 2005/0060560 A1 | 3/2005 | Sibert | |
| 2005/0060584 A1 | 3/2005 | Ginter et al. | |
| 2005/0108555 A1 | 5/2005 | Sibert | |

FOREIGN PATENT DOCUMENTS

| | | |
|---|---|---|
| WO | WO 96/27155 | 9/1996 |
| WO | WO 97/12460 | 4/1997 |
| WO | WO 97/43761 | 11/1997 |
| WO | WO 98/09209 | 3/1998 |
| WO | WO 98/10381 | 3/1998 |
| WO | WO 98/37481 | 8/1998 |
| WO | WO 99/01815 | 1/1999 |
| WO | WO 99/24928 | 5/1999 |
| WO | WO 99/48296 | 9/1999 |
| WO | WO 99/57847 | 11/1999 |
| WO | WO 00/75925 | 12/2000 |
| WO | WO 01/06374 | 1/2001 |
| WO | WO 01/09702 | 2/2001 |
| WO | WO 01/10076 | 2/2001 |

OTHER PUBLICATIONS

Sibert, O. et al., "Digibox: A Self-Protecting Container for Information Commerce," Proceedings of the First USENIX Workshop on Electronic Commerce, Jul. 1995, 13 pages, New York, NY.

Sibert, O., "Secure Processing Unit Systems and Methods," U.S. Appl. No. 09/643,630, filed Aug. 21, 2000, 68 pages.

Sibert, O. et al., "Securing the Content, Not the Wire, for Information Commerce," 1996, 12 pages, InterTrust Technologies Corporation.

Sibert, O., "Systems and Methods for Using Cryptography to Protect Secure and Insecure Computing Environments," U.S. Appl. No. 09/628,692, filed Jul. 28, 2000, 77 pages.

Stefik, M., "Introduction to Knowledge Systems, Chapter 7: Classification," 1995, pp. 543-607, Morgan Kaufmann Publishers, Inc., San Francisco, CA.

Stefik, M., "Letting Loose the Light: Igniting Commerce in Electronic Publication," 1994-1995, 37 pages, Xerox PARC, Palo Alto, CA.

Stefik, M., "Letting Loose the Light: Igniting Commerce in Electronic Publication," Internet Dreams: Archetypes, Myths, and Metaphors, 1996, pp. 219-253, Massachusetts Institute of Technology.

Stefik, M., "Trusted Systems," Scientific American, Mar. 1997, pp. 78-81.

Jones, D.G., Document from the Internet: Summary of recent meeting with top Mondex officials (fwd), Aug. 24, 1998, 4 pages, available at http://cypherpunks.venona.com/date/1998/08/msg00411.html.

Stalder, F. et al., Exploring Policy Issues of Electronic Cash: The Mondex Case, Canadian Journal of Communication [Online], vol. 24, Issue 2, Jan. 1, 1999, 21 pages, available at http://www.cjc-online.ca/viewaricle.php?id=522.

UK ITSEC Scheme Certification Report No. P129: MONDEX Purse, Release 2.0 on MULTOS Version 3 and Hitachi H8/3112 integrated circuit card, Issue 1.0, UK IT Security Evaluation and Certification Scheme, Cheltenham, United Kingdom, Sep. 1999, 30 pages.

* cited by examiner

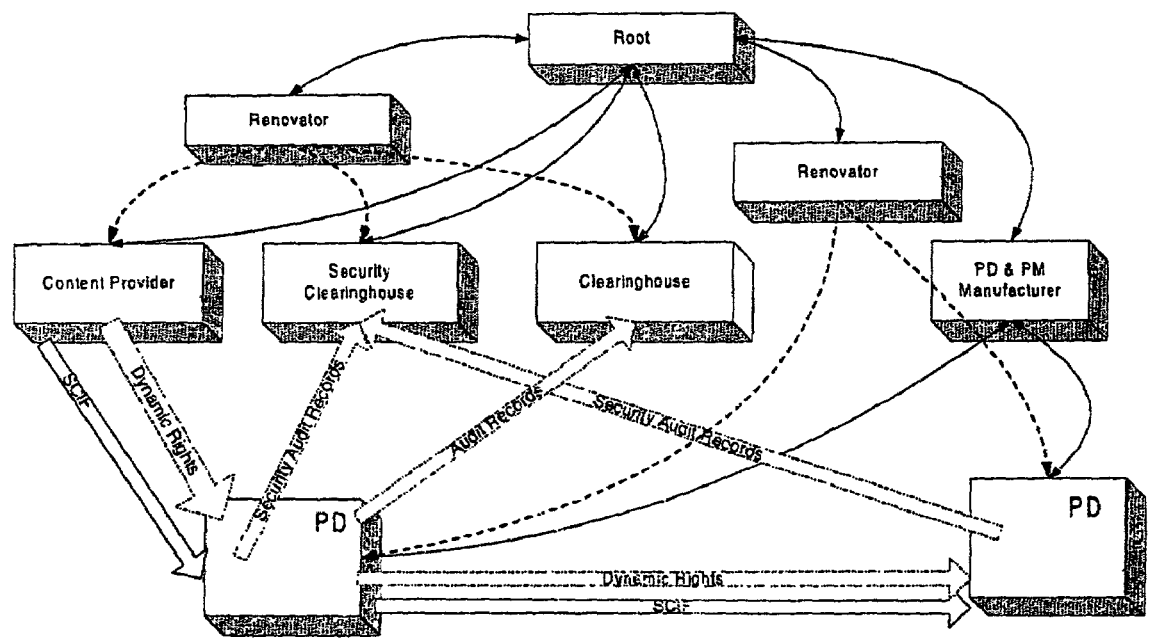
Fig. A-1

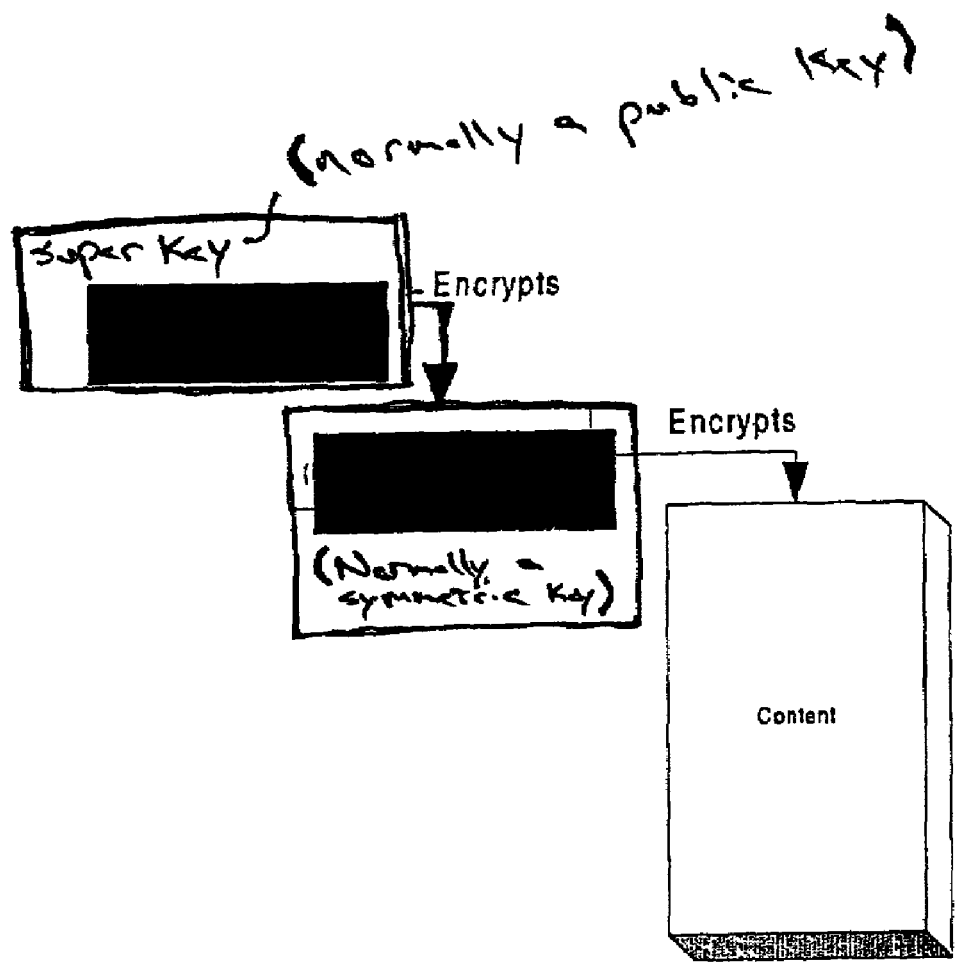
Fig. A-2

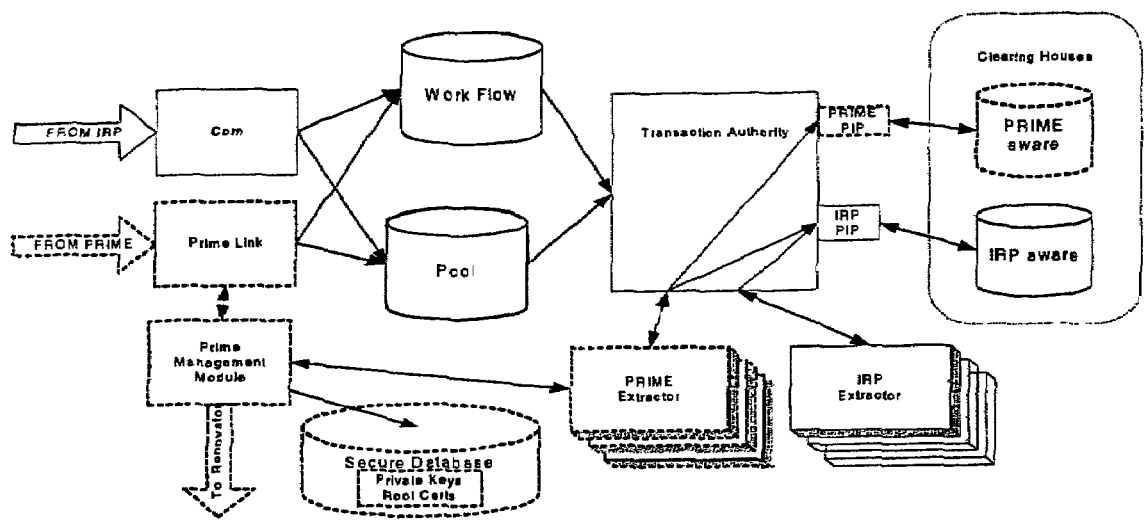
Fig. A-3

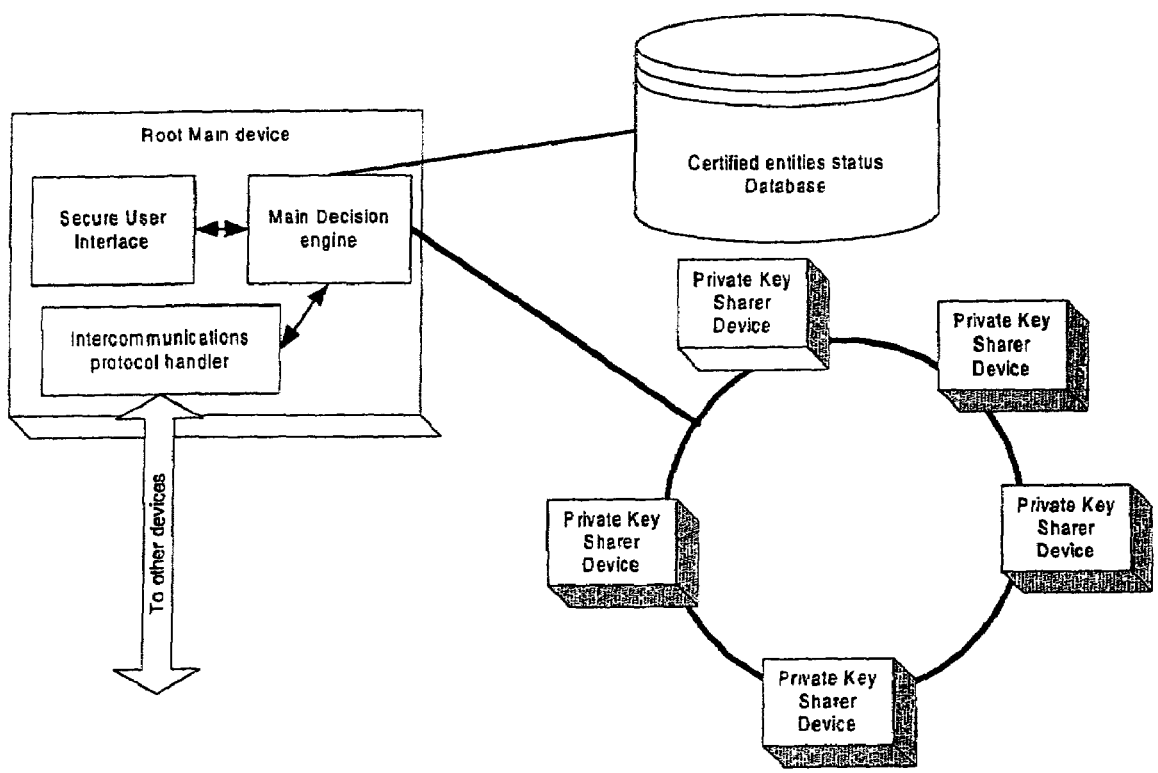
Fig. A-4

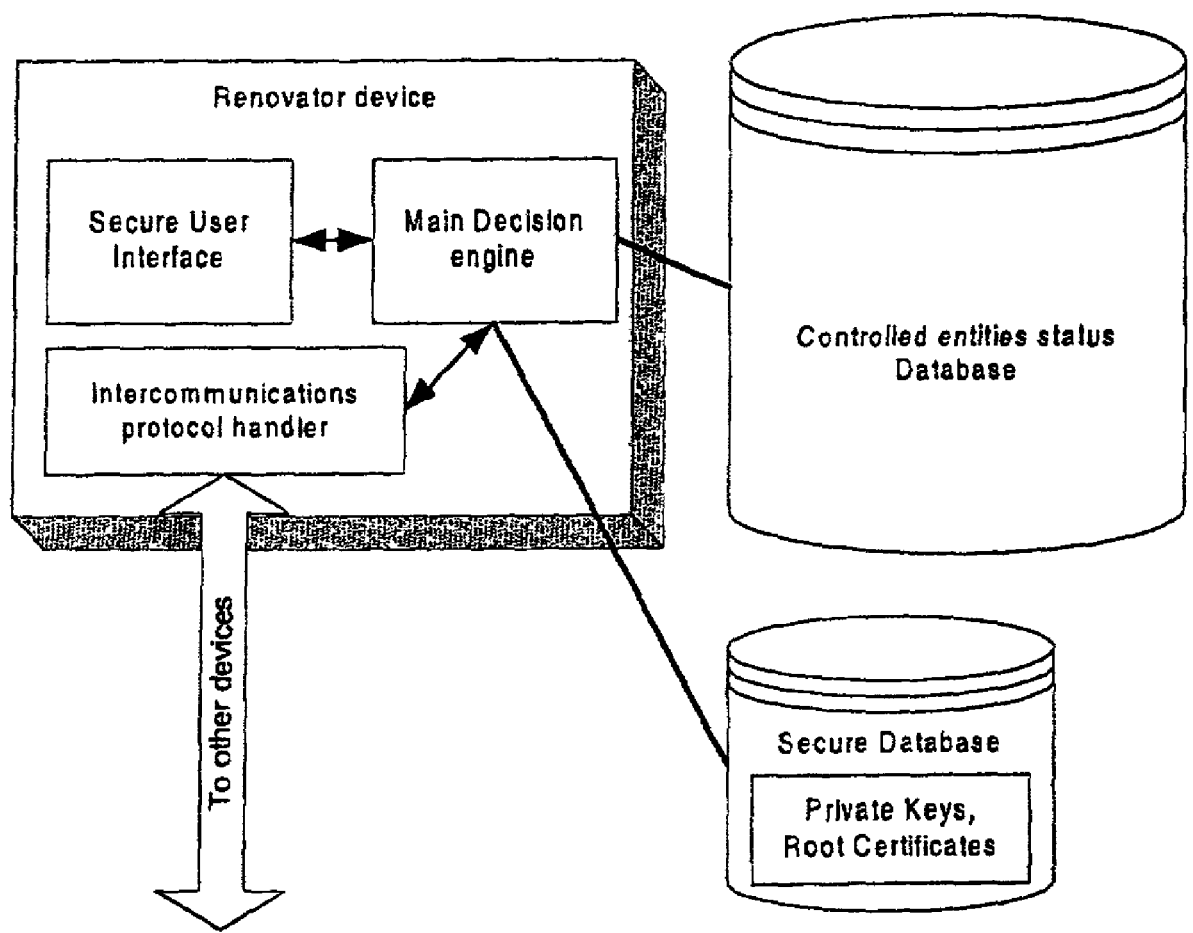
Fig. A-5

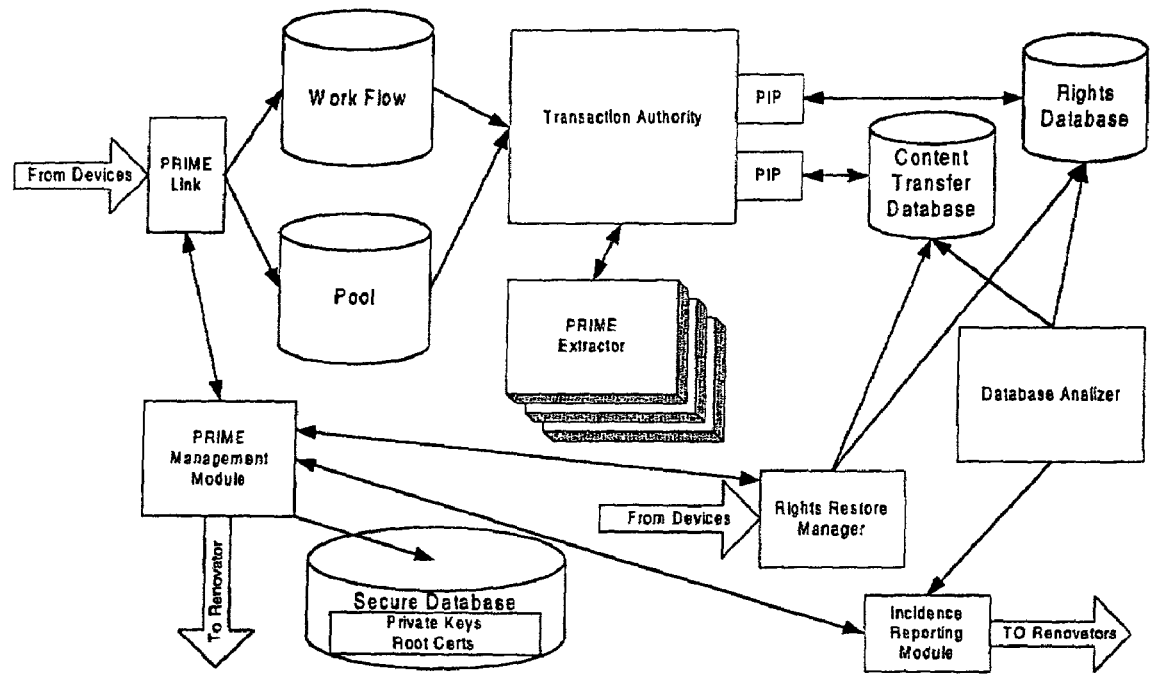
Fig. A-6

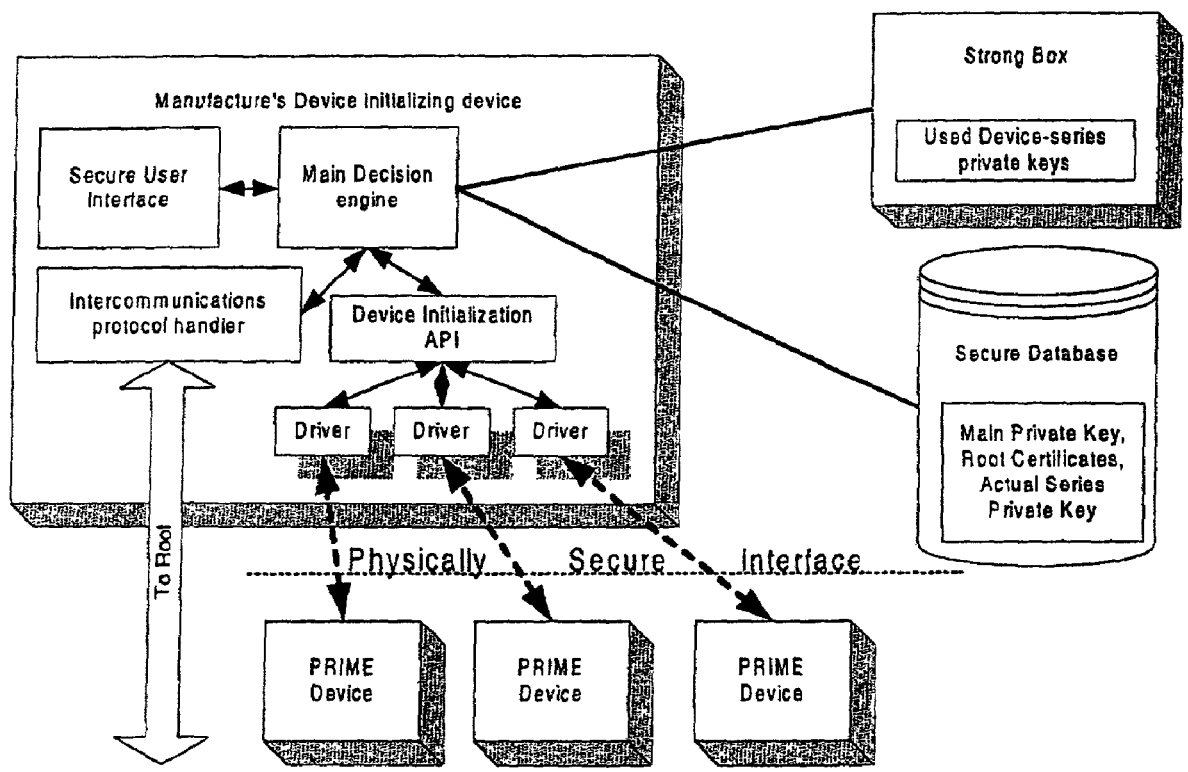
Fig. A-7

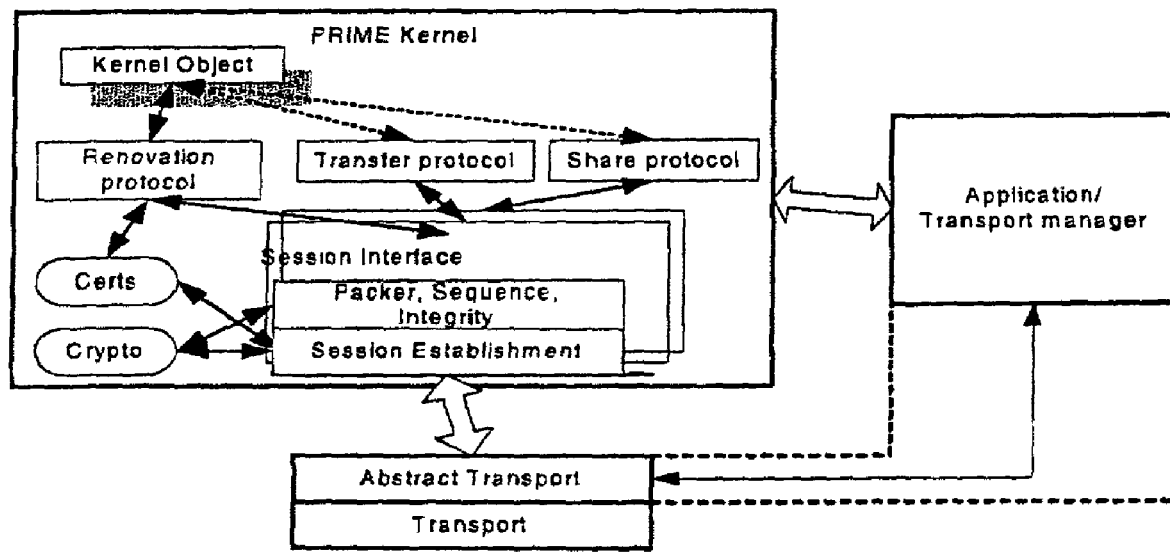
Fig. A-8

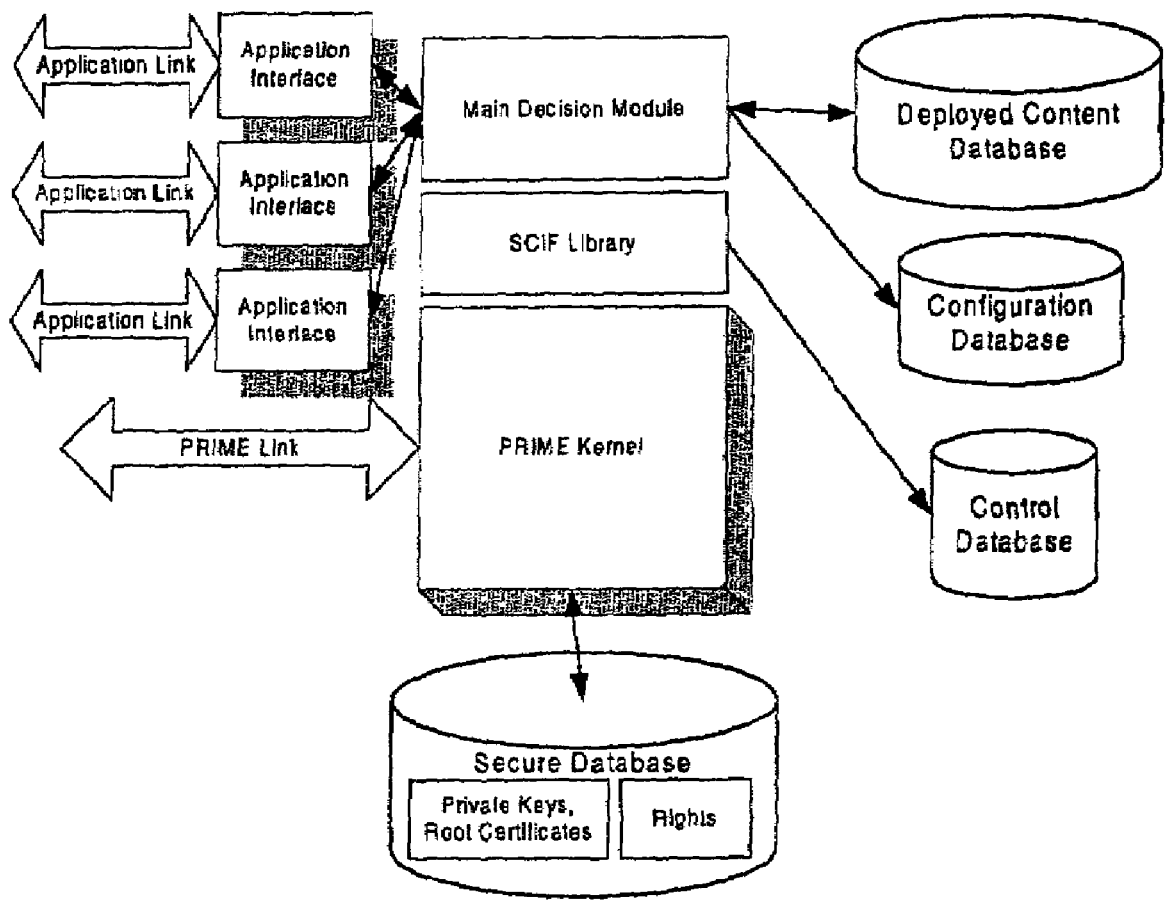
Fig. A-9

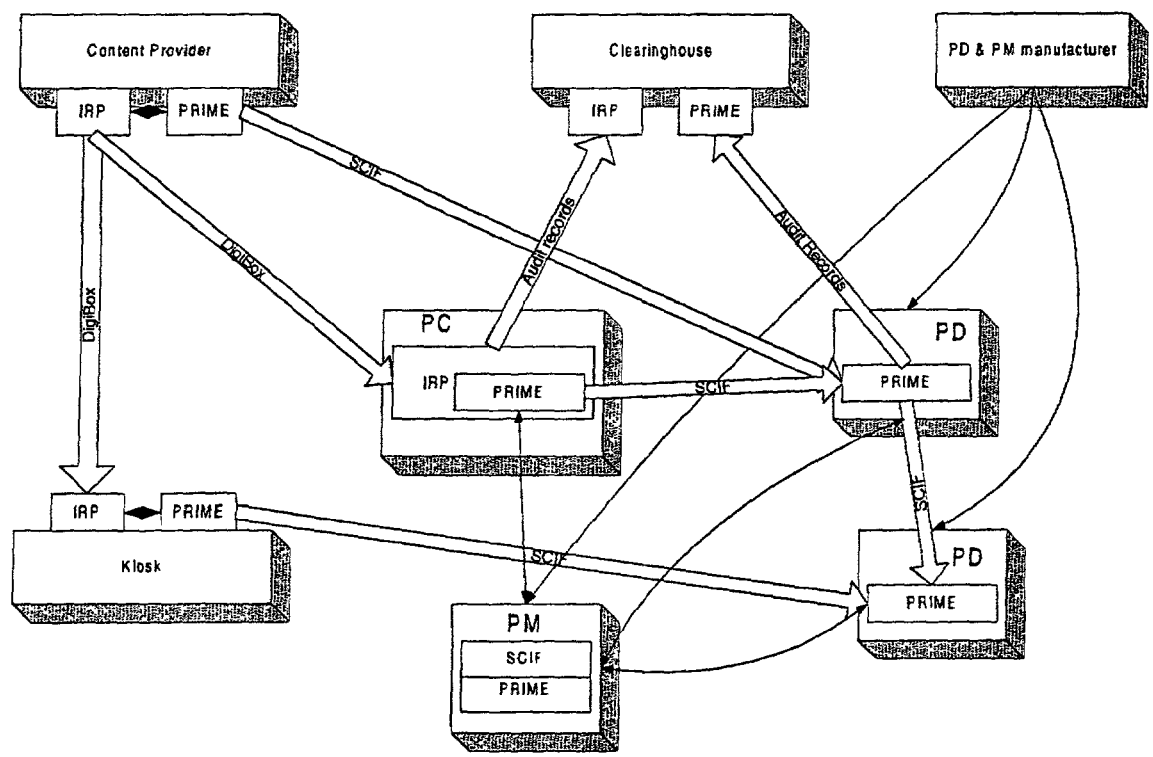
Fig. A-10

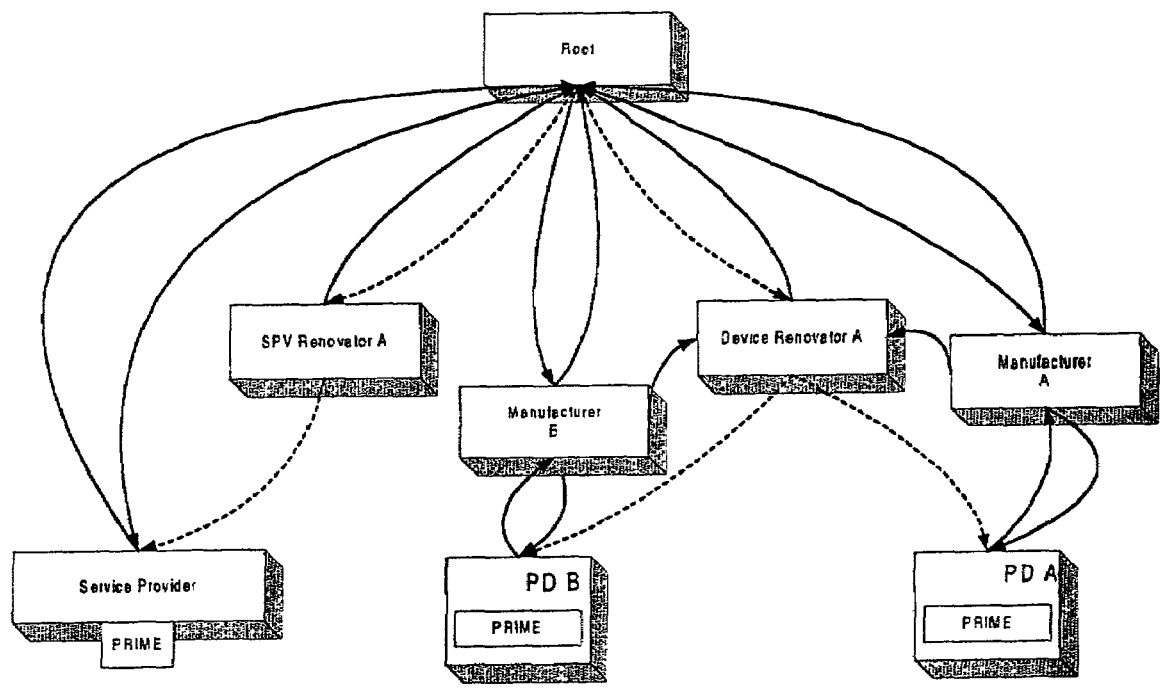
Fig. A-11

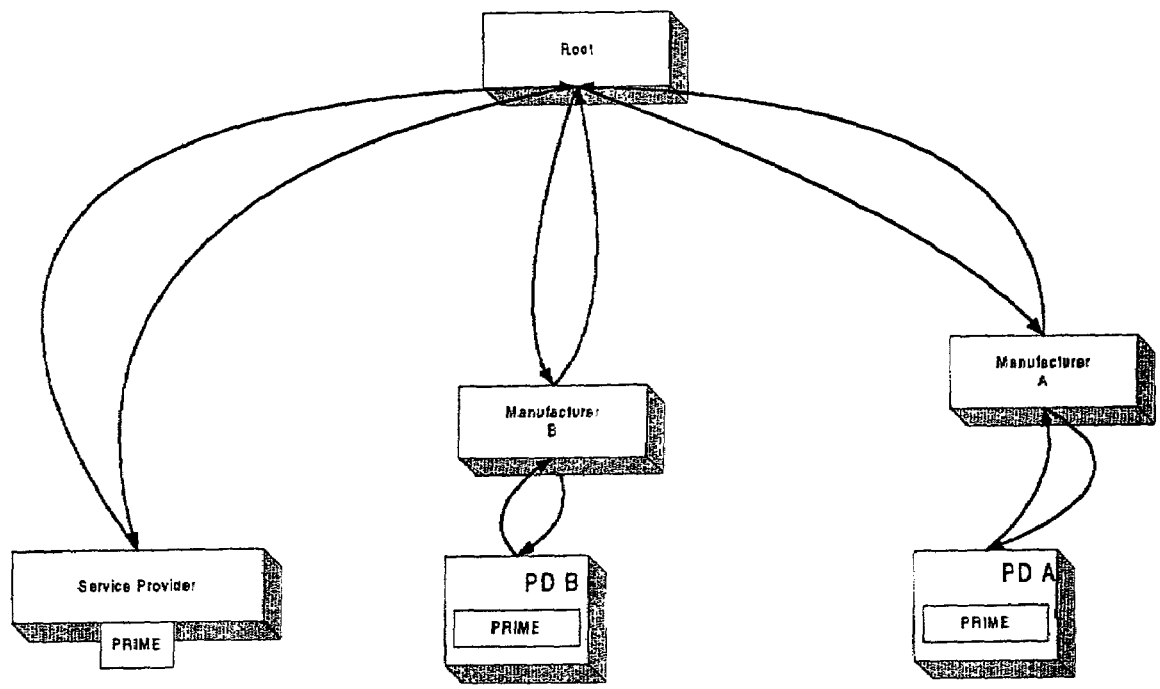
Fig. A-12

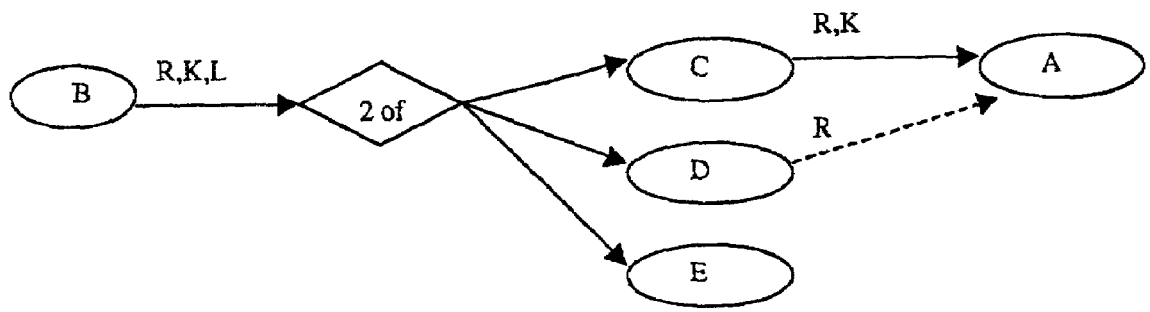
Fig. A-13

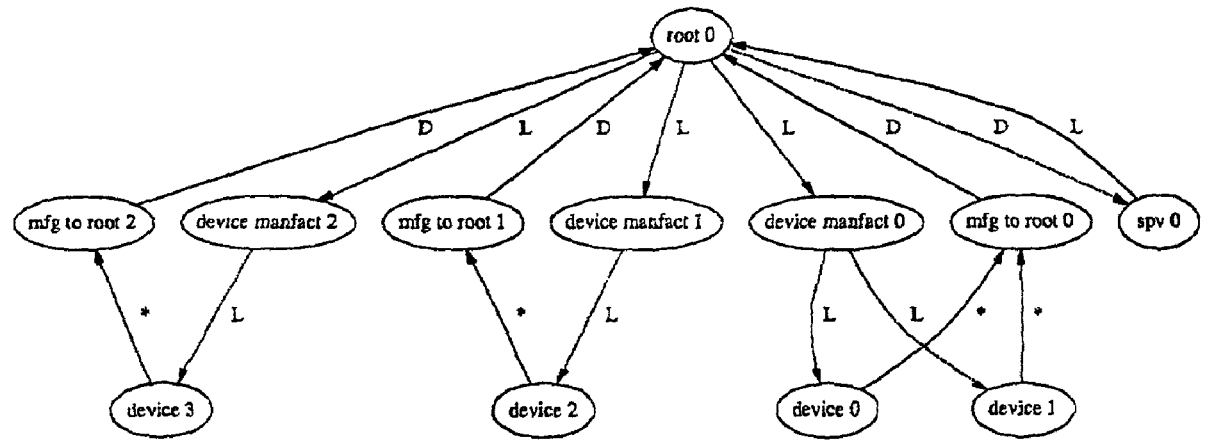
Fig. A-14

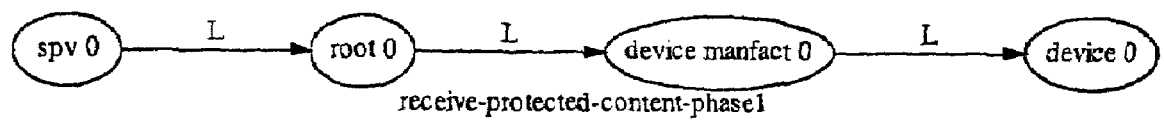
Fig. A-15

Fig. A-16

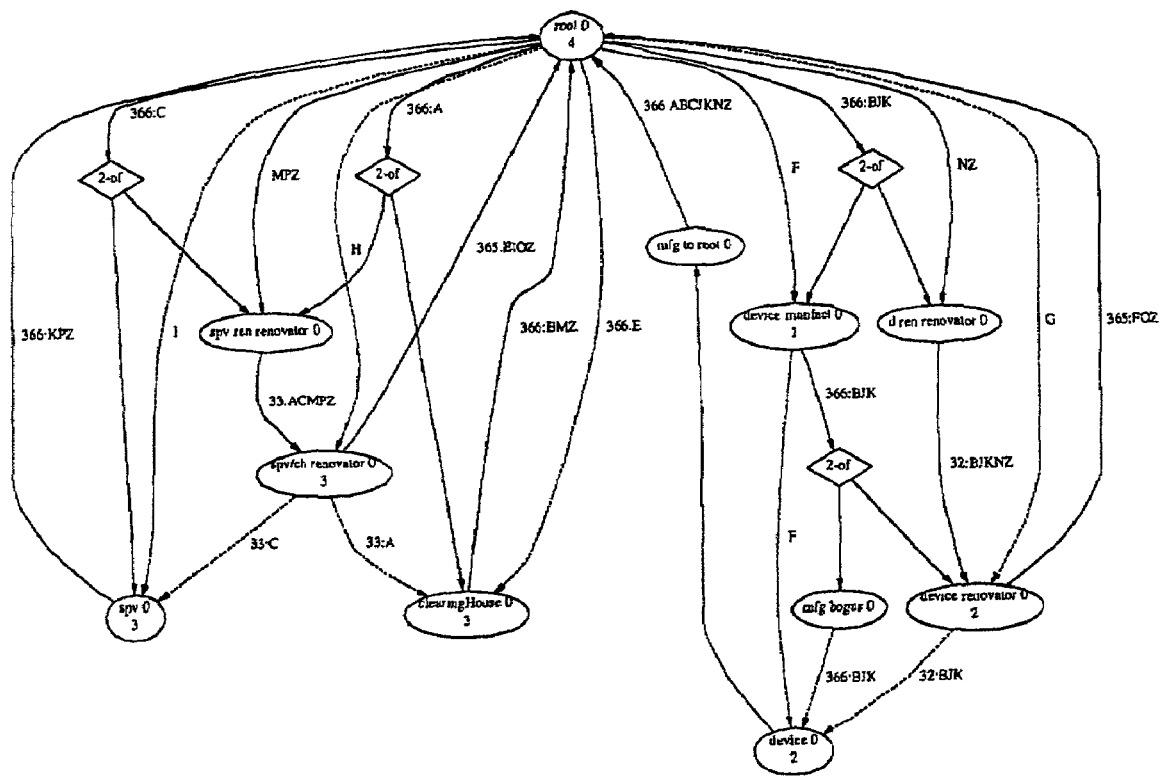
Fig. A-17

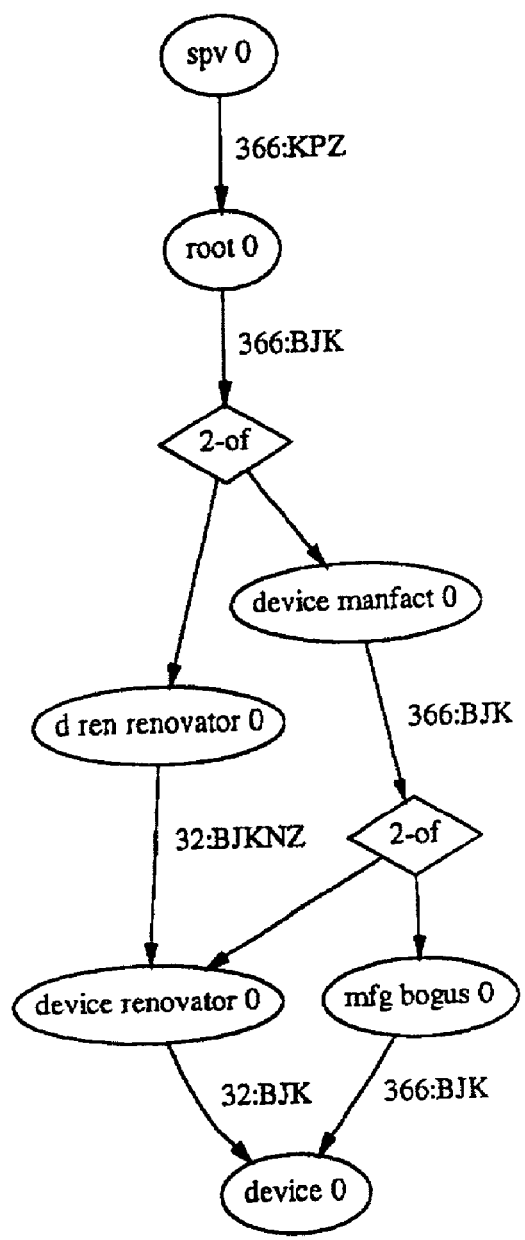
Fig. A-18

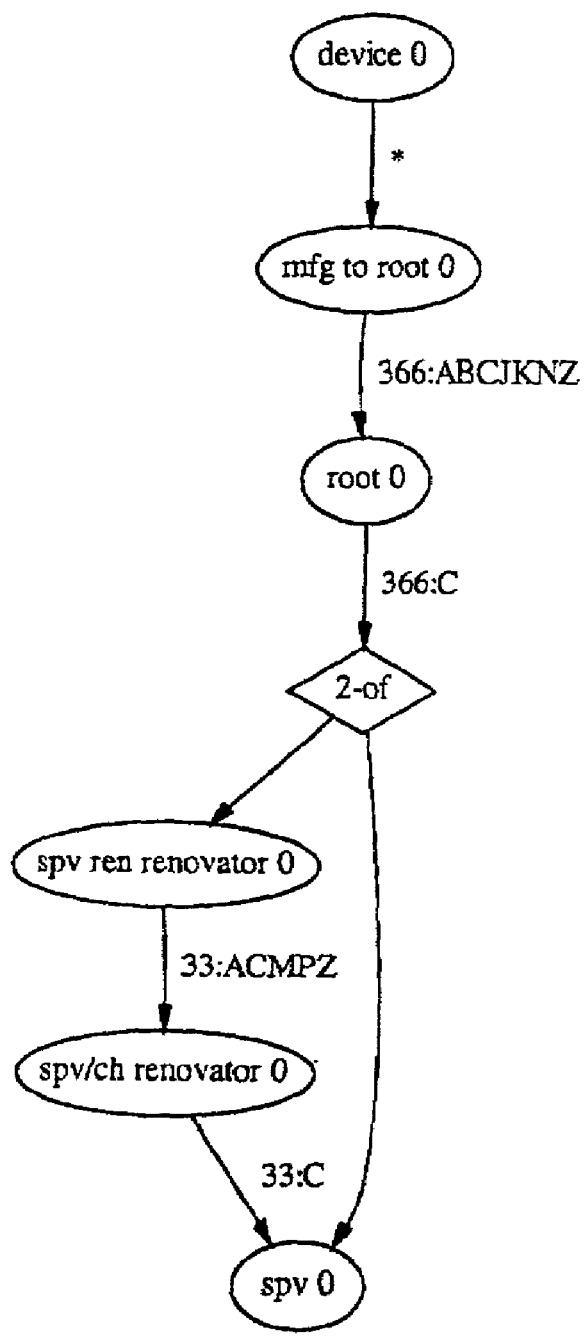
Fig. A-19

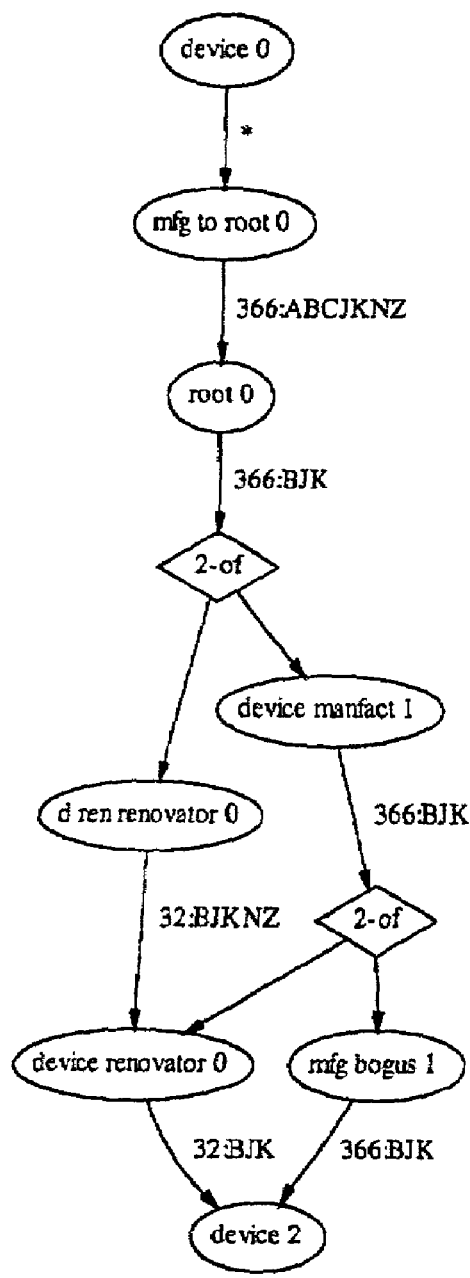
Fig. A-20

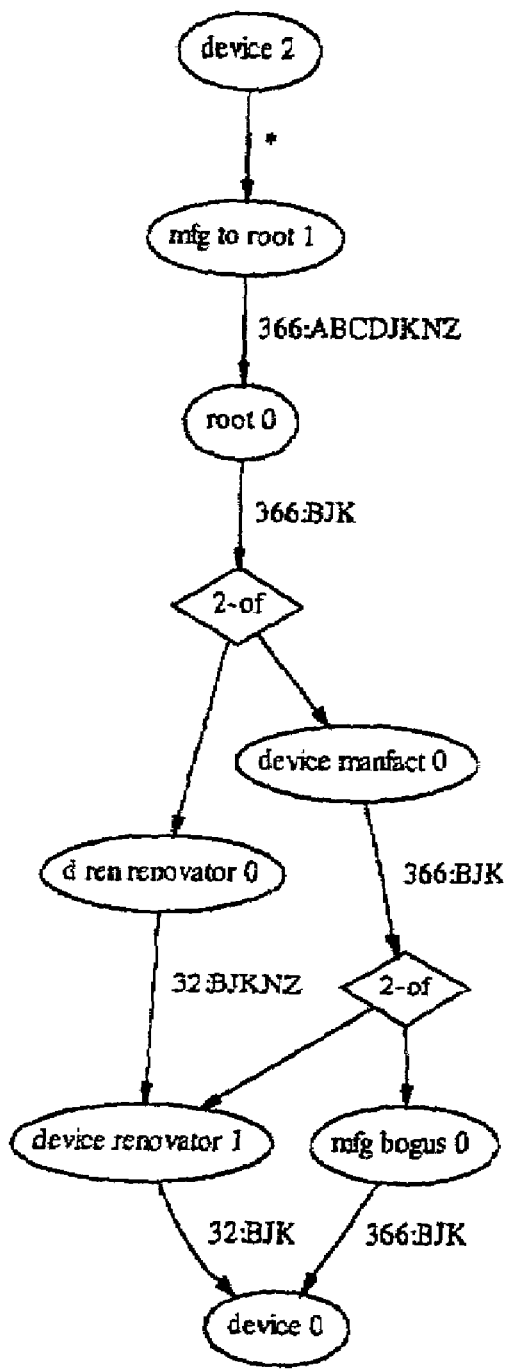
Fig. A-21

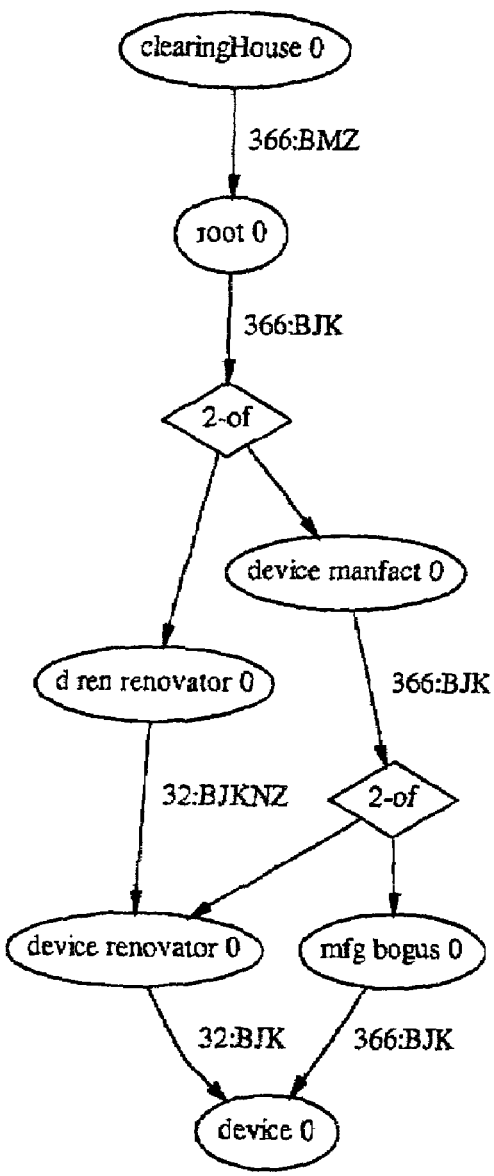
Fig. A-22

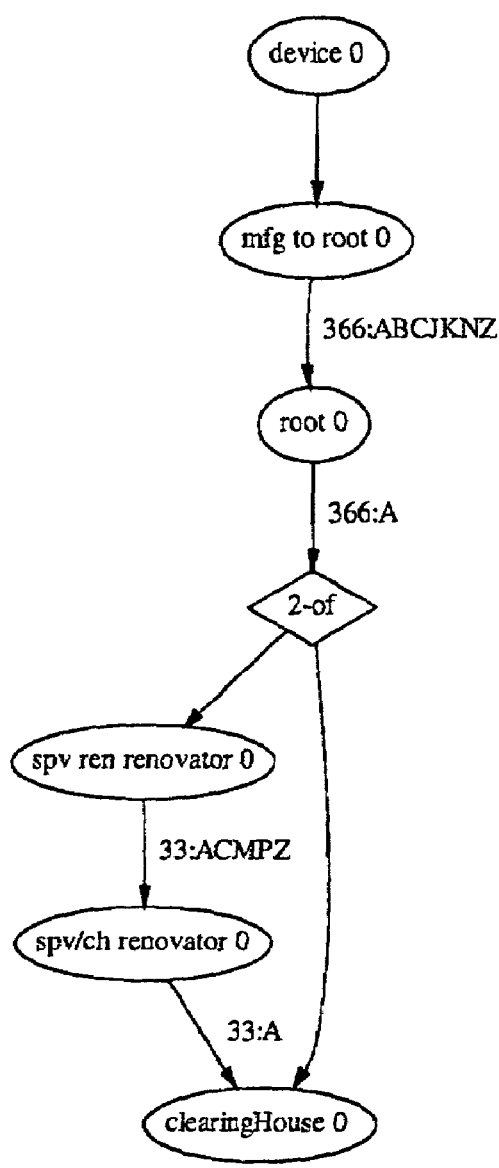
Fig. A-23

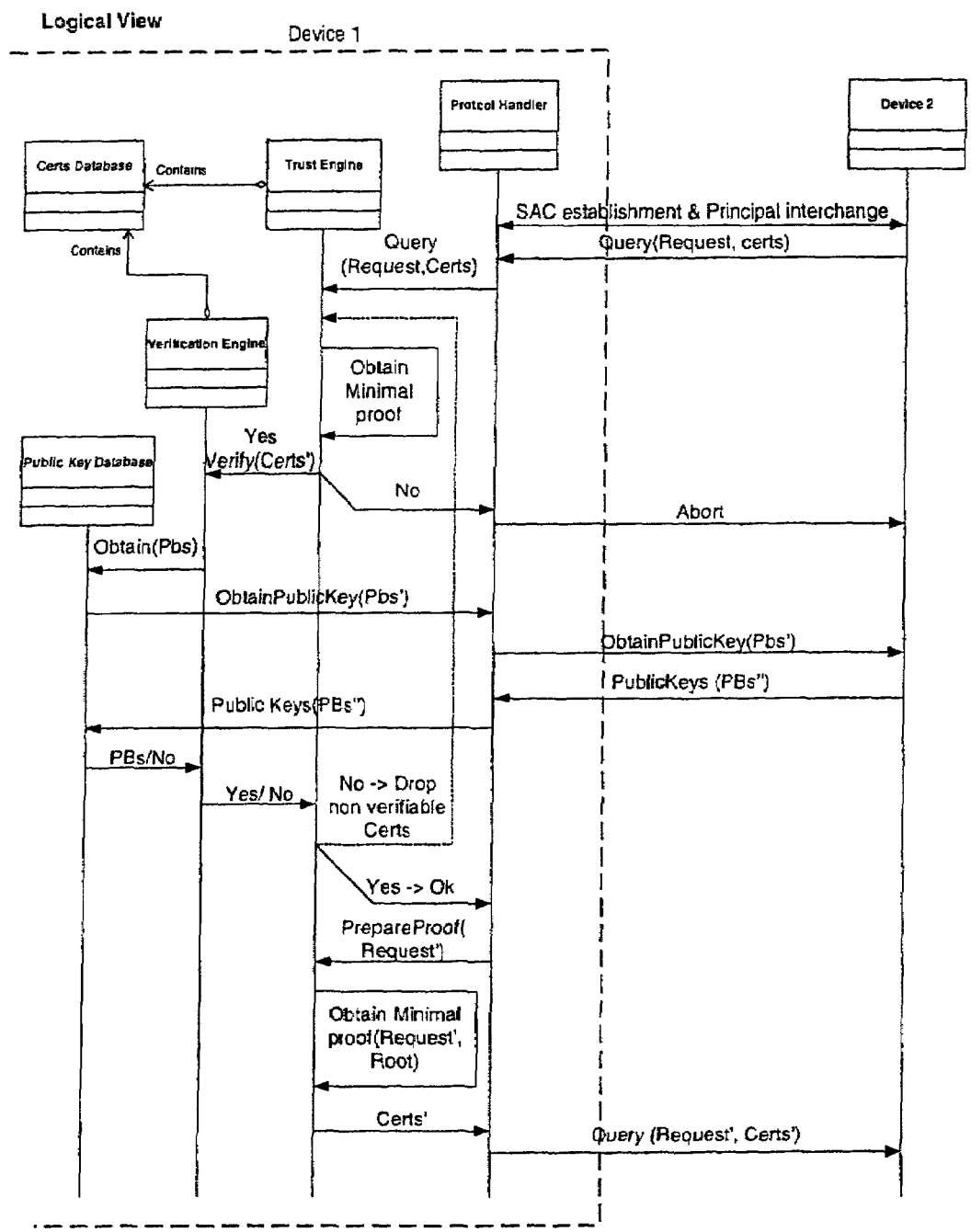
Fig. A-24

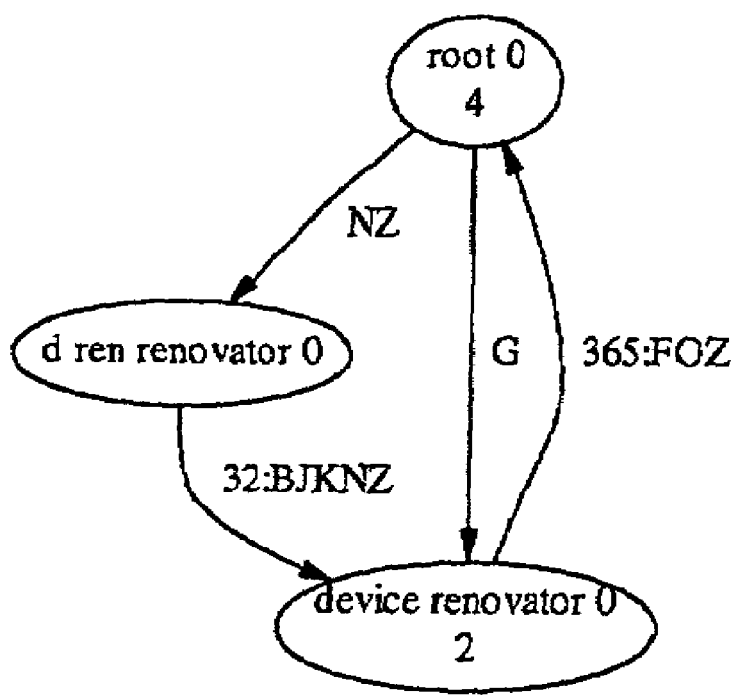
Fig. A-25

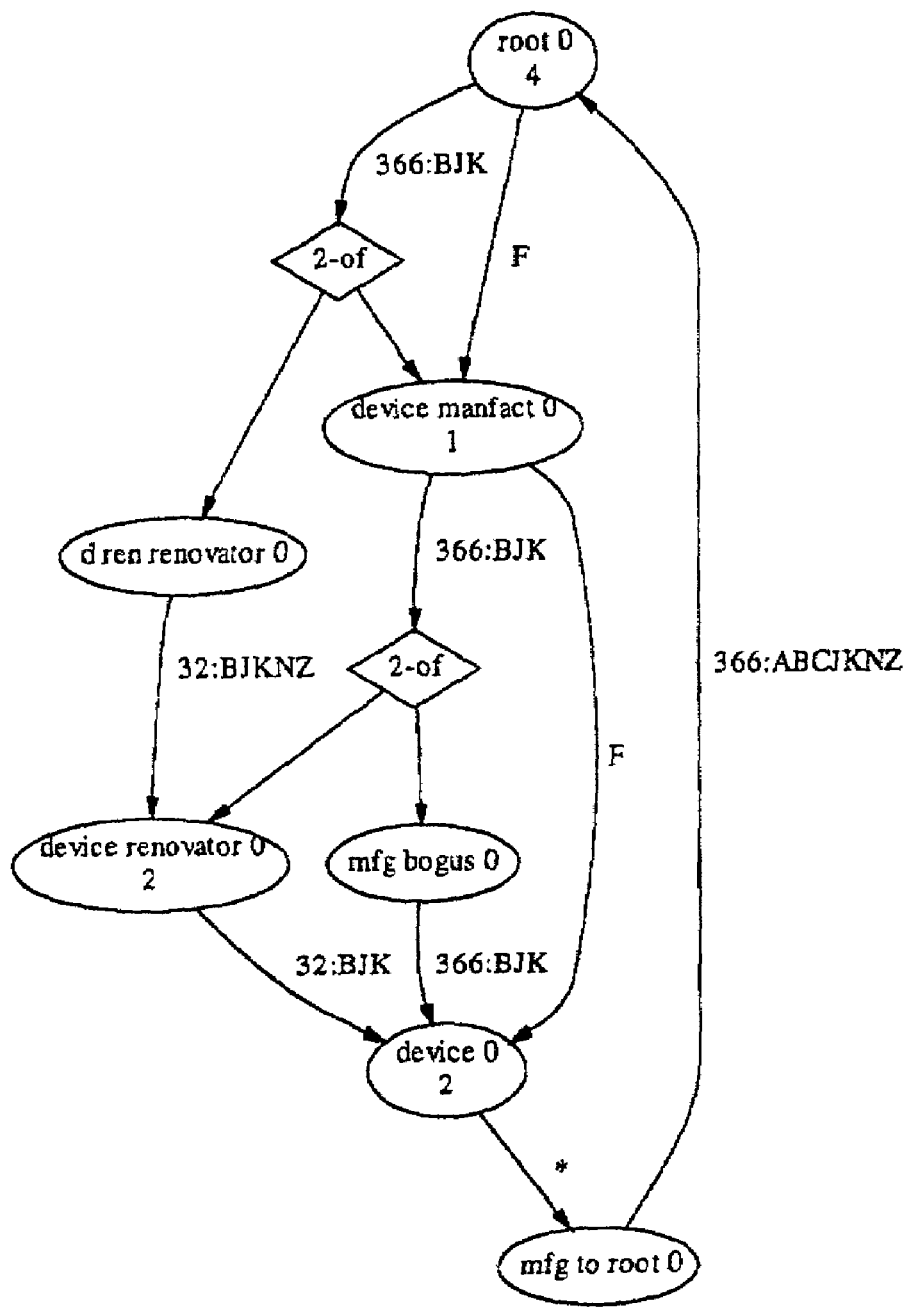
Fig. A-26

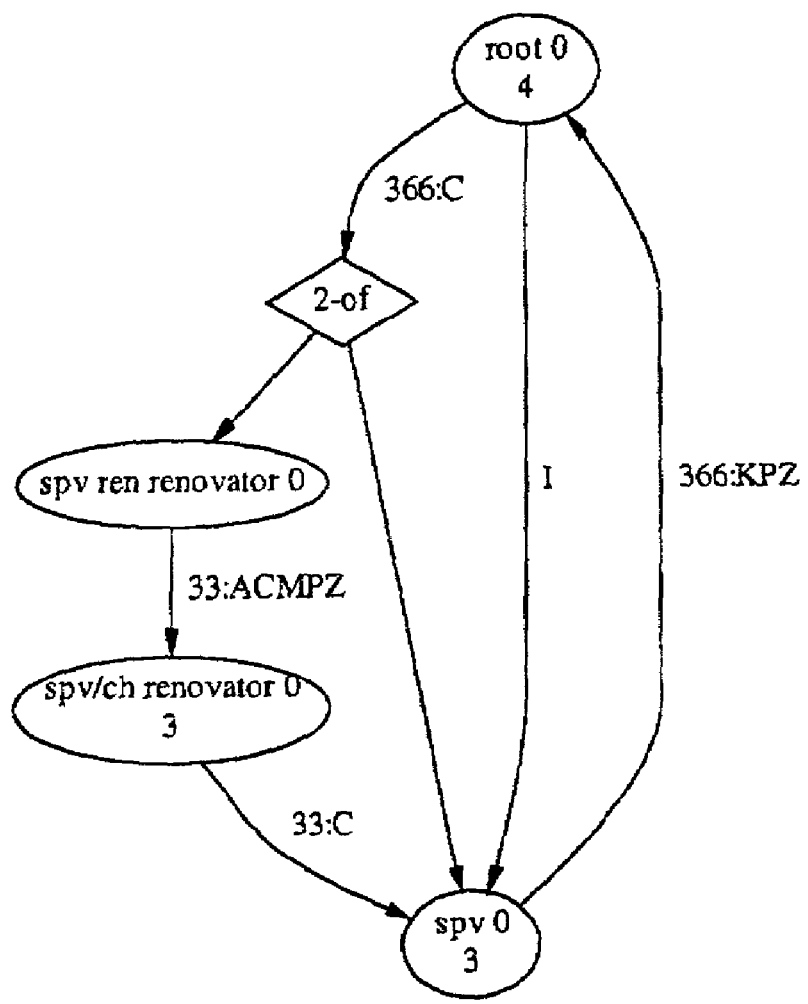
Fig. A-27

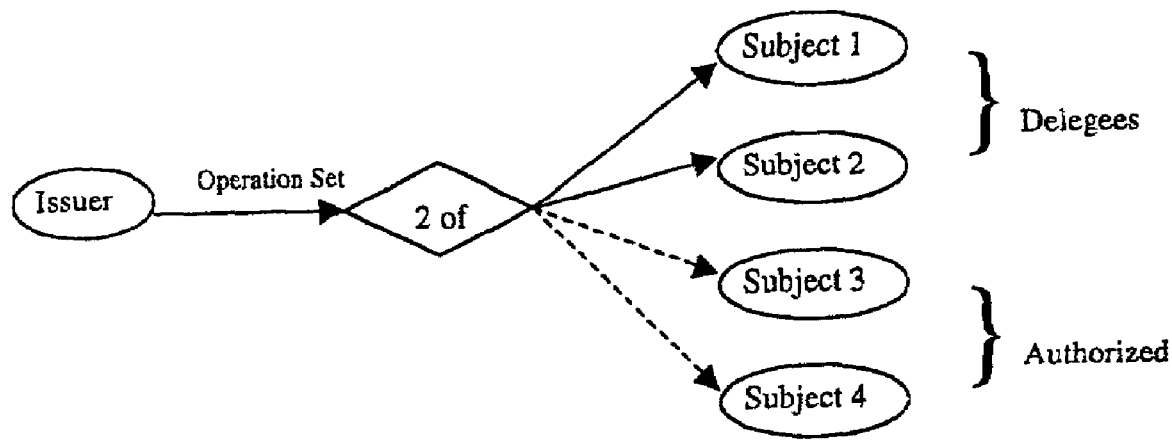
Fig. A-28

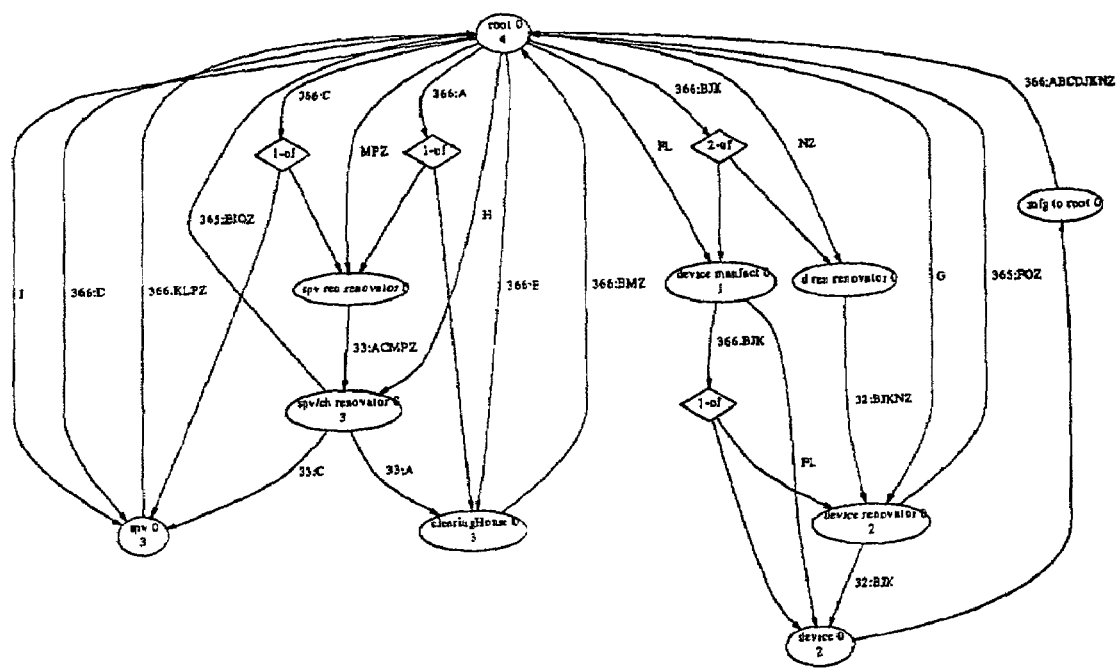
Fig. A-29

SYSTEM AND METHODS FOR MANAGING THE DISTRIBUTION OF ELECTRONIC CONTENT

RELATED APPLICATIONS

This application claims the benefit of U.S. Provisional Application No. 60/282,257 entitled "Systems and Methods for Managing the Distribution of Electronic Content," filed Apr. 5, 2001, which is hereby incorporated by reference in its entirety.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to digital rights management. More specifically, systems and methods are disclosed for controlling the distribution or use of an electronic work. The present invention uses unique protocols for the transfer of electronic information so that original works can be transferred from one location to another in such a way that only one original work exists at a given time. This type of implementation allows for peer-to-peer distribution of originals without requiring a registration authority with centralized back-end servers to vouch for what constitutes an "original" piece of information, thus reducing (or eliminating entirely) the need to centrally record changes in ownership each time originals change hands.

BACKGROUND OF THE INVENTION

An original physical document can be distinguished from a copy by examining the paper stock, holographic characteristics of the printing, or by latent markings that appear when a document is photocopied. In contrast, it is commonly thought that a distinction cannot be readily drawn between an original electronic document and a copy, since a copy of an electronic document is typically an exact duplicate.

Distinguishing an original from a copy is important when the original has a characteristic, property, or value that a copy of the original does not. For example, bearer instruments or bearer bonds are documents that uniquely entitle the owner of the document to value or property. Because bearer bonds are not registered or tracked in the name of any individual, it is impossible to replace them should they become lost or stolen. In that respect, bearer bonds are similar to cash, and can be redeemed by anyone who has physical possession of the bond. Therefore, a copy of a bearer instrument is typically worth very little, since it does not entitle its owner to the value or property to which the owner of the original bearer instrument is entitled. In addition, "pink slips" to automobiles and original deeds of trust entitle the owners of such documents to possession of certain types of property, namely real estate and automobiles, respectively. If an individual would like to purchase real estate or a car, he or she would probably feel uncomfortable conducting a transaction without proof that the alleged owner was in receipt of such title documents. Therefore, the ability to produce original documentation of ownership can be extremely important.

In some situations, an original document may not be needed. One such example would be a contract that is equally enforceable regardless of whether the party demanding performance produces the original signed document or a photocopy. Another example is the situation in which proving the authenticity of an electronic version of a document is sufficient to demand enforcement. However, if each party claims to have a copy of the "original," but there are substantive differences between these copies, then the ability to produce or identify the actual original would be helpful in reconciling these differences.

SUMMARY OF THE INVENTION

The systems and methods of the present invention allow for originals to change owners, but in a preferred embodiment these trades result in a zero sum of new originals. The systems and methods of the present invention can allow for original electronic information to be processed within an automated workflow process. For example, if a corporation wants to secure a loan from a commercial bank with a bearer bond that it holds, the corporation would typically need to turn over the bond to the bank, which would then hold the bond in custody as collateral until the loan was paid back. Embodiments of the present invention would allow the corporation to electronically transfer the bond to the bank in a manner that would result in the bank having the original bearer bond and not the corporation. The reverse would occur when the loan was paid back. A similar process could be used when an owner of an electronic bearer bond simply wished to place it in another location for safer keeping. For example, if a bank offered an electronic safety deposit box akin to the boxes in a physical branch vault, a bank customer might transfer an electronic bearer bond from a personal computer at home into the bank's electronic safety deposit box. As another example, as computing equipment ages or changes, a person may wish to transfer original documents, music, ebooks, movies, software applications or any other type of electronic file from one computer to another.

The systems and methods of the present invention can accommodate single or multiple originals (or what might also or alternatively be referred to as "masters" or "restricted copies"). Currency, although generally serialized, is an example in which multiple instances of the genuine originals exist that must be distinguished from counterfeit copies. The systems and methods of the present invention allow for originals to change owners, but in a preferred embodiment these trades result in a zero sum of originals. This type of implementation allows for peer-to-peer distribution of originals without requiring a registrar authority with a centralized back-end server to vouch for what is an "original" and what is not, and to record in its records a change in ownership each time an original changes hands.

Systems and methods are provided for enabling a determination to be made of whether an electronic document is an original or a copy. Electronic books, music, documents, and any form of digital content can be transferred without creating more than one original. It should be appreciated that the present invention can be implemented in numerous ways, including as a process, an apparatus, a system, a device, a method, or a computer readable medium. In addition, the present invention may be provided as a computer program product, which may include a machine-readable medium having stored thereon instructions that may be used to program a computer (or other electronic device) to perform a process according to the present invention. The machine-readable medium may include, but is not limited to, a floppy diskette, optical disk, CD-ROM, magneto-optical disk, ROM, RAM, EPROM, EEPROM, magnetic or optical cards, or other type of media/machine-readable medium suitable for storing electronic instructions. Furthermore, the present invention may also be downloaded as a computer program product, wherein the program may be transferred from a remote computer (e.g., a server) to a local computer (e.g., a client) by way of data signals embodied in a carrier wave or other propagation medium via a communication link (e.g., a modem or network connection). Several inventive embodiments of the present invention are described below.

In one embodiment, a method is provided for distributing an original electronic work in a manner that ensures that, at most, only a predetermined number of instances of the original electronic work are in existence at any given time. In one embodiment, the predetermined number is equal to one. When a first system requests the electronic work from a second system, the second system sends a copy of the electronic work to the first system. A cryptographic protocol is then employed to mark the second system's copy of the electronic work as a copy, and to mark the first system's copy of the electronic work as the original. In one embodiment, marking a work as a copy might affect how the work is rendered, such as having "copy" appear on the screen in the case of a document, or preventing the bearer of a copy from performing a "transfer original" transaction since the bearer's system does not hold an original and, therefore, should not be able to transfer one.

In one embodiment, an interruption of the cryptographic protocol may result in neither system having the original electronic work (i.e., both systems may be deemed to have copies of the electronic work). A cryptographically enabled failure recovery mechanism can be used to determine that a system event caused the protocol to not complete, resulting in both documents being marked as copies. If the recovery mechanism determined that the original was lost, a new original could be authorized to be created, or one of the copies of the electronic work could be marked as the original, based upon predetermined criterion. In one embodiment, only certain predefined parties (e.g., an issuing authority) have the ability to create an original or a new original and to verify information from the recovery mechanism to determine that an original was in fact lost. The above mechanism would still allow other parties the ability to transfer an original to another party. In this embodiment, the issuing authority would verify the original was lost, create a new original, and transfer on behalf of the first sender the newly created original to the intended recipient.

In another embodiment, a method is provided for distributing an electronic work in a manner that ensures that, at most, only a predefined number of instances of the electronic work will be deemed to be originals. A first system requests one of the originals from a second system. The two systems authenticate each other. In a preferred embodiment an aspect of the authentication process is to ensure that the second system has an original to transfer and that the first system has the ability to protect the integrity of the original in a manner equivalent to the second system. The second system sends a copy of the electronic work to the first system. Upon receipt of the copy, the first system sends an authorization to the second system. Upon receipt of the authorization, the second system changes an attribute associated with its instance of the requested electronic work to indicate that it is a copy, not an original. The second system then sends an authorization to the first system. Upon receipt of the authorization, the first system changes an attribute associated with its instance of the received electronic work to indicate that it is an original, not a copy. The first system then sends an acknowledgement to the second system. In one embodiment, the first system considers the protocol complete once it has sent the acknowledgment to the second system, and the second system considers the protocol complete once it has received the acknowledgement from the first system. If either system determines (e.g., based on a predetermined criteria such as time) that a request to perform another transaction, and/or the protocol itself, has failed, it records this determination in a cryptographically signed event record, which it forwards to an authority responsible for administrating the recovery mechanism. In one embodiment, protocol failures that occur before the second system marks its version as a copy and after the first system marks its version as an original will not cause the original to be lost.

In yet another embodiment, a method is provided for ensuring that only a single instance of an electronic work is present in a system at any given time, the electronic work being comprised of some amount of electronic content and one or more rights or attributes associated with the content. When the electronic work is transferred from one system to another, only one system will possess the electronic work in its entirety at any given time, although more than one system may possess some subset of the electronic work's component parts. For example, more than one system may possess some or all of the electronic content included in the electronic work, but not the entire set of rights and/or attributes associated therewith.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by referring to the following detailed description in conjunction with the accompanying drawings, wherein like reference numerals designate like structural elements, and in which.

Figure 1A:
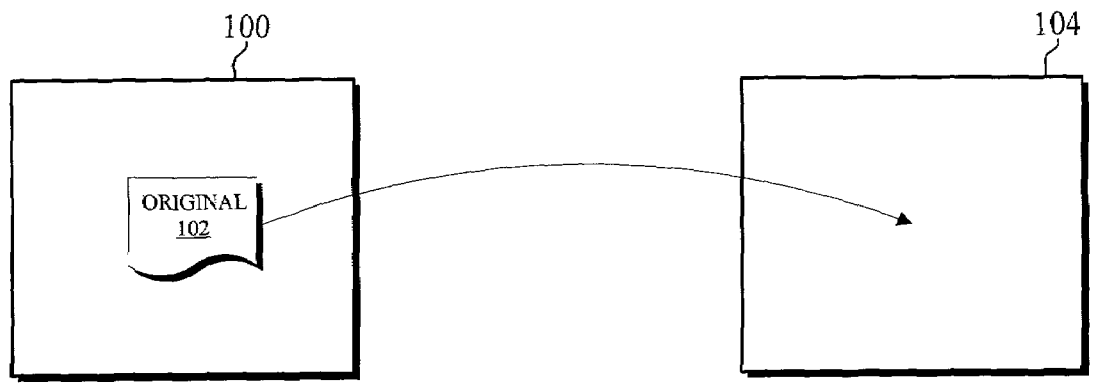
FIGS. 1A, 1B, and 1C illustrate the distribution of an electronic work in accordance with an embodiment of the present invention.

FIG. A-1 in the appendix illustrates the architecture of a security domain in an embodiment of the present invention.

FIG. A-2 in the appendix illustrates the use of multiple levels of keys.

FIG. A-3 illustrates the architecture of an exemplary clearinghouse in accordance with an embodiment of the present invention.

FIG. A-4 in the appendix depicts the architecture of the Root in accordance with an embodiment of the present invention.

FIG. A-5 in the appendix is an illustration of a Renovator's architecture in accordance with an embodiment of the present invention.

FIG. A-6 in the appendix illustrates the structure of a Security Clearinghouse in accordance with an embodiment of the present invention.

FIG. A-7 in the appendix illustrates the structure of a Manufacture's Certification Module in accordance with an embodiment of the present invention.

FIG. A-8 in the appendix depicts certain modules of the security kernel.

FIG. A-9 in the appendix illustrates the structure of a Content Provider Module in accordance with an embodiment of the present invention.

FIG. A-10 in the appendix illustrates the operation of a system that uses the certificate structure of the present invention.

FIG. A-11 in the appendix illustrates an embodiment of a security infrastructure.

FIG. A-12 In the appendix illustrates another embodiment of a security infrastructure.

FIG. A-13 In the appendix is an ample of a graph authorizing the principal A to perform operation R In B's domain of operation.

FIG. A-14 in the appendix depicts a certificate infrastructure.

FIG. A-15 in the appendix depicts a sub-graph of the process of the Content provider evaluating eligibility of a Device for receiving content.

FIG. A-16 in the appendix is an ample of a sub-graph that enables a Device to evaluate a Content Provider.

FIG. A-17 in the appendix illustrates the various certificates involved in a phase 2 scenario.

FIG. A-18 in the appendix depicts the set of certificates involved in a proof.

FIG. A-19 in the appendix depicts the set of certificates involved in another proof.

FIG. A-20 in the appendix depicts the set of certificates involved in yet another proof.

FIG. A-21 in the appendix depicts the set of certificates involved in yet another proof.

FIG. A-22 in the appendix depicts the set of certificates involved in yet another proof.

FIG. A-23 in the appendix depicts the set of certificates involved in yet another proof.

FIG. A-24 in the appendix depicts an authorization network protocol.

FIG. A-25 in the appendix depicts the certificates that a Renovator D holds after being renovated by the Root.

FIG. A-26 in the appendix depicts the certificates held by a Device after being renovated.

FIG. A-27 in the appendix depicts the certificates held by a Content provider after being renovated.

FIG. A-28 in the appendix depicts a delegation construct.

FIG. A-29 in the appendix shows an alternate certificate layout for phase 2.

DETAILED DESCRIPTION

A detailed description of the invention is provided below. While the invention is described in conjunction with several embodiments, it should be understood that the invention is not limited to any one embodiment, but instead encompasses numerous alternatives, modifications, and equivalents. For example, while embodiments are described in the context of a system and method for controlling the distribution of electronic documents such as deeds, titles, and bearer instruments, those skilled in the art will recognize that the disclosed systems and methods are readily adaptable for broader application. For example, without limitation, the present invention could be readily applied in the context of distributing virtually any type of digital or electronic work, such as digital music, recordings, books, movies, videos, digital entitlements and the like (and the term "document," as used herein, should be interpreted to apply to any of these as well as other types of digital or electronic works, unless otherwise clear from the context). In addition, while numerous specific details are set forth in the following description in order to provide a thorough understanding of the present invention, the present invention may be practiced without some or all of these details. Moreover, for the purpose of clarity, certain technical material that is known in the art related to the invention has not been described in detail in order to avoid unnecessarily obscuring the present invention.

The discussion that follows will describe how the properties that characterize an electronic work as an original can travel with it as it is transferred from one storage medium to another. A distinction will sometimes be made between "transferring" the original and "copying" either the original or a copy of the original. Transferring will generally mean moving the original from one medium to another (such as one computer disk to another computer disk) and having what remains on the first medium no longer being characterized as the original. Transferring would be similar, in the physical world, to being able to lift the print and ink from safety paper stock and place it onto blank safety paper stock, leaving no print and ink on the first safety paper stock, or alternatively leaving the print and ink and transforming the first safety stock to ordinary paper (something that is not considered possible). Transferring would create a new instance that is characteristically identical to the first instance, while changing the characteristics of the original first instance. "Copying," by contrast, will generally refer to creating something that is characteristically different from the original and does not change the properties of the source from which the copy was made.

Systems and methods are provided for enabling a predetermined number of "original" digital works to be created and maintained. Distribution of the original digital works is controlled such that the original digital works can be distributed or transferred without increasing the number of original digital works that exist in the system at any given time beyond the predetermined number.

Figure 1B:
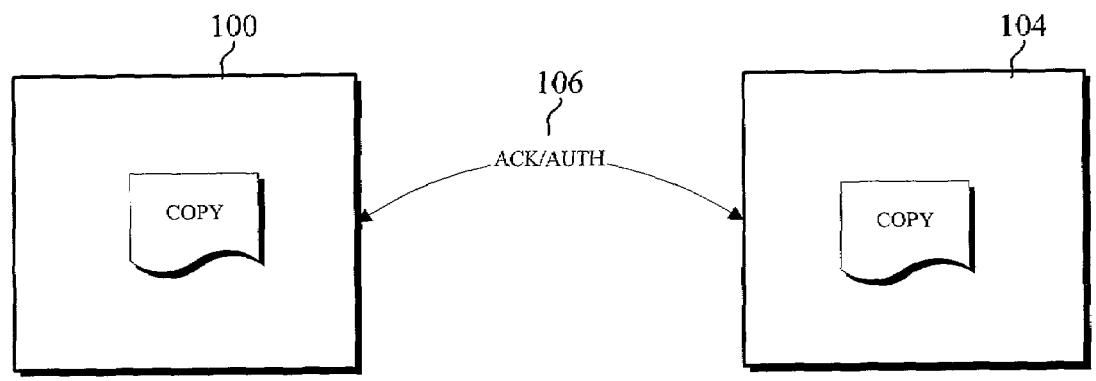
Figure 1C:

FIGS. 1A, 1B, and 1C illustrate the distribution of an electronic work in accordance with an embodiment of the present invention. Referring to FIG. 1A, the bearer or owner 100 of an original electronic work 102 initiates a transfer of the electronic work 102 to receiver 104. As shown in FIG. 1B, the parties exchange authorizations and/or acknowledgements in accordance with a predefined protocol 106. If the protocol 106 is interrupted or corrupted, at most one party will possess the original electronic work 102, or, as shown in FIG. 1B, neither party may possess the original. As shown in FIG. 1C, upon completion of the protocol, the recipient 104 will possess the original work, while the sender 100 may possess a copy of the original 108. However, the sender's copy (if any) will be such that it cannot be passed off as the original to other members of the system (e.g., it will have associated with it an attribute indicating that it is a copy, whereas the instance of the digital work that is in recipient 104's possession will have an attribute associated with it indicating that it is the original).

In one embodiment, digital rights management techniques—such as those described in commonly-assigned U.S. Pat. No. 5,892,900, entitled "Systems and Methods for Secure Transaction Management and Electronic Rights Protection," issued Apr. 6, 1999 ("the '900 patent") and U.S. Pat.

No. 6,185,683, entitled "Trusted and Secure Techniques, Systems and Methods for Item Delivery and Execution," issued Feb. 6, 2001 (the entire contents of both of these patents are hereby expressly incorporated herein by reference)—are used in combination with a cryptographic two-party protocol to distinguish original electronic documents from copies, and to enable transfer or distribution of original electronic documents from one party to another. In a preferred embodiment, each original document and copy thereof is tagged as either an original or a copy. This tagging, and altering of the tag, is preferably performed in a secure and protected manner. In a preferred embodiment, digital rights management techniques are used to persistently protect the documents and tags. For example, the documents and/or tags may be encrypted or otherwise secured such that special hardware and/or software, such as that described in the '900 patent, is needed to access and/or modify their contents. For example, in one embodiment, documents and/or tags are copied and/or transferred between parties in secure electronic containers, such as those described in the '900 patent. These secure containers are processed by each party using hardware and/or software protected processing environments, embodiments of which are also described in the '900 patent, thus ensuring that each parties' interests (as well as the interests of others, such as document creators, owners, and/or distributors) are protected, and that the tagging protocol described herein is executed securely. The tags themselves can be implemented in the same manner as the rules and controls described in the '900 patent, thereby ensuring their security and persistent association with the documents to which they correspond. Alternatively, the tags can be implemented as fields within other rules or controls associated with a document, since documents will typically have a variety of other associated rules and controls, as described in the '900 patent and the '683 patent. These rules or policies may indicate that a different set of rights are available to the holder of an original document from those that are available to the holder of a copy. For example, an owner of an original may be able to assign the document to someone else: something the holder of a copy might not be able to do. Also, by ensuring that only one original exists, the owner of the original in this example would only be able to assign or transfer the original once.

As indicated above, in a preferred embodiment, a cryptographic two-party protocol is used to transfer an original document from one party to another, and to enable or ensure that: (1) the bearer (sender) of an electronic original, master, or restricted copy (collectively "original") can distribute it to another individual (recipient), and as a result of such a distribution will no longer have an original; (2) the recipient of an original document will now have the rights and privileges formerly held by the sender; (3) two "originals" will not exist during, or as a result of, the protocol's execution; and/or (4) certain failures in the transfer or protocol may result in no original existing, in which case the sender's and/or recipient's software creates a secure record of the failure, which an authorized party can examine and, if validated, create a new original.

Figure 2:
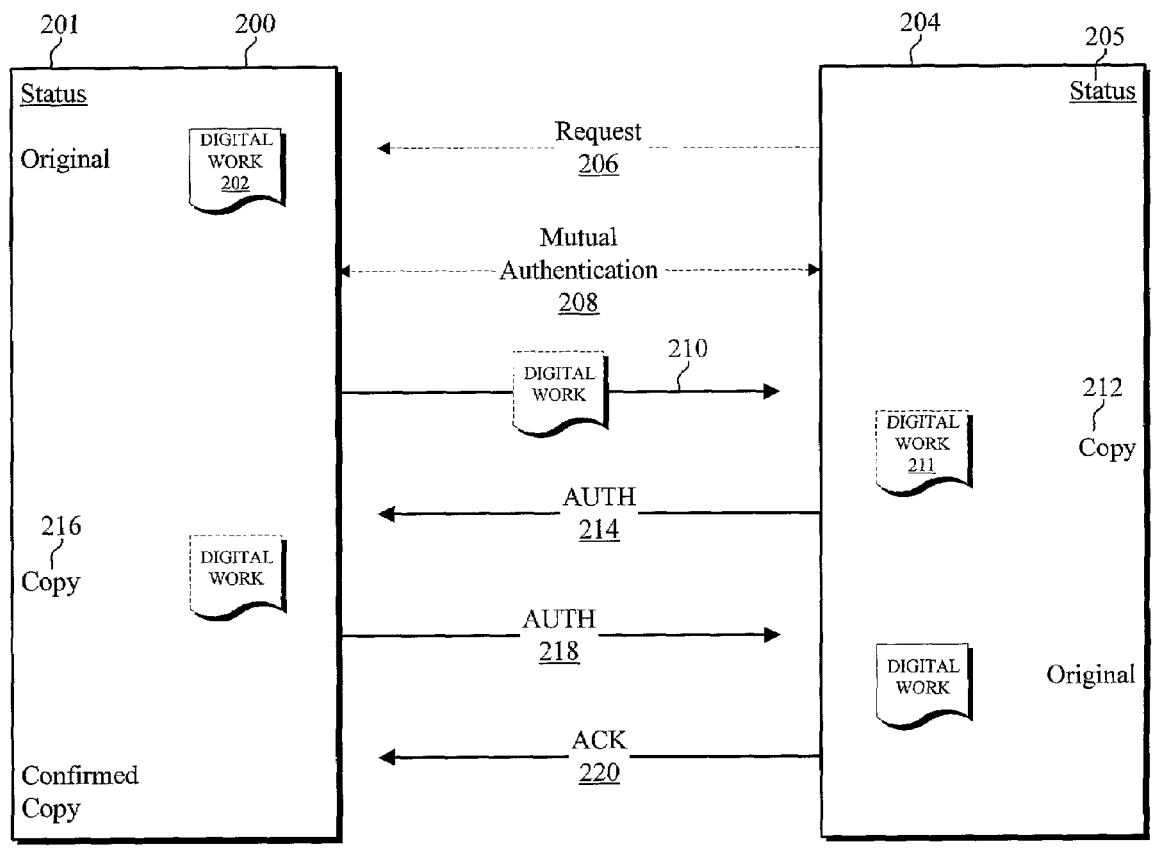
FIG. 2 illustrates a protocol for distributing an electronic work in accordance with an embodiment of the present invention.

An exemplary embodiment of the foregoing protocol is illustrated in FIG. 2, which shows, starting at the top and proceeding to the bottom, the sequence of communications between two parties 200 and 204, and the status 201/205 of each party's instance (if any) of an electronic work. As shown in FIG. 2, at some point an original digital work 202 resides in the protected computing environment of the bearer 200, the protected computing environment having been, in one embodiment, directly or indirectly enabled by a distributed security architecture (the distributed security architecture might also allow for the creation of originals, and/or the delegation of authority to create originals). Examples of such a protected computing environment can be found, for example, in the '900 patent and the '683 patent; however, any suitable protected computing environment could be used.

Referring once again to FIG. 2, the bearer 200 decides to send the original 202 to the other party 204 in a peer-to-peer transaction. For example, the intended recipient 204 may have submitted a request 206 to the bearer 200 or the bearer may have submitted an offer to the requester. In a preferred embodiment, the proposed recipient 204 has a similar protected computing environment enabled by the distributed security architecture. Through mutual authentication using a suitable authentication protocol, the sender 200 and recipient 204 each determine whether the other party is qualified to perform this transfer (208). The sender 200 forwards a copy of the digital work to the recipient 204 (210). The forwarded digital work 211 is tagged as a copy (212), which is also denoted in FIG. 2 by the dashed lines used to draw digital work 211. The recipient 204 authorizes the sender 200 to change the tag 201 of the sender's instance of the digital work from "original" to "copy" (214). Once tagged as a copy (216), the sender 200 authorizes the recipient 204 to change the tag associated with its instance of the digital work from "copy" to "original" (218). In a preferred embodiment, the final transaction of the protocol is for the recipient 204 to acknowledge to the sender 200 that it has changed the tag 205 from "copy" to "original" (220).

Note that the protocol shown in FIG. 2 is designed such that at most one "original" exists at any given time. Thus, if the protocol is interrupted or terminated before completion, the system's control over the number of originals will not be breached. If, for example, the transmission of authorization 218 is interrupted or lost, such that it is not received by recipient 204, then neither party will possess an original. When party 204 fails to receive transmission 218 (perhaps after requesting it again and/or waiting a predefined amount of time), and/or when party 200 fails to receive acknowledgement 220 as a result, one or both of the parties can initiate a suitable error recovery procedure. For example, the parties could contact a trusted third party (or each other), and one of the copies of the digital work could be tagged as the original. Similarly, if any of the other communications are lost or interrupted, a suitable error-recovery procedure can be initiated to ensure that the protocol is completed. Depending on when the failure occurred, there may in fact have been no loss of an original and the parties could restart the protocol and successfully complete the transfer without requiring the intervention of a trusted third party.

It will be appreciated that many variations could be made to the protocol described in connection with FIG. 2 without departing from the principles of the present invention. For example, the order of some of the transmissions could be varied, certain transmissions could be eliminated, and/or certain other transmissions could be added. For example, in one embodiment the sender 200 might change the status of its instance of the digital work before transmitting the digital work to the recipient 204. The transmission 210 of the digital work might then be combined with the transmission of authorization 218. This combined transmission 210/218 would be followed by the transmission of acknowledgement 220 from recipient 204 to sender 200, and the transmission of authorization 214 would not be needed. Moreover, it should be appreciated that to the extent a mutual authentication procedure 208 is performed (as in a preferred embodiment), this procedure may be performed in any suitable manner. However, one preferred embodiment makes use of one of the authentication protocols described in Appendix A. In one embodiment, the distributed security architecture referred to above is also implemented in the manner described in Appendix A.

In one embodiment, the distributed security architecture includes one or more root authorities. For example, a root authority might exist for the purpose of establishing rules around who can or cannot transfer originals. For example, the root authority may create or authorize an issuing authority for the purpose of creating and transferring originals. The root and issuing authorities may be one or separate entities. The root authority may allow the issuing authority to delegate the authority to transfer originals to the recipient of the original. However, the root authority may choose not to allow the issuing authority to delegate the authority to create originals to another party. This use of delegation by the root authority would allow only the issuing authority to create originals, but allow all recipients of originals to transfer them to another recipient. The issuing authority in this illustration may, for example, be an issuer of bearer bonds or a department of motor vehicles issuing titles to automobiles. The issuing authority would preferably implement tight procedural and security controls to protect against unauthorized creation of originals. The root authority would supervise this process and ensure that it operates effectively and securely.

In some commercial or business transactions—such as payment of money for a bond, or the presentment of an automobile title and a related assignment document—the issuing authority would transfer an original document to a recipient. As a result of this transfer, the original would reside in the protected computing environment of the recipient or bearer. In this example, this computing environment would preferably have been directly or indirectly cryptographically-enabled by the root and/or issuing authority. The bearer might then decide to transfer the original to another party in a peer-to-peer transfer transaction in the manner described above in connection with FIG. 2.

The issuing authority might eventually be the recipient of the original in a transfer. This could be the case when the last bearer of a bond redeems the bond, or when an automobile is sold and the new owner presents the assigned title to the department of motor vehicles for a new title. The issuing authority might also be the party that would review the authenticity of the transaction records created upon the occurrence of certain failures in the cryptographic two-party protocol of FIG. 2, and, if necessary, issue a new original if the previous original had been destroyed.

In some embodiments, the systems and methods of the present invention can be applied to master copies of content. For example, a studio may, in advance of a general release, pre-distribute 100 restricted copies of a work to industry insiders. These restricted copies might have properties that the subsequently-released work would not. For example, a restricted copy might allow its holder to freely transfer it to another industry insider, but once transferred, the first holder might not be able to render the work. This embodiment would allow a set number of restricted copies to be freely circulated among authorized parties but would prevent the unauthorized creation of copies of the work for mass distribution, perhaps over the Internet.

In one embodiment, the content could be considered to be a digital entitlement for a product or service, and in a preferred embodiment a digital certificate may be used. In this embodiment, a holder of a certificate could be entitled to a product or service if it could be determined to be a holder of the original certificate (and conversely, the holder may not be entitled to the product or service if it is holding a mere copy of the certificate). For example, a holder (user) of an original certificate could transfer its certificate to the service provider, which would then become the holder of the certificate. The service would operate for the user until the user requested its original certificate to be returned. This embodiment would prevent unauthorized users from enjoying the benefits of the product or service when they only possess a copy of the certificate. Further, it would allow the holder of the original certificate to transfer it to another one of its own protected environments or to another individual with a protected environment, similar to how a bus pass could be shared by a group of commuters while only allowing one commuter to ride a bus at any given time. Similarly, by, e.g., securely controlling the transfer of the original certificate (e.g., by requiring the purported certificate-holder to first authenticate him/herself), the system can prevent the unauthorized copying and use of a user's certificate, thus providing an advantage over other forms of authorization/payment, such as credit card information.

Figure 3:
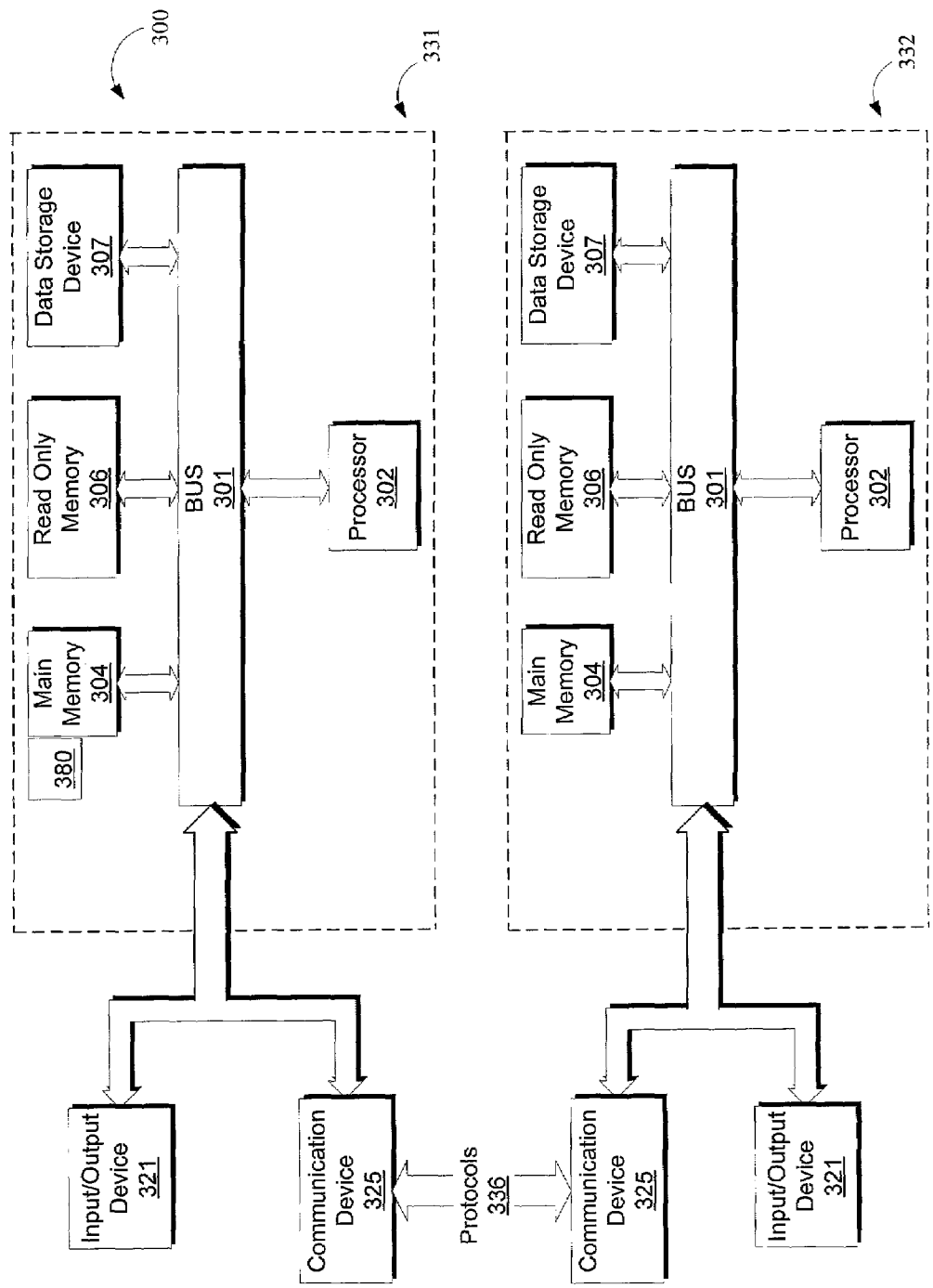
FIG. 3 is a block diagram illustrating a system for distributing an electronic work from one location to another location.

FIG. 3 illustrates a system for transferring a digital work from one location to another in accordance with embodiments of the present invention. Referring to FIG. 3, a computer system 300 comprises a first computer 331 and a second computer 332. The first and second computers may be configured to have protected computing environments such that digital works may reside therein. It should be appreciated that the term "computer" is being used in this context to refer generically to any computer system, including, e.g., personal computers, television set-top boxes, personal digital assistants (PDAs), cellular or other telephones, client-side computers, server-side computers, and the like. For ease of understanding, FIG. 3 illustrates a peer-to-peer type distribution network, in which peers possess similar hardware and software components; however, it will be appreciated that in other embodiments, either or both of these peers may only possess some suitable subset of the components illustrated in FIG. 3. Referring to FIG. 3, illustrative computers 331 and 332 each comprise some or all of the following components:

- a processor 302 for processing information;
- random access memory (RAM) or other dynamic storage device 304 (referred to sometimes as "main memory") for storing information and instructions to be executed by processor 302 and/or for storing temporary variables or other intermediate information during execution of instructions by processor 302;
- read only memory (ROM) and/or some other static storage device for storing information and instructions for processor 302;
- a data storage device 307 such as a magnetic disk or optical disc and its corresponding drive;
- one or more input/output devices 321, such as a cathode ray tube (CRT) or liquid crystal display (LCD) device; audio speakers; an alphanumeric input device such as a keyboard and/or a cursor control device such as a mouse or a trackball, for communicating information and/or command selections to processor 302;
- a communication device 325, such as a modem, a network interface card, or other commercially available network interface device, for accessing the second computer and/or remote servers via a network such as the Internet, a private corporate network, a local-area network, a wide-area network, a wireless network, or the like; and
- one or more buses 301 for coupling the aforementioned elements together.

As indicated above, computers 331/332 may be coupled to a number of other computers via a conventional network infrastructure, such as a company's Intranet and/or the Internet, for example.

The operation of computer 331 and computer 332 is controlled primarily by programs stored in each computer's system memory and executed by each computer's processor 302. These programs typically include an operating system, and, in a preferred embodiment, also include digital rights management software for implementing a protected processing environment, such as that described in the '900 patent, in which electronic works can be securely handled, and the rules and attributes associated with the electronic works securely maintained and enforced.

In the illustrative embodiment shown in FIG. 3, computer 331 may possess an original electronic work 380 in main memory 304. Computer 331 may initiate a transfer of the electronic work 380 to computer 332 by exchanging certain authorizations and/or acknowledgements, e.g., as described above in connection with FIG. 2. In a preferred embodiment, if this process is interrupted or corrupted, at most one party will possess the original electronic work 380. Alternatively, neither party may possess the original 380. Upon completion of the transfer, computer 332 will possess the original work 380, while computer 331 may possess a copy of the original or nothing at all. If computer 331 retains a copy, the copy will be configured such that it cannot be passed off as the original to other members of the system (e.g., it will have associated with it an attribute indicating that it is a copy, whereas the original work 380 will have an attribute associated with it indicating that it is the original).

Figure 4:
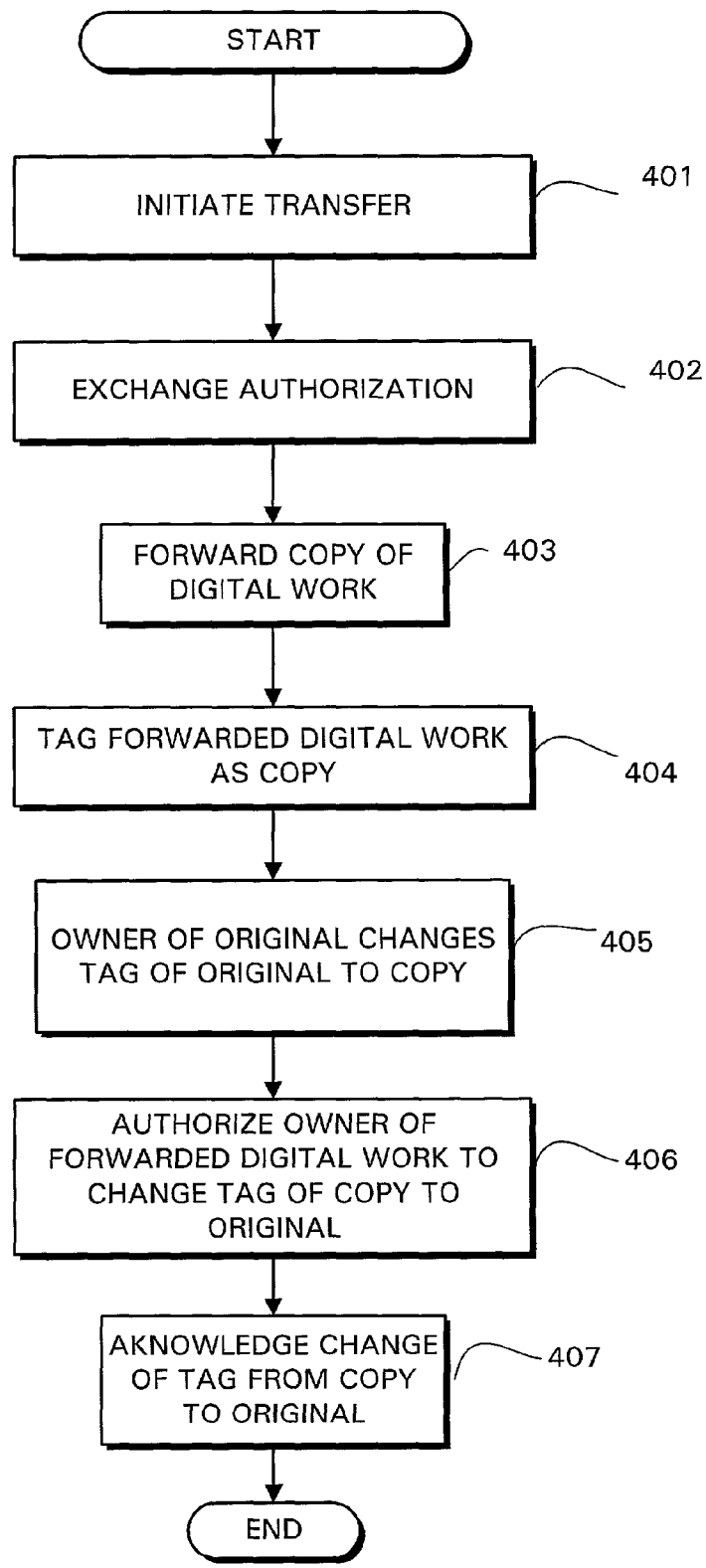
FIG. 4 is a flow diagram illustrating a method of transferring a digital work in accordance with an embodiment of the present invention.

FIG. 4 illustrates a method of sending an original work to a different location in accordance with another embodiment of the present invention. In step 401 the owner or potential buyer of an original electronic work initiates a transfer of the electronic work. In step 402 the parties exchange authorization and/or acknowledgement information to, e.g., securely identify themselves to each other. Next, the owner of the digital work forwards a copy of the digital work to the other party (403). The forwarded digital work is tagged as a copy (404). The owner/sender of the original digital work then changes the tag of its instance of the digital work from "original" to "copy" (405). Once tagged as a copy, the recipient is authorized to change the tag associated with its instance of the digital work from "copy" to "original" (406). In a preferred embodiment, the final transaction of the protocol is for the recipient to acknowledge to the sender that it has changed the tag from "copy" to "original" (407). Upon completion of the protocol, the recipient will possess the original work, while the sender possesses a copy of the original. However, the sender's copy (if any) will be such that it cannot be passed off as the original to other members of the system (e.g., it will have an attribute associated with it indicating that it is a copy, whereas the instance of the digital work that is in the recipient's possession will have an attribute associated with it indicating that it is the original). If the protocol is interrupted or corrupted, the communication is preferably terminated, and, as explained previously, preferably at most one of the parties will possess the original.

Although the foregoing invention has been described in some detail for purposes of clarity, it will be apparent that certain changes and modifications may be made without departing from the principles of the present invention. It should be noted that there are many alternative ways of implementing both the processes and apparatuses of the present invention. Accordingly, the present embodiments are to be considered as illustrative and not restrictive, and the invention is not to be limited to the specific details given herein.

APPENDIX A

Exemplary Authentication Protocols and Security Infrastructure

In general, it is desirable for a digital rights management (DRM) system to have the following characteristics:

Robustness. Resilience to attacks should be as high as possible without unduly jeopardizing functionality, user-friendliness, and/or implementation costs.

Fault-tolerance. The system should be able to recover from the compromise of any of its components.

Scalability. The system should be able to support large (or small) deployments.

Auditable. To support fault-tolerant, the system should be able to detect compromises.

Long-lived. The system should be able to provide the aforementioned functionality over a period of time, supporting older devices and content as time goes on and allowing the infrastructure to renew itself in a transparent manner.

In addition, a DRM system for portable devices or other relatively low-footprint components should preferably:

Be small & efficient. The infrastructure should be designed to allow a light implementation in the resource-constrained environment of a portable device.

Support for off-line operation. When a device is not interacting with any other device, its DRM should be able to operate in an isolated manner.

Support for off-line interoperation. Portable devices have the capability to interact among themselves. By their portable nature, this interaction may happen in off-line environments, i.e. where it is not possible or convenient to contact the security infrastructure. The system should be designed in such a way that portable devices are able to authenticate and validate each other when they are off-line.

Take advantage of differing levels of device security. In contrast to the PC environment, portable device implementations may have very different security characteristics (e.g. tamper-resistance). It would be undesirable to degrade the overall security to the level provided by the weakest device in the system.

Be simple to use. Portable devices are general consumer electronic products. Thus, the level of expertise needed to operate them should be relatively low.

Described below are systems and methods that can be used to fulfill some or all of the aforementioned goals. In particular, a security infrastructure is presented that is tailored to provide an efficient solution to the functional and security requirements of small-footprint, portable platforms for content consumption and digital rights management.

The systems and methods described below make use of some or all of the following technologies and/or components:

Public key cryptography. In a preferred embodiment, public-key cryptography is used to design the security infrastructure. Public key cryptography is advantageous because it:

is ideal for off-line operation, since it enables any two entities to authenticate each other without the active participation of a third party;

allows easy recovery from compromise; because it is possible to associate a unique non-shared key to each device, in case of compromise of a key, the damage can be efficiently limited and repaired;

allows out-of band object authentication;

enables entities to "sign" documents and other relevant objects.

Authorization certificates. An authorization certificate is a signed authorization for a given entity, directly represented by a public key, to perform a given action. By design, an authorization certificate includes the information required to be processed in order to authorize the action in question; once evaluated, there is no need to consult any other form of trusted service in order to grant or deny permission to perform the action. This is ideal for the unconnected, portable device environment, because the authorization certificates enable complete off-line trust management.

Typically, an entity may have more than one authorization certificate. As with security mechanisms based on ACLs (access control lists) a different certificate may exist for every action that we want to manage. This allows a policy-driven granularity for permissions or services to be granted. In addition, authorization certificates are "context-explicit": the domain where the authorization applies is specified in the certificate.

Finally, authorization certificates eliminate the need for formal identities. This may be regarded as a privacy enhancement; however, if required, formal identities can be supported.

Renovation certificates. The use of public-key certificates brings with it the problem of how to manage the infrastructure so as to "blacklist" a key that has been compromised. In a preferred embodiment, this problem is dealt with by using a combination of long-term certificates together with policy-modulated short-lived certificates called renovation certificates.

A renovation certificate can be thought of as a signed statement that revalidates and renews a certificate. A "normal" or long-term certificate will specify the need for the presence of a renovation certificate in order to be valid. A renovation certificate can be issued by a different public key than the issuer of the renovated certificate; this public key is specified within the renovated certificate. The renovation certificate's validity period is typically much shorter than that of the renovated certificate. This mechanism allows fine-grained risk management, without losing important time-related contextual information (e.g. the age of a device or its expected lifetime). By contrast with more classic validation methods, the renovation method does not require on-line checking for each verification performed, nor the periodic download of some form of CRL (Certificate Revocation List); the result is a considerable reduction in network traffic. Authorization and renovation certificates are two of the key concepts of a standard that is currently being developed by the SPKI (Simple Public Key Infrastructure) Working Group of the IETF (see http://www.ietf.org/html.charters/spki-charter.html). In one embodiment, use is made of SPKI certificates in the implementation of a security architecture.

Security Infrastructure

Overview

The security infrastructure of the present invention supports a security domain, which is formed by different entities performing different roles. The security domain can be structured as a tree, where the bottom nodes are the end-user devices and the top node is the "Root". The Root performs the role of maintaining the security domain by means of certifying its basic components. However, as we will see below, the Root does not directly certify all the members of the domain, nor do the members of the domain depend on it unconditionally.

The second group of entities are the "Renovators", which issue renovation certificates to lower-level entities. The Renovators' main role is to ensure the integrity of the security domain at any given time. Renovators populate the level of the tree directly below the Root.

Under the Renovators are the value-chain participants ("Content Providers" and "Clearinghouses"), the "Device Manufacturers" (or deployers) and the "Security Clearinghouses", which are in charge of auditing the integrity of the domain. All of these members form the second level of the tree. In one embodiment, Content Providers are the only entities in the system that are able to create content.

Finally, end-user devices ("Devices") occupy the third level of the tree. The Devices are linked to the security domain via the Device Manufacturers.

Together, the Root, the Renovators, the Security Clearinghouses, and the Device Manufacturers form the security infrastructure. All entities are linked together by long-term authorization certificates. These links are two-way, which allows the security domain to operate as a web-of-trust (see below).

FIG. A-1 is a block diagram of the architecture of the security domain in an embodiment of the present invention, in which simple solid arrows depict authorization certificates, simple dotted arrows depict renovation certification, and double arrows depict content, rights and audit record transfer.

As described herein, one advantageous application of the present invention is to a digital rights management system. Additional information on digital rights management systems can be found, for example, in commonly-assigned U.S. Pat. No. 5,892,900, entitled "Systems and Methods for Secure Transaction Management and Electronic Rights Protection," issued Apr. 6, 1999; U.S. patent application Ser. No. 08/699,712, entitled "Trusted Infrastructure Support Systems, Methods and Techniques for Secure Electronic Commerce, Electronic Transactions, Commerce Process Control Automation, Distributed Computing, and Rights Management," filed Aug. 12, 1996; U.S. patent application Ser. No. 08/689,754, entitled "Systems and Methods Using Cryptography to Protect Secure Computing Environments," filed Aug. 12, 1996; U.S. patent application Ser. No. 09/617,148, entitled "Trusted Storage Systems and Methods," filed Jul. 17, 2000; and U.S. patent application Ser. No. 09/628,692, entitled "Systems and Methods for Using Cryptography to Protect Secure and Insecure Computing Environments," filed Jul. 28, 2000, each of which is hereby incorporated herein by reference in its entirety.

Design Considerations

Security Model

In one embodiment, the guidelines of the security model include the following:

Limitation of compromise. Members of the security domain should be engineered so that they have as few security-related responsibilities as possible. In this way we can limit to the bare minimum the damage produced by the compromise of a single Device. Members of the infrastructure should be able to validate the responsibilities that have been officially assigned to any Device with which they are interacting. The system should be designed so that, as much as possible, they will not rely on statements that cannot be verified and authenticated.

Limitation of cross-compromise. The compromise of a given Device should not affect other Devices in any way more than is strictly essential to obtain the desired functionality. As there is no general rule to determine the precise reduction in security necessary to obtain a given functionality, a case-by-case analysis should be performed. For example, the fact that two front-end Devices perform a similar role, such as keeping and sending rights, should not allow the first Device to be the source of attacks on the second Device. The first Device should not be able to change the rights kept in the second Device totally at will, but rather in a manner that can be supervised and controlled by the two devices.

Efficient detection of compromise. The security architecture should be designed so that compromise of its elements is always anticipated. The first step in recovering from a compromise is detecting it. That is why an efficient and extensive compromise detection mechanism should be put in place. Care should be taken while engineering this mechanism, because it should not preclude the scalability of the domain and it should protect the data acquired from untrusted third parties.

Fast recovery from compromise. Once detected, compromised equipment should be removed from the trusted domain in a convenient way. This should be done, as much as possible, by using online mechanisms and protocols. When it makes sense, the replaced equipment should be introduced in a transparent way as well.

Recovery from Compromise

In a preferred embodiment, recovery from compromise is addressed at all levels of the architecture:

End-user Devices. In this area we face two different tasks:
  Discovering and invalidating maliciously compromised Devices.
  Supporting content and restoring rights for "lost" or "broken" Devices.

Content Providers. If a Content Provider is drastically compromised, we should prevent the provider from introducing new bogus content into the legal chain. However, we should support content previously released by this Content Provider, allowing it to continue to be valid in the chain. On the other hand, the compromise of its signature server should not require that a Content Provider be completely deleted from the legal chain and reintroduced as a completely new entity; this might produce a great deal of unnecessary confusion within the system.

Manufacturers. Manufacturers' facilities can be compromised as well, with the resulting introduction of series of bogus Devices. If care is not taken, this compromise can be performed so that the new Devices appear to have been produced before the compromise.

Security infrastructure members. The equipment running the security infrastructure and the secrets that allow them to perform their work may be compromised by a powerful internal attack. Recovery from this kind of compromise should be feasible and as painless as possible.

Portability

End-user Devices may, for example, include:

Portable Devices. This class of Devices will typically provide a high level of portability and variable processing capabilities, ranging from "dumb" MP3 players to full-fledged Windows NT devices. They should be able to operate when they are not connected to the network as well.

Portable memory. This class of Devices is inherently mobile. However, their processing capabilities are typically limited severely by the fact that they require a second Device to become active: namely, portable Devices should provide them with connectivity to the infrastructure. Portable memory may, for example, include the following classes of devices:

Dumb: Devices such as "Smart Media" will be supported and used as plain storage containers.

With third-party security add-on: Whenever possible, it's a good idea to support security features provided by third parties. However, the system's security model will preferably not depend exclusively on those features.

With proprietary security kernel: In a preferred embodiment, a small security kernel provided by the designer/architect of the security infrastructure is introduced in each portable memory, when possible. For example without limitation, the Rights/PD™ technology developed by InterTrust Technologies Corporation, 4750 Patrick Henry Drive, Santa Clara, Calif. could be used, and/or the systems and methods described in U.S. patent application Ser. No. 09/643,630, entitled Secure Processing Unit Systems and Methods, which is hereby incorporated by reference in its entirety.

Unconnected Devices. These are Devices such as some car stereos, which are not capable of readily-connecting with the networked infrastructure. This class shares some functionality and requirements with the class of "dumb" MP3 players. Other Devices should be able to provide them with means to contact the security infrastructure either in an indirect or a direct way.

It will be appreciated that end-user Devices may also include personal computers, set-top boxes, and/or virtually any other suitable device.

Scalability

In a preferred embodiment, at least three different types of scalability are supported:

Number of Devices and Device Manufacturers. The number of Devices manufactured by a given Device Manufacturer will preferably not be limited by the fact that it is a member of the security infrastructure. Similarly, the number of Device Manufacturers in a given security or trust domain should not be limited either.

Number of Content Providers and Clearinghouses.

Security infrastructure. The security infrastructure should support increasing numbers of Devices and equipment of other members of the security domain by scaling transparently without creating bottlenecks. The assignments between Devices and members of the security infrastructure should be dynamic, in order to cope with the need to scale smoothly.

Additionally, scalability of domains of trust should be considered as well. Security domains are commonly based on a central point of trust. It should be possible to scale a security domain by joining it with another security domain in a controlled way.

Support for Multiple Models

The security infrastructure and building blocks should be flexible enough to support several security models. For example, one business model may dictate that theft of content is less important than its falsification; this business model might require strong authentication of content. Another business model may dictate that theft of content is more important; in this case, extensive auditing measures may be required after the release of content.

Trust Management

The security models should support a flexible trust management scheme that can emulate the business models implemented by the industry. At the same time, the trust management scheme should be designed for ease of control and administration.

Two exemplary approaches to trust management are:
Top-down. All the entities in the security domain start by absolutely trusting a unique entity, which is typically called a Certification Authority. In turn, this entity designates other entities to fill certain relevant roles. All entities are forced to trust those entities in the designated roles, and they do not have any explicit mechanism to take part in the designating or decision-making process. The main drawback of this approach is that entities do not have control of which entities they trust. The main advantage of this approach is that is easy to implement and administer.

Web-of-trust (or bottom-up). Entities start by trusting themselves. Then they begin delegating trust selectively to those entities that they contact and decide to trust. To allow the model to scale, entities can choose whether they trust other entities to further delegate their own trust.

The main drawback of this approach is that is difficult to administer. The main advantage is that it has the potential to mimic the preexisting contractual relationships that the entities may have. In other words, it has the potential to emulate the actual business environment.

In a preferred embodiment, we propose a mixed approach that tries to achieve the main advantages of both approaches and none of their disadvantages. All entities begin by trusting themselves, and then they selectively designate other entities to trust, as in the web-of-trust model. However, a pre-existing infrastructure is already put in place, allowing them to bootstrap and administer their trust in an efficient manner, as in the top-down approach.

This infrastructure is initially composed of the Root and one or more Renovators. Its main role is to assign standard roles to entities, and to insure that the entities concerned have not been compromised and meet the requirements of their roles. However, the final decision on whether or not to trust a second party is subject to the trusting entity's local policy.

Legacy

The security models of the present invention are preferably designed to coexist with existing solutions. The level of integration with these solutions can vary broadly; however, general mechanisms are preferably put in place to support those interactions that are considered most likely to occur, such as:
interaction with existing DRM systems, such as the system produced by InterTrust Technologies Corporation for use on PCs;
interaction with X.509-based domains;
interaction with systems that use non-credentialed key-distribution schemes.

Public-key Standards

To promote widespread use of the system, it may be desirable to comply with industry standards for credentials or certificates, thus enabling third parties that comply with the standard to have a bridge to interoperate with the security infrastructure described herein as well. For example, the security infrastructure of the present invention can be used in connection with the standard that is currently being developed by the SPKI (Simple Public Key Infrastructure) Working Group of the IETF. On the other hand, it may be undesirable to limit the system's functionality or security by possible errors or shortcomings of the standard. Thus, as one of ordinary skill in the art will appreciate, it may be undesirable to follow the standards to closely for some applications.

Implementation Areas

Use of Public Keys

The use of global keys will generally be undesirable since it makes recovery from compromise difficult. Instead, a model where all Devices have one or more private keys is preferred. This allows the system to monitor and individually control each member of the domain. In addition, the likelihood of compromise of a global key can be expected to be orders of magnitude greater than the likelihood of compromise of an individual private key, simply because the global key is much more exposed. This is true even if both keys are protected using the same mechanisms.

Content Portability

When global keys are not used, the portability of content becomes an operational issue. Content then needs to be explicitly targeted to each one of the Devices that are going to consume it. However, by using multiple levels of keys, as illustrated in FIG. A-2, this operation can be performed in an efficient way, as it is only necessary to re-encrypt the content key. Furthermore, it is not necessary to deploy the content only from a centralized server; instead, a super-distribution model can be used. In this model each Device re-targets the content for the next one.

Portable Memory and Dead-end Devices

If a portable memory is smart enough to process content on its own then this portable memory will simply act as another portable Device. In order to transfer content using it, the content is re-targeted twice in the manner shown in FIG. A-2—once for the portable memory and once for the actual target Device. Dead-end Devices are those Devices that, because of their limited capabilities, cannot retarget content or rights to other Devices. A low-end a car stereo (that is limited in this way) is an example of this kind of Device.

Recovery Management

In one embodiment, recovery management is handled differently for at least three different classes of participants in the system.
Front-end Devices. The mechanism chosen is that of "Renovation of credentials" (as opposed to that of "Certificate Revocation Lists" or CRLs). In this mechanism, each Device regularly contacts a specific member of the security infrastructure called a Renovator. This contact takes place before the end of a validity period. This validity period is preferably relatively short, perhaps on the order of magnitude of a month; its length can be a tuneable parameter, one that may be set by parties that deploy systems in conformance with the security infrastructure of the present invention. When it is contacted by an end-user Device, the Renovator verifies the current status of the Device; if the Device is not known to have been compromised, the Renovator issues a credential, a "renovation certificate", that will allow the Device to interact with the rest of the infrastructure until the end of the validity period. Typically, a Device will request a new renovation certificate beginning halfway through the validity period. Renovators issue renovation certificates in response to valid requests.

This mechanism is particularly well suited for isolated operation, where the verifier of a transaction may be unable to access the security infrastructure network at the time of verification. Moreover, it imposes less management burden and cost than the classical CRL approach.

Value-chain members. In a preferred embodiment, the mechanism chosen for value-chain members is also that of "Renovation of credentials". As value-chain members are connected to the network, their certificates can be renovated much more frequently, thus offering a faster recovery from compromise, and thereby decreasing the potential damage. However, unlike front-end Devices, it will typically be desirable for these entities' identities (i.e., the structured information that allows third parties to recognize the entity) to survive a compromise of their equipment. Thus, in a preferred embodiment, their identity is only tied to a public key for a certain period of time; when an entity's equipment has been compromised or its key has expired, its identity is reassigned to a new key. The credential format supports this transparently.

Another problem is that of keeping existing content valid after a Content Provider's equipment has been compromised. In order to do this, each time a given Device receives and validates a new piece of content from a Content Provider, it signs the content, in effect asserting that at that moment, the Content Provider is valid. To re-target the content for a second Device, the Device revalidates this statement and forward it together with the content to the second Device. Upon receipt, the second Device re-verifies the signature made by the first Device as well as its credentials. If these credentials and the signature on the content are valid and coherent, the second Device re-signs the content, stating that it was valid at the time of the reception, and discards the previous signature made by the first Device. However, the initial signature and associated certificates of the Content Provider are not discarded.

Security infrastructure members. Thus far, the security infrastructure members are the Renovators and the Root. Renovators are renovated themselves by the Root with very short validity periods. Thus, a compromised Renovator can be extracted from the security infrastructure immediately. In one embodiment, the Root uses three mechanisms to protect against compromise:

Key sharing. A single private key is shared in a secure way among different machines. Even if several machines holding shares of the key are compromised, the attack will be unable to compromise the whole private key.

Double key. The Root simultaneously uses two keys. By signing a statement using both keys, the Root can replace one of its keys. The Renovators will automatically forward this statement to the other members of the security domain.

Dynamic Root assignment. Each member of the domain designates the Root independently. In case of absolute compromise, a new Root can be created and deployed manually for all members except the front-end Devices. For these Devices, the Renovators will do it automatically.

Deployment Management

Front-end Devices

A major logistical problem of deployment management is the deployment of the front-end Devices. In one embodiment, this problem is solved in a natural way that models the actual operation of the industry. Specifically, each Device Manufacturer is responsible for deploying its own Devices. In turn, the security domain's Root certifies each Device Manufacturer. As part of the Device certifying process, the Manufacturer installs in each Device information about its Manufacturer, the Manufacturer's Root's initial certificate, and the manufacture's Device certificate. The Manufacturer's Device certificate includes a secured statement designating which Renovator should issue the renovation certificates for this concrete Device. Once a Device is successfully deployed (e.g., sold), the Renovator is notified. At this point, the Renovator begins to issue renovation certificates upon request from the Device.

Value-Chain Entities (Service Providers and Clearinghouses)

Value-chain entities are preferably deployed following traditional contractual agreements. Once the contracts have been successfully signed, an out-off-line certification process occurs. As a result of this process, the entity will have a certified unique key pair, a unique identity relative to the Root, and an assigned Renovator. Upon request from the entity in question, the Renovator will issue the mandatory renovation certificates.

Security Infrastructure

As describe thus far, the entities that form part of the security infrastructure are the Root and the Renovators. The Root is deployed beforehand. However, as stated above, this does not imply that this entity cannot be changed a posteriori; it is just that it is much more convenient to do it in this way.

Once the Root is deployed, the Renovators are deployed. This can be done dynamically as needed. If a Renovator becomes too busy, the infrastructure can be scaled up, for which there are two major options: (i) strengthening the implementation of the overloaded Renovator, and/or (ii) adding a new Renovator that will take over some of the overloaded Renovator's responsibilities. On the other hand, it is possible to change the assigned Renovator for a value-chain entity automatically. This can also be done with the front-end Devices; however, this will typically require additional overhead.

Fraud Detection

As stated above, fraud detection is an important part of preserving the integrity of the security domain. In one embodiment, fraud detection is primarily performed using secure auditing. The goal is to audit all the transactions that occur between compliant devices (including the Service Provider equipment). The auditing is preferably double: both Devices that take part in a transaction report the transaction.

If one of the Devices has been compromised and does not perform mandatory auditing of its side of the transactions, the system will be able to detect the condition and act upon it.

However in one embodiment, security auditing is not attempted on every instance of content usage. After all, this will not be reported in the first place by a device that has been compromised. Moreover, this could create a significant overhead, as we can already foresee that content consumption can be expected to occur much more often than the transfer of content and rights between Devices.

In one embodiment, the security audit records are collected by a new class of entities, the "Security Clearinghouses", which are the last members of the security infrastructure. The security audit records are only intended to preserve the integrity of the security domain; they will typically not be disclosed to other entities such as Content Providers or regular Clearinghouses.

To reduce the huge amount of work required, the tracing is preferably done on a per-content basis. Each Content Provider will have assigned a Security Clearinghouse that will be in charge of collecting and verifying the integrity of its related transactions. As stated above, in one embodiment the audited transactions are:

- Content re-targeting. This allows a determination to be made of how many (and which) Devices a given Device is targeting content to. Naturally, if a "normal" end-user Device is re-targeting content to a huge set of third party Devices, then this class of auditing can raise suspicion of improper behavior.
- Rights creation and transfer. This allows rights to be traced, and more specifically, facilitates the detection of rights that have been illicitly created from scratch.

Upon detection of fraud, the Security Clearinghouse notifies the appropriate Renovator of the compromise, and the Renovator takes the appropriate measures. (In one embodiment, the Renovator is identified in the information provided by the front-end Device along with its audit records.)

Depending on transaction volume, a particular Security Clearinghouse may deal with more than one Content Provider, with all of the content issued by one Content Provider, or with a subdivision of the content issued by one Content Provider.

As a batch procedure, the Security Clearinghouse notifies the appropriate Renovator if it is holding valid rights for a given Device. This is used for the rights-restore procedure described in the next section.

Backup/Restore

As a result of the security auditing process, the Security Clearinghouses automatically perform backup of Devices' rights. The mechanisms that support a complete rights restore operation are as follows.

- Content lost.
  - Pure dynamic rights content: Have the Content Provider produce a new retargeted-copy of the content. The stored rights will be reused with this new copy of the content.
  - Non-pure dynamic rights content: Apply the "rights lost" procedure described below.
- Device lost. Notify the Renovator of the loss of the Device. With a proof of ownership of the lost Device, obtain a rights reassignment certificate for a new Device. Together with this certificate, the Renovator will provide information about which Security Clearinghouses actually hold valid rights for the invalidated Device.
  - With the new Device, contact each one of the Security Clearinghouses listed in the information provided by the Renovator.
  - Then the Device will present the rights re-assignment certificate to the Security Clearinghouse. The Security Clearinghouse will provide in return the re-assigned rights to the Device.
- Rights lost. Contact the Renovator to obtain the list of Security Clearinghouses hosting valid rights for the Device. Contact each one of the Clearinghouses requesting rights restore. In case the rights were static, linked to an encoded content file (e.g., SCIF), a special certificate will be issued stating that the lost file should be restored by the appropriate Content Provider.
  - For lost static rights files, submit the certificate provided by the Security Clearinghouse to the Content Provider, who in return will re-target a new copy of the file.
  - As a last measure, the Renovator monitors how many restore operations a given Device requests. If the number of requests overpasses a policy-driven threshold for a given period, the Renovator will deny the restore operation or further renovation certificates.

Privacy

It is important to differentiate the information that is gathered and maintained for security reasons from the information that is intended to be consumed by the Content Providers and/or financial entities.

The former class of information is recompiled and maintained by the system operator's fully proprietary systems or by especially sub-contracted third parties. Apart from the aforementioned entities, the recompiled information is preferably not disclosed to any third parties other than the concerned end-users.

To obtain information related to content consumption, the classical Clearinghouses should be used. The same is true for the financial transactions.

In a preferred embodiment, a new engine is incorporated into each Device to help end-users deal with those operations that can have some implications on their privacy: The Privacy Policy Resolver Engine (PPRE).

Whenever a control requests to obtain information about its environment, the local PPRE will be consulted. The PPRE will consult its database in order to resolve if the operation can be permitted or not. It is the user's responsibility (with the help of the PPRE) to maintain the PPRE's database.

Finally, once the control has obtained all the information, it will create an audit record targeted to the appropriate Clearinghouse(s). Before the transaction is committed, the PPRE will be consulted for user acknowledgement on the final audit record issuing operation.

Key Management

In one embodiment, front-end Devices, value-chain participants, and security infrastructure members equipment each have their own set of private-public key pairs.

These keys are deployed on a per-case basis:

- Security infrastructure members (Renovators). They create their own key pair. Afterwards, the corresponding public keys are interchanged with Root using offline protocols (where "off-line protocols" denotes protocols that are not supported by this security infrastructure). Any fairly secure system that is already in place can be used instead of a pure off-line procedure. Once this has been done, the corresponding certificates will be issued.

Security infrastructure members (Security Clearinghouses). They create their own key pair. Afterwards, the corresponding public keys are interchanged with the Root using offline protocols. Once this has been done, a Renovator is assigned to the entity and the corresponding certificates will be issued.

Value-chain members. They create their own key pair. Afterwards, the corresponding public keys are interchanged with the Root using offline protocols. Once this has been done, a Renovator is assigned to the entity and the corresponding certificates will be issued.

Manufacturers. A specific Device Certifying Server (DCS) is installed in each Device deployment facility. This server will be pre-initialized with the Root keys, a Master Manufacturer key, and the corresponding certificates. This Master key will be used to certify the Devices' series keys, which will be communicated to the Root, who will issue certificates for them. A Renovator will be assigned to each Device Manufacturer; however, this assignment may be changed dynamically.

Devices. The Device's keys may be created by the Device itself or may be provided by specific initializing equipment. Whatever the method used to obtain the keys, the Devices preferably communicate the corresponding public key to the Manufacturer's DCS through a physically secure channel using a non-secure protocol. Each Device will be assigned to a Manufacture's series key and a Renovator (normally always the same one). Finally, the Manufacturer's series public key will be downloaded to the Device together with the corresponding Manufacturer, Root, and Renovator certificates.

In one embodiment, all the entities have absolute identifiers, which are their respective public keys. Non-Device entities have relative identifiers as well, which are maintained by the Root (because they are relative to the Root). The Root certificates provide the link between relative and absolute identifiers. Entities have relative identifiers in order to allow them to change their public keys during their lifetime. In fact, the mechanism is set up in such a way that even the Root can change its keys dynamically.

In one embodiment, the procedure used to change the entity's public keys depends on the entity class. In particular:

Root. The Root can change one of its keys at a time. To do so, it signs a self renovation certificate with both keys, stating which key will be replaced and with which key it is replaced. Afterwards, the Root generates new certificates for each member of the infrastructure to whom it directly controls membership (Renovators, Security Clearinghouses, Content Providers, Clearinghouses and Manufacturers). The self-renovation certificate and the corresponding certificates are then deployed though the whole security domain using the Renovators.

Renovators. The new keys are communicated to the Root using an offline protocol. The Root will issue the corresponding certificates, which will be forwarded to the rest of the dependent entities as a result of the normal operation.

Security Clearinghouses. The new keys are communicated to the Root using an offline protocol. The Root will issue the corresponding certificates, which will be forwarded to the rest of depending entities as a consequence of the normal operation.

Value-Chain Members. The new keys are communicated to the Root using an offline protocol. The Root will issue the corresponding certificates, which will be forwarded to the rest of the depending entities as a result of the normal operation.

Manufacturers. The manufactures constantly change their series keys, so it is not necessary to do anything specific apart from the normal key deployment operations.

Operations

In one embodiment, a minimal set of participants consisting of the Root, a Renovator, a Content Provider, and two or more pre-initialized Devices are used to obtain a functional environment. In another embodiment, a Security Clearinghouse, a Clearinghouse, and a Device Manufacturer are added to provided additional functionality.

Operations of the Security Infrastructure

In addition to operations directly related to managing protected content and associated rights, other operations are related to managing the security domain.

Renovators

The renovator-based certificate support infrastructure is preferably flexible and scalable. To this end, the system should preferably allow for the addition or removal of Renovators, as well as the ability to split the population of entities for which a Renovator is responsible.

To add a Renovator, all the necessary modules and equipment are installed, and then a public key pair is created. Once that is done, an out-of-band secure public key exchange is performed with the Root. (The user interface can provide means for this exchange in both the Root controlling module and the Renovator.) As a result, the two entities will certify one another, and from that point initiate the secure renovation and information exchange protocols.

If the population of entities for which a Renovator is responsible grows too large, the following procedure can be followed:

Create a new Renovator and add it to the security Domain (e.g., as described above).

Notify the Root about those entities that will be transferred to the new Renovator. The Root will create new certificates for them accordingly.

Notify the affected Devices' Manufacturers. They will create new certificates for the Devices already deployed indicating the new Renovator.

The old Renovator's database entries related to the transferred Devices will be transferred to the new Renovator.

Upon contact by the Devices' and entities' equipment, the old Renovator will forward to them the corresponding new Root or Manufacturer's certificates.

The affected Devices and entities equipment will contact the new Renovator and proceed as usual.

When a Renovator's main equipment is compromised, it should notify the Root about the compromise. The Root will deny to the compromised Renovator equipment further renovation certificates (Renovators are renovated by the Root). Finally, after the new Renovator equipment is set up, the new key will be introduced to the Root, who will certify it and will restart issuing renovating certificates for it. In one embodiment, no other member of the domain are involved in this operation. The new key is automatically updated to the equipment of all dependent Devices, Service Providers, and Clearinghouses.

If it is desired to totally remove a Renovator, the recommended way to proceed is as follows:

The "old" Renovator notifies the Root about it.

The Root assigns a new Renovator as a substitute for the entities that the "old" Renovator was controlling and communicates its decision to it. Next, the Root forwards to the "old" renovator the new certificates specifying the new Renovator.

The removed Renovator notifies the affected Device Manufacturers.

The Device Manufacturers create new certificates for the Devices with the new Renovator. They send that information to the "old" Renovator.

The "old" Renovator transfers all information contained in its database about the controlled Devices and entities' equipment to the new Renovator.

Upon contact by the Devices and value-chain entities' equipment, the "old" Renovator forwards the new Root and Manufacturer's certificates.

The Devices and value-chain entities' equipment contact the new Renovator and proceed as usual.

Security Clearinghouses

To add a Security Clearing House, the necessary modules and equipment should be installed and a new public key pair should be created, followed by an initial out-of-band secure public key exchange. (The user interface can provide means for this exchange in both the Root and the controlling module of the Security Clearinghouse.) As a consequence, the two entities will certify one another. Once that is done, the Root will register the Security Clearinghouse in its Database and will assign it to a Renovator. Next, the Root will provide the Security Clearinghouse with its certificate, which will include the assigned Renovator. Finally, the Security Clearinghouse will contact the renovator to obtain its corresponding renovation certificate and start performing its task.

When a Security Clearinghouse's equipment is compromised, the Renovator should be notified. Once that has been done, a new public-key pair is created and the new public key is communicated to the Root. The Root issues a new Certificate for the Security Clearinghouse and notifies the assigned Renovator of the new valid equipment. From that point, the new Security Clearinghouse equipment will operate as usual.

In one embodiment, it is not possible to remove a Security Clearinghouse completely. If a Security Clearinghouse is severely compromised, its functions are performed by a new Security Clearinghouse to which the system assigns the same name. The recommended procedure is as follows:

Move all Database entries to the new Security Clearinghouse.

Assign a new public-key pair to the new Security Clearinghouse, following the procedure above for assigning a new key to an existing Security Clearinghouse in case of equipment compromise.

Value-chain Participants (Content Providers and Clearinghouses)

To add a value chain participant, any required modules and equipment are installed and a public key pair is created. Once that is done, an out-of band secure public key exchange is performed with the Root. The Root assigns a Renovator to the new entity and issues the corresponding certificate, which is forwarded to the new value-chain participant.

When a value-chain participant's equipment is compromised, the Renovator is notified. Once that is done, a new public-key pair is created and the new public key is communicated to the Root. The Root will then issue a new Certificate for the value-chain participant and it will notify the assigned Renovator of the new valid equipment. From that point, the new value-chain participant equipment will operate as usual.

A value-chain participant can be removed completely simply by notifying the assigned Renovator.

Device Manufacturers

To add a Device Manufacturer, any required modules and equipment are installed. Once that is done, the modules will create an initial public key-pair. This public key will be sent to the Root, which will add it to its database. The Root will send its corresponding public keys to the Manufacturer along with a Renovator identifier.

For each series of Devices, the Manufacturer preferably creates a new key pair. The public key of each key pair is signed with the equipment Manufacturer's main public key and communicated to the Root. In turn, the Root issues a certificate for the new public key.

To remove a Device Manufacturer, the Manufacturer's main public key is eliminated from Root, and all concerned Renovators are notified to stop issuing renovation certificates for the Manufacturer's deployed Devices.

Adding/Removing a Device

To add a Device, the Device Manufacturer initializes it and creates a certificate for the corresponding public key with one of its series public keys. Next, it will introduce the corresponding certificates for the Device Manufacturer and the Root. Finally, the Device will contact the assigned Renovator and obtain both the Renovator certificate (issued by the Root) and the renovation certificate.

A Device can be removed simply by notifying the corresponding Renovator, which will stop issuing renovation certificates for it.

Migration of Content from Other DRM Systems

Content may be deployed in a variety of formats. For example, content may be deployed in the format used by the security infrastructure (e.g., the SCIF format produced by InterTrust Technologies Corporation), or may be deployed in some other format (e.g., the DigiBox container format, also produced by InterTrust Technologies Corporation).

In the first case, the content is deployed as an instantiation of the generic peer-to-peer content and rights transfer protocol. In the second case, content is first converted to the format used by the security infrastructure. This can be done in a variety of ways, for example, a trusted server can perform the conversion on demand, and/or local rights management software can perform the conversion.

If a trusted server is used, it should be a controlled trusted Device. The trusted web server is simply upgraded to the role of Content Provider. From the Devices point of view, this case is implemented as if the web server were a pure Content Provider. However, the web server may need to be a hybrid piece of equipment, supporting both the content formats.

If content is redistributed by the client (i.e., the second option described above), it will generally be desirable to restrict and control the entities that can deploy/create protected content (that is the reason for the existence of the Content Providers in the first place).

Clearinghouses

FIG. A-3 is illustrates the architecture of an exemplary Clearinghouse in accordance with an embodiment of the present invention. Although the communication between a Device and the Clearinghouse can be accomplished in any suitable manner, the communication protocol that is used will preferably be relatively simple and secure. In one embodiment, communication between a Device and a Clearinghouse is accomplished via a direct contact through a TCP/IP network. In another embodiment, the communication between a proxied Device to a Clearinghouse uses the assistance of a gateway application to enable it to be proxied through firewalls. However, the security of the protocol does not rely on the gateway application.

Modules

The structure and operation of various system modules will now be described in more detail. Unless otherwise noted, the various modules can be implemented using virtually any suitable technology.

The Root Infrastructure

In one embodiment, the Root comprises a ring of computers running on different hardware/software platforms, thus protecting the integrity of Root's signing key. Using a specific algorithm, each computer will have a share of the Root's private key. The compromise of one of the computers does not compromise the private key.

Moreover, in one embodiment the Root will have two completely different private keys. If one of them becomes outdated or totally compromised, there is a mechanism that allows the Root to substitute it in a controlled way with another one.

In one embodiment the Root will have a database where it will hold all the directly certified entities' public keys and status. The directly certified entities are:

Renovators.
Security Clearinghouses.
Content Providers.
Clearinghouses.
Device Manufacturers.

Both, main public keys and all known series keys will be stored.

The design of the Root thus has the following properties:

Highly resistant to "physical " attacks. The private keys of the Root are spliced among several computers, each one to be of a different class. The private keys are not restored into a single location. Instead, the computations using them are performed separated as well. The union of the computations performed by all the computers carries on the private key computation.

Highly resistant to cryptographic attacks. The Root will have two simultaneous valid "big" public keys. Only one of them will be continuously used, which will help to limit the attacks to which the other is exposed. The Root will occasionally generate another public key that will be deployed using a special statement signed by both current public keys. This will help to limit the amount of time that a given key is exposed to compromise. If, nevertheless, one of the two keys gets compromised at any given time, the same usual procedure can be used to create a new key and deploy it to replace the compromised key.

FIG. A-4 depicts the architecture of the Root in accordance with an embodiment of the present invention. Additional information about the structure and operation of the Root—and the Root's key sharing and managing mechanisms in particular—is provided below.

The Renovators

In one embodiment, a Renovator simply comprises a logically single device and an associated Database. The Database holds information about all the Devices and entities' equipment that is under the Renovator's responsibility. Each entry is keyed by the Device's or equipment's public key and contains additional information about the entity's current status and some control fields that are used to prevent device cloning. FIG. A-5 is an illustration of a Renovator's architecture in accordance with an embodiment of the present invention.

The Security Clearinghouse

In a preferred embodiment, the Security Clearinghouses are based on the "normal" Clearinghouse architecture shown in FIG. A-3. However, because their database information will be actively used in order to monitor the integrity of the security domain, several modules are preferably added. These modules may include:

The Database Analyzer. It explores the database continuously searching for incoherence.

The Device Rights Database Restore Manager. Manages requests for restoring the Devices' rights databases.

The Incidence Reporting Module. Reports to the Root and the Renovators any incidents that requires attention.

FIG. A-6 illustrates the structure of a Security Clearinghouse in accordance with an embodiment of the present invention.

The Manufacturer's Certification Module

The Manufacturer's Certification Module is preferably installed in each Manufacturer's Device deployment facility. This module is in charge of representing the Device Manufacturer to the Root and certifying the deployed Devices. As the initialization of Devices may change between the different classes and models of Devices, in one embodiment an isolation layer is structured in such a way that only a single module has to be changed depending on the Device type.

FIG. A-7 illustrates the structure of a Manufacture's Certification Module in accordance with an embodiment of the present invention.

The Device's Security Kernel

Each Device will have a security kernel (sometimes referred to herein as the "PRIME" kernel) and content handling library and a set of client applications that consume the content. FIG. A-8 depicts certain modules of the security kernel most relevant to the discussion of the present invention.

Content Provider

In one embodiment the Content Provider architecture is created on top of the plain security kernel. Nevertheless, the implementation of this Kernel should be optimized for speed and will typically have a different set of initializing operations. Together with the Security Kernel, the Content Provider will have several modules dedicated to content creation and deployment. Several databases may also be included, for example:

Configuration Database. Contains information regarding Security Clearinghouses and monitoring/financial Clearinghouses.

Deployed Content Database. Contains information regarding the content that has already been deployed and the rights granted for it.

Controls Database. This optional module holds the set of controls that the Content Provider usually associates with the content.

FIG. A-9 illustrates the structure of a Content Provider Module in accordance with an embodiment of the present invention.

Certificate Structure

The following is a description of a certificate structure for use in connection with the system described above. Although any suitable certificate structure could be used with the infrastructure of the present invention, the certificate structure described below advantageously fulfills many of the design goals for a secure system. Thus, it will be appreciated that the certificate structure described herein can be advantageously used in the context of security infrastructures and systems other than those set forth above.

Embodiments of the certificate structure described herein are advantageously designed to facilitate satisfaction of some or all of the following system requirements and/or design goals:

Security.
> High reliability and renewability for both Devices and supporting infrastructure.
> Isolated operation (no dependence on out-of-band information stored and managed elsewhere). It should be possible to achieve interoperability between two Devices that have never meet before and that are not connected to the infrastructure at the moment of the interaction. In one embodiment, this condition is met by the union of the concepts of cryptographic public-key technology and cryptographic certificates.

Limited computation power and storage capabilities.
Scalability to support a large number of devices.
Ability to strictly control access to protected information.
Ability to verify copyright information on content.
Ability to associate rights creation with the content creator.
Ability to designate target consumer Devices/end users.

Basic Design Principles

Given these goals and requirements, the basic design principles for the certificates and the supporting infrastructure are:

Easy to operate. The amount of abstraction carried by a certificate should be small and thus easy to operate with, either in isolation, or in conjunction with other certificates.

Small sized. The syntax supporting the certificate should be small and as simple as possible. Not only the certificates should be small, but the code to interpret them should be small as well.

Explicit support for off-line operations. Certificates can be seen as a specific kind of messages to be interchanged between a prover and a verifier. As neither entity may be connected—or even connectable—to the supporting infrastructure at the moment of the interchange, a certificate evaluation should not require the verifier to immediately contact the infrastructure.

Scalability. The scalability of the infrastructure sustaining the certificates should be explicitly supported. Single bottlenecks should not be created in the infrastructure as a secondary effect of supporting the certificates.

Renewability. In a long-lived solution it is critical to be able to renew the infrastructure and to enable it to recover from successful attacks. The certificate structure should support these capabilities.

Flexibility. The structure should be flexible enough to support future extensions. The semantics and syntax of the certificates, while simple, should support future or proprietary extensions in the most transparent manner.

Infrastructure Description

FIG. A-10 illustrates the operation of a system that uses the certificate structure of the present invention. Referring to FIG. A-10, small arrows depict direct physical interchanges, and wide arrows depict data interchanges. For clarity, end-users, content creators and other value chain participants are not depicted. Additional details regarding this and other exemplary systems are set forth above.

The Portable Device and Portable Media manufactures create the PD & PM devices within their secure premises. During that process the private keys to be enclosed in those devices are created and certified.

Content Providers package their content in a format supported by the system. For example, in some embodiments, content is packaged in the DigiBox® container format developed by InterTrust Technologies Corporation for use with InterTrust's InterRights Point® digital rights management software. Content may alternatively, or in addition, be package in the Secure Content Interchange Format (or SCIF) developed by InterTrust for use in connection with Inter-Trust's Rights/PD software for portable or small-footprint devices. However, one of ordinary skill in the art will appreciate that the systems and methods of the present invention can be used in conjunction with any suitable content-encoding format and/or rights management system.

Interactions between portable Devices may occur on-line (which means that at least one of the devices can contact the infrastructure) or off-line. Additional information regarding an exemplary security infrastructure is set forth above. FIG. A-11 illustrates an embodiment of such a security infrastructure for purposes of facilitating reader comprehension. In FIG. A-11, links represent certificates between entities, and dashed links represent short-term certificates.

Phased Deployment

The system shown in FIG. A-11 is relatively complex, and may, in practice, take several development cycles to deploy due to the degree of coordination that such a system may entail among multiple parties. In contrast, FIG. A-12 illustrates a system which can be more readily achieved in just one development cycle. The scenarios shown in FIGS. A-11 and A-12 are backwards and forwards compatible. For ease of explanation, the scenarios shown in FIGS. A-10 and A-11 will be referred to as phase 2 scenarios, while the scenario shown in FIG. A-12 will be referred to as a phase 1 scenario.

Certificate Semantics

In one embodiment, the certificate semantics are based on the SPKI standard for certificates and are chosen to fulfill the aforementioned requirements and to enable the following operations in a natural manner.

Basic Operations

Basic operations are those that the security infrastructure is intended to support. They are mostly related to distribution and movement of content and rights. In one embodiment, there are at least two classes of basic operations:
> Device-to-Device interactions
> Device-to-Content Provider and Device-to-Clearinghouse interactions Mutual Trust Evaluation Between two Front-End Devices Devices interoperate to interchange content and rights between them. In one embodiment, two trust operations are performed when two Devices interact:
> The source Device evaluates the eligibility of the target Device to receive the content and/or rights;
> The target Device evaluates the integrity of the source Device to verify that it did not tamper with the content and/or rights.

Mutual Trust Evaluation Between a Front-End Device and a Service Provider

Devices interoperate with Service providers to obtain content and rights and to clear audit-records. As above, two trust operations should be performed for every interaction.

When the Service provider is a Content Provider, these are:
> The Content Provider should evaluate the eligibility of the target Device to receive the content and/or rights.
> The target Device should evaluate the integrity of the Content Provider in order to ensure that the content created (provided) by it is not illicit.

When the Service provider is a Clearinghouse, these are:
The Clearinghouse should evaluate the integrity of the source Device when receiving the audit records.
The source Device should evaluate the integrity of the Clearinghouse in other to evaluate its eligibility to clear the audit records.

Infrastructure Related Operations

Use of a typical security infrastructure may involve performance of some or all of the following operations:
Renovator registrations (Phase 2)
Content Provider & Clearinghouse registrations
Device manufacturer registrations
Device creation
Renovators renovations (Phase 2)
Content Provider and Clearinghouse renovations (Phase 2)
Device renovations (Phase 2)

Of these, only the renovation operations are in-band online operations. There are explicit semantic constructions in the certificate language to support all the online operations.

Mechanics of a Trust Evaluation

Each time two entities inter act there is a mutual trust evaluation. Trust evaluation is set up to determine if the pairing entity (requester) can be trusted to perform a given operation (request) in the domain of operation of the trusting Device (requestee).

Entities are represented by principals (public-keys). Normally a given entity only controls (because it posses the corresponding private key) one principal; however, in some instances a given entity may control more than one principal. Whichever the case, in a preferred embodiment, each entity is identified by one principal.

The trust evaluation engine can be seen as an automatic theorem-verification machine. The theorem to be proved is the ability of the requestor to perform a given operation with the permission of the requestee. The certificates (or signed assertions) constitute the proof of the theorem.

The trust evaluation engine can be represented by following function:

Trust (Requestee: Principal, Requestor: Principal, Request: Operation, Proof: Assertions): Boolean Each one of the assertions (e.g., a certificate with the signature striped out) can be seen as a directed edge between the issuer and the subject(s) authorizing a certain set of operations. There are three basic variations of assertions:
Authorization only assertions. The issuer principal is authorizing the subject principal to perform a given operation set; however, the subject principal cannot further authorize any other principal to perform that operation (with the issuer permission). We will represent this in the following figures as:

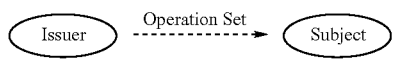

When represented as a graph, we call this kind of assertion a "terminator".
Delegation and authorization assertions. The issuer principal is authorizing the subject principal to perform a given operation set. It is also authorizing the subject principal to further authorize any other principal to perform that operation (with the issuer permission). We will represent this in the following figures as:

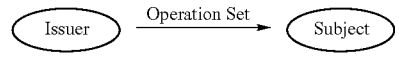

K of N delegation and authorization assertions. The issuer principal is authorizing the subject principals to re-authorize a given operation set if K of the subject principals (there are N of them) agree in which principal they are re-authorizing. We will represent this in the following figures as:

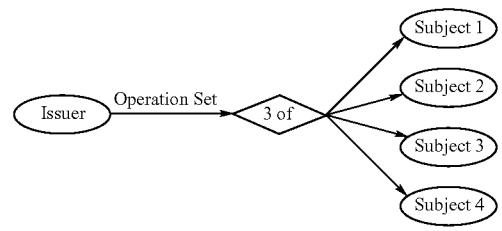

We can represent all the assertions involved in a given proof as a graph. In that representation, we can see the trust verification engine as a "path-finder" between the requestee and the requestor. If the set of operations represented by each edge in the path contains the requested operation and none of the edges except the last ones are a terminator then the request is evaluated as valid.

FIG. A-13 is an example of a graph authorizing the principal A to perform operation R in B's domain of operation.

An Action Language

Following SPKI, operations (requests) are represented by s-expressions and atoms of s-expressions. Examples of atoms are:
create-audit-record
get-renovated-as-device
Examples of s-expressions are:
(read-file /home/name/*)
(create-content "MusicCo" "The certificate march")
There is a specific language whose objective is to specify the set of operations that each assertion is authorizing. We will call that language the "action" language. In SPKI, the action language has the following primitives:
Any: Any operation is contained in this set. (Represented as a "*" in SPKI syntax.)
Atom: The operation directly represented by it. (Represented as a binary string in SPKI syntax.)
Atom-Prefix: All the operations represented by an atom that must have the provided string as a prefix. (Represented as a "(*-prefix [atom])" in SPKI syntax.)
S-expression: The operations represented by the s-expression or any specialization of it.
The members of the s-expression are other action primitives. (Represented as a "([atom] [list])" in SPKI syntax.). An s-expression A is considered to be a specialization of an s-expression B if the B is a prefix of A (all the elements of B are present as initial elements of A in the same order).
Set of: All the operations contained in the set. The members of the set are other action primitives. (Represented as a "(*-set [list])" in SPKI syntax.)
Range of: All the operations represented by the atoms that are in the specified range. The range specification can be alphabetic, numeric and time-based. (Represented as a "(*-range [order-type] [low-limit] [high-limit])" in SPKI syntax.)

Examples of instances of Actions are:

get-renovated-as-device (*-set create-audit-record get-renovated-as-device)

(read-file)

(create-content Universal)

(*-set (create-content Universal)get-renovated-as-service-provider)

Phase 1 Certificate Configuration

As mentioned above, phase 1 represents a minimal security infrastructure that will enable Devices to be bootstrapped into the world of public-keys and certificates in a forward-compatible way. FIG. A-14 depicts a certificate infrastructure for phase 1. Referring to FIG. A-14, edges are labeled with abbreviations of the operations they represent. For example, L stands for "ReceiveContentPhase1" and D stands for "CreateContentPhase1".

In one embodiment, phase 1 configuration is independent of phase 2; however, the trust engine and the certificate syntax and semantics are the same. This enables a scenario where a given Device or Content Provider can participate in both Phase 1 and Phase 2 configurations.

In one embodiment, only the two following trust evaluations are performed in the phase 1 configuration:

Content Provider evaluating eligibility of the Device for receiving Phase 1 content. FIG. A-15 depicts a sub-graph of this process.

Device evaluating the Content Provider as a good Phase 1 content creator. FIG. A-16 is an example of a sub-graph that enables this to happen. Referring to FIG. A-16, "device 0" authorizes "spv 0" for "create content Phase 1". The principal "mfg to root 0" is directly controlled by the Device manufacturer entity.

In Phase 1 all certificates are, a priori, valid "forever"; however, when these certificates are mixed with Phase 2 certificates some of them will have a validity period. A detailed explanation on how the validity period for a given certificate (or graph) works is given below. In any case, Phase 1 only Devices do not have a notion of secure clock, so we will not consider the validity period on the certificates in this introduction.

For this phase, each Device will carry four certificates:

Two to allow the Device to be authorized by the root to receive protected content phase1:

(issuer root0) (authorize-and-delegate device-manufacturer0) (receive-protected-content-phase1)

(issuer device-manufacturer0) (authorize device0) (receive-protected-content-phase1)

We will call these "Device from root" certificates.

Two that allow the Device to authorize the root as a valid designator of who can create protected content phase1:

(issuer device0) (authorize-and-delegate mfg-to-root0) (create-protected-content-phase1)

(issuer mfg-to-root0) (authorize-and-delegate root 0) (create-protected-content-phase1)

We will call these "Device to root" certificates.

The service-provider will carry only two certificates:

One that allows the service-provider to be authorized by root to create protected content phase1:

(issuer root0) (authorize spv0) (create-protected-content-phase1)

We will call this "Content Provider to root" certificate.

One that allow the Content Provider to authorize root as a valid designator of who can create protected content phase1:

(issuer spv) (authorize-and-delegate root0) (receive-protected-content-phase1)

We will call this "Content Provider from root" certificate.

In this phase, the network protocols will be quite simple: For each interaction between a Content Provider and a Device, both entities will interchange their "from root" lists of certificates. Once that is performed, each entity will link its "to root" with the received "from root" and use it as a proof for the trust engine. This will allow them to mutually authorize the corresponding operations: "receive-protected-content-phase1" and "create-protected-content-phase1" as depicted in FIGS. 15 an 16.

Phase 2 Certificate Configuration

Phase 2 scenario is more complex than Phase 1; however, the underlying trust engines used to evaluate the new certificates in Phase 2 are preferably the same as the ones used in Phase 1.

Two basic components that are introduced into Phase 2 scenario are:

The renovators. The renovators are in charge of scaling up the workload generated when insuring the continuous integrity of the members of the security domain so requires.

The notion of secure time. This is fundamental to the problem of determining which certificates are valid at a given point in time.

As renovators will be in contact with all the members of the infrastructure, they will be also in charge of deploying the secure time and performing other administrative tasks. From these, the most relevant for us now is the "root update procedure", to be performed when the root has been compromised.

FIG. A-17 illustrates the various certificates involved in a phase 2 scenario. Edges are labeled with abbreviations of the operations for readability reasons. Edges with labels preceded by numbers denote the maximum validity counter for the given certificate. Some of the principals contain a number below their identifier. This number denotes the actual value of the secure counter. A detailed explanation of the label abbreviations is given below.

The Secure Counter (Secure Time)

The first foundation of trust in the phase 2 scenario is the secure time. The time scale of this secure time is not fixed, but event driven. In order to avoid confusion with the real time (UTC), which has a fixed scale, we will from now on call the security infrastructure's secure time "The secure counter". Each entity involved in direct trust evaluations will have a secure counter, which will be fed to the trust engine during invocation of trust evaluation operations. Certificates have a validity period expressed as the maximum counter value to which they hold valid (for some, the maximum valid counter is infinite). A secure counter update protocol is described in more detail below.

Actors of the Phase 2 Environment

Apart from Root, Devices, and Content Providers, the phase 2 environment has:

Clearinghouses: Dedicated to clear the audit records produced by the Devices.

Renovators: Their main role is to renovate the Devices, Content Providers, and Clearinghouses. They are in turn renovated by the Root. In one embodiment, there are two classes of Renovators:

Service provider Renovator (RenovatorS): Dedicated to renovate the Content Providers and Clearinghouses.

Device Renovator (RenovatorD): Dedicated to renovate the Devices.

As the Renovators are in contact with all the members of the infrastructure, they are also in charge of deploying the secure counter and deploying new certificates created by the Device Manufacture's and the Root.

Operations in the Phase 2 Environment

The action language for the Phase 2 environment includes the following expressions (listed here by the label depicted in FIG. A-17):

A: "clear-audit-record"
B: "create-audit-record"
C: "create-content"
E: "get-renovated-as-clearinghouse"
F: "get-renovated-as-device"
G: "get-renovated-as-renovator-d"
H: "get-renovated-as-renovator-s"
I: "get-renovated-as-service-provider"
J: "give-content"
K: "receive-content"
M: "renovate-clearinghouse"
N: "renovate-device"
O: "renovate-renovator"
P: "renovate-service-provider"
Z: "set-counter"
*: "*" (which means any)

Each of these operations is an atom of the action language except for:

* "create-content": Which is an s-expression of the form:
  (create-content<content-provider-id>)
  The <content-provider-id>denotes the id that a given content provider is allowed to use. This id will be used by the Devices to select the branch of the rights-tree to which a given piece of content is related. This id should be expressed as an atom of the action language (a free-string). Root is in charge of making sure that the id cannot be shared between different Content Providers.

"set-counter": Which is an s-expression of the form:
  (set-counter (*-range le <counter>))
  The <counter>integer value (expressed as a free-length decimal string) denotes the maximum counter value that the authorized entity is allowed to set on the authorizing entity. A detailed explanation of the secure counter mechanics is provided below.

With the introduction of the counter evaluation condition, operation-sets are expressed in the certificates in the form:
  (prime <max-counter><action>)
  Where <max-counter>can be:
  (*-range le <counter>): The certificate holds valid until the counter reaches the value expressed by <counter>
  *: The certificate holds valid forever
and <action>is any expression in the action language that contains the aforementioned atoms and expressions.

In order to be coherent with the new certificate template, calls to the trust engine should use requests of the form:
  (prime <counter><operation>)
  Where <counter>is the actual secure counter value of the authorizer and <operation>can be any operation representable by the aforementioned action language.

Operations Performed by Each Entity Root

The Root's main role is to link together the security domain. In that role, it is in charge of deploying Content Providers, Clearinghouses, Renovators, and Device Manufacturers. It is also in charge of deploying the secure counter. Depending on who is the authorizer, the Root can perform the following operations (most of them are not directly performed by it, but delegated to other entities):

From the Devices point of view (all of those are delegated to the Root through the Device manufacturers):
  (create-content): Ultimately delegated to the Content Providers.
  clear-audit-record: Ultimately delegated to the Clearinghouses.
  renovate-device: Delegated to the Renovators D.
  give-content: Ultimately delegated to the Devices.
  receive-content: Ultimately delegated to the Devices.
  (set-counter (*-range le <counter>)): Delegated to the Renovators D From the Device-Manufacturer's point of view are the same as from the Device point of view:
  (create-content): Ultimately delegated to the Content Providers.
  clear-audit-record: Ultimately delegated to the Clearinghouses.
  renovate-device: Delegated to the Renovators D.
  give-content: Ultimately delegated to the Devices.
  receive-content: Ultimately delegated to the Devices.
  (set-counter (*-range le <counter>)): Delegated to the Renovators D.

From the Content Providers point of view:
  receive-content: Ultimately delegated to the Devices.
  renovate-service-provider: Delegated to the Renovators S.
  (set-counter (*-range le <counter>): Delegated to the Renovators S.

From the Clearinghouses point of view:
  create-audit-record: Ultimately delegated to the Devices.
  renovate-clearinghouse: Delegated to the Renovators S.
  (set-counter (*-range le <counter>)): Delegated to the Renovators S.

Form the Renovators S point of view:
  renovate-renovator
  (set-counter (*-range le <counter>))
  get-renovated-as-service-provider: Delegated to the Content providers.
  get-renovated-as-clearinghouse: Delegated to the Clearinghouses.

Form the Renovators D point of view:
  renovate-renovator
  (set-counter (*-range le <counter>))
  get-renovated-as-device: Ultimately delegated to the Devices.

Root Delegation Mechanisms

As mentioned above, the Root normally does not perform operations by itself but delegates them to third parties. The way to delegate an operation depends on the type of the third party and it goes through two auxiliary principals that the Root controls:

Ren Renovator S: Which is on-line and in charge of renovating the Renovators S. The Root delegates to it the following operations:
  (set-counter (*-range le <counter>)): Delegated to the Renovators S renovate-service-provider: Delegated to the Renovator S.

renovate-clearinghouse: Delegated to the Renovator S.

And all the operations that it will delegate to the Content Providers and Clearinghouses in a 2-of-N delegation certificate:

(create-content): Ultimately delegated to the Content Providers.

clear-audit-record: Ultimately delegated to the Clearinghouses.

Those operations are subsequently delegated by the Ren Renovator S to the Renovators S in shorter periods as they are renovated.

Ren Renovator D: Which is on-line and in charge of renovating the Renovators D. The Root delegates to it the following operations:

(set-counter (*-range le <counter>)): Delegated to the Renovators D renovate-device: Delegated to the Renovators D.

And all the operations that it will delegate to the Device Manufactures in a 2-of-N delegation certificate:

give-content: Ultimately delegated to the Devices.

receive-content: Ultimately delegated to the Devices.

Those operations are subsequently delegated by the Ren Renovator D to the Renovators D in shorter periods as they are renovated.

Renovators S

Renovators S are in charge of renovating and deploying the secure counter to the Content providers and the Clearinghouses. They are different from the Renovators D in that they are renovated with shorter termed certificates because the Content Providers and Clearinghouses are online and can be renovated within shorter periods than the Devices.

They directly perform the following operations:

renovate-service-provider: Evaluated by the Content Providers renovate-clearinghouse: Evaluated by the Clearinghouses.

set-counter: Evaluated by the Content Providers and Clearinghouses.

They delegate the following operations:

(create-content): Delegated to the Content Providers in short-termed certificates as they get renovated.

clear-audit-record: Delegated to the Clearinghouses in short-termed certificates as they get renovated.

In order to issue a renovation certificate, a Renovator S will evaluate the requester for:

get-renovated-as-clearing-house: To be requested by a Clearinghouse.

get-renovated-as-service-provider: To be requested by a Content Provider.

After a successful trust evaluation of a renovation candidate, the Renovator S will verify the status of the candidate in its local database. If it appears as a non-compromised entity, it will proceed to issue the corresponding short-termed certificates.

Renovators D

Renovators D are in charge of renovating and deploying the secure time to the Devices. They are different from the Renovators S in that they are renovated with longer termed certificates (but still relatively short). They directly perform the following operations:

renovate-device: Evaluated by the Devices set-counter: Evaluated by the Devices.

They delegate the following operations:

receive-content: Delegated to the Devices in short-termed certificates as they get renovated. Devices that are allowed to receive content are allowed to receive rights for it as well.

move-content: Delegated to the Devices in short-termed certificates as they get renovated. Devices that are allowed to move content are allowed to move the rights for it as well.

create-audit-record: Delegated to the Clearinghouses in short-termed certificates as they get renovated.

In order to issue a renovation certificate, a Renovator D will evaluate the requester for:

get-renovated-as-device: To be requested by a Device when contacting the Renovator D.

After a successful trust evaluation of a renovation candidate, the Renovator D will verify the status of the candidate in its local database. If it appears as a non-compromised entity, it will proceed to issue the corresponding short-termed certificates.

Content Providers

The main role of the Content Providers is to "create" content. They perform the following operations:

(create-content<service-provider-id>): To be evaluated by the Devices.

get-renovated-as-content-provider: To be evaluated by the Renovator S

They authorize other entities to perform following operations:

receive-content: Requested by the Devices in the content-download procedure.

renovate-service-provider: Requested by the Renovators S in the renovation procedure.

(set-counter<counter>)): Requested by the Renovators S in the counter update procedure.

Clearinghouses

The main role of the Clearinghouses is to clear audit records. They perform the following operations:

Clear-audit-record: To be evaluated by the Devices.

Get-renovated-as-clearinghouse: To be evaluated by the Renovator S

They authorize other entities to perform following operations:

create-audit-record: claimed by the Devices in the content-download procedure.

renovate-clearinghouse: claimed by the Renovators S in the renovation procedure.

(set-counter<counter>): claimed by the Renovators S in the counter update procedure.

Device Manufacturers

The main roles of the Device manufactures are to deploy devices and act as a trusted link for them. In order to fulfill these roles they control several principals:

Device Manufacturer principal: The Root delegates to it the operations that will be performed by the devices.

Manufacturer-bogus principal: Introduced because of a semantic flaw in the SPKI language, it is used to avoid a collusion attack between a Renovator D and a Device with the intention to create arbitrary devices.

To-Root principal(s): Devices trust it unconditionally and forever. It is used to designate which Root the devices should trust and for how long. In order to minimize the damage produced by the compromise of this principal, a given Device Manufacturer can create and control as many To Root principals as it may desire. However, to minimize the overhead, a given device only trusts one of the To Root principals.

The Device Manufacturer delegates to the Devices through the Manufacturer Bogus and a given Renovator D the following operations (by means of 2-of N certificate):
receive-content: Evaluated by the Content Providers and other Devices.
move-content: Evaluated by other Devices.
create-audit-record: Evaluated by the Clearinghouses.

These operations are the further delegated as well by the Manufacturer Bogus in the form of terminator certificates.

Finally, the Device Manufacturer principal directly delegates to the Devices the get-renovated-as-device operation in the form of terminator certificates.

Devices

The main role of the Devices is to consume or move content and to create audit records.

They perform the following operations:
receive-content: Evaluated by the Content Providers and other Devices.
move-content: Evaluated by other Devices.
create-audit-record: Evaluated by the Clearinghouses.

They authorize other entities to perform following operations:
(create-content<service-provider-id>): claimed by the Content Providers in the content-download (or evaluation) procedure. receive-content: claimed by the Content Providers and other Devices.
move-content: claimed by other Devices.
renovate-device: claimed by the Renovators D in the renovation procedure. (set-counter<counter>)): claimed by the Renovators D in the counter update procedure.

Set-Up Operations

In order to set-up the security infrastructure the following operations should be performed in an out-of band fashion. In the certificate examples below, we use the same identifiers that appear in the example depicted in FIG. A-17. We also assume that the Root's secure counter value is zero or close to it.

Creating a Root

When a Root is created, it first creates three principals (root 0, spv/ch ren renovator 0, device ren renovator 0) and the following certificates between them:
(issuer root 0) (delegate-and-authorize spv/ch ren renovator 0) (prime* (*-set renovate-clearinghouse renovate-service-provider (set-counter *)))
(issuer root 0) (delegate-and-authorize device renovator 0) (prime* (*-set renovate-device (set-counter *)))

Adding a Renovator S

The new Renovator S creates the following certificate:
(issuer spv/ch renovator 0) (delegate-and-authorize root 0) (prime (*-range le 365) (*-set get-renovated-as-clearinghouse get-renovated-as-service-provider renovate-renovator (set-counter (*-range le 1000))))
This certificate will be stored in the Renovator S's "To root" certificate list.
Root creates the following certificate:
(issuer root 0) (authorize spv/eh renovator 0) (prime (*)get-renovated-as-renovator-s)
This certificate will be stored in the Renovator S's "From root" certificate list.
Finally, the Root registers the new Renovator S into its database for further use in the Renovator renovation procedure.

Adding a Renovator D

The new Renovator D creates the following certificate:
(issuer device renovator 0) (delegate-and-authorize root 0) (prime (*-range le 365) (*-set get-renovated-as-device renovate-renovator (set-counter (*-range le 1000))))
This certificate will be stored in the Renovator D's "To root" certificate list.
The Root creates the following certificate:
(issuer root 0) (authorize device renovator 0) (prime (*)get-renovated-as-renovator-d)
This certificate will be stored in the Renovator D's "From root" certificate list.
Finally, the Root registers the new Renovator D into its database for further use in the Renovator renovation procedure.

Adding a Content Provider.

The new Content Provider creates the following certificate:
* (issuer spv 0) (delegate-and-authorize root 0) (prime (*-range le 365) (*-set receive-content renovate-service-provider (set-counter (*-range le 1000))))
This certificate will be stored in the Content Provider's "To root" certificate list.
The Root creates the following certificates:
(issuer root 0) (delegate-k-of-n 2 spv/ch ren renovator 0, spv/ch renovator 0) (prime (*-range le 365) (Create-Content Universal))
(issuer root 0) (authorize spv 0) (prime*get-renovated-as-service-provider)
These certificates will be stored in the Content Provider's "From root" certificate list.
Finally, the Content Provider is assigned to one of the pre-registered Renovators S and added to its database for the renovation procedure.

Adding a Clearinghouse

The new Clearinghouse creates the following certificate:
(issuer clearinghouse 0) (delegate-and-authorize root 0) (prime (*-range le 365) (*-set create-audit-record renovate-clearing-house (set-counter (*-range le 1000)))
This certificate will be stored in the Clearinghouse's "To root" certificate list.
Root creates the following certificates:
(issuer root 0) (delegate-k-of-n 2 spv/ch ren renovator 0, spv/ch renovator 0) (prime (*-range le 365) clear-audit-record)
(issuer root 0) (authorize clearinghouse 0) (prime*get-renovated-as-clearinghouse)
These certificates will be stored in the Clearinghouse's "From root" certificate list.
Finally, the Clearinghouse is assigned to one of the pre-registered Renovators S and added to its database for the renovation procedure.

Adding a Device Manufacturer

The new Device manufacturer creates the following certificates:
(issuer mfg to root 0) (delegate-and-authorize root 0) (prime (*-range le 365) (*-set clear-audit-record create-audit-record (create-content) give-content receive-content renovate-device (set-counter (*-range le 1000)))
This certificate will be stored in the Device manufacture's "To root" certificate list.
Root creates the following certificates:
(issuer root 0) (delegate-k-of-n 2 d ren renovator 0, device manufact 0) (prime (*-range le 365) create-audit-record give-content receive-content)

(issuer root 0) (delegate-and-authorize device manufact 0 (prime*get-renovated-as-device)
These certificates will be stored in the Device manufacture's "From root" certificate list.

Creating a Device

When a Device manufacture creates a Device (and the corresponding principal device 0 is created) in its secure premises it assigns it to one of the available Renovator Ds and finally it exchanges with it the following certificates:

(issuer device 0) (delegate-and authorize mfg to root 0) (prime**)
This certificate will be stored in the Device's "To root" certificate list.

(issuer device manufact 0) (delegate-k-of-n 2 d renovator 0, mfg bogus 0) (prime (*-range le 365) create-audit-record give-content receive-content)

(issuer mfg bogus 0) (authorize device 0) (prime (*-range le 365) create-audit-record give-content receive-content)

(issuer device manufact 0) (authorize device 0) (prime*get-renovated-as-device) These certificates will be stored in the Device's "From root" certificate list.

Renovation Operations

After a member has been introduced to the security infrastructure, it goes through the renovation process. This process is repeated every so often in order to keep allowing the entity to be able to interact with the rest of the security infrastructure. The mechanics of that procedure are explained in more detail below.

Content-related Operations

There are two classes of content-related operations:

Downloading and authenticating content. A priori, this interaction appears between a Device and Content Provider. However, this interaction also appears when a Device authenticates a piece of content that has been provided to it by another Device.

Moving content between devices: When moving content between Devices they authenticate each other to validate them in keeping the integrity of the content and the associated rules.

Downloading of Content

When a Device requests a given piece of content from a Content Provider, the Content provider first verifies that the device is authorized to perform the "receive-content" operation. The set of certificates involved in the proof is depicted in FIG. A-18. Referring to FIG. A-18, spv o authorizes device 0 to receive-content. Receive-content is stated in the diagram as K. Afterwards the Device verifies that the Content Provider is authorized to create content. FIG. A-19 depicts the set of certificates involved in the proof. Referring to FIG. A-19, device 0 authorizes spv 0 for (create-content universal). (create-content) is stated in the diagram as C.

The subset of the set of certificates involved in the proof that are provided by the Content provider (all except the first two) will be kept together with the content by the Device. It will be reused when transferring the content to another Device so that Device can authenticate the content as valid as well.

Moving of Content

When a (target) Device requests another (source) Device for a given piece of content, the source Device first verifies if the target Device is authorized to perform the "receive-content" operation. The set of certificates involved in the proof is depicted in FIG. A-20. Referring to FIG. A-20, device 0 authorizes device 2 to receive-content. Receive-content is stated in the diagram as K.

If this operation is successful, then the target Device verifies that the source Device is authorized to move content (so it did not tamper with the content integrity or associated rights). FIG. A-21 depicts the set of certificates involved in that proof. Referring to FIG. A-21, device 2 authorizes device 0 to give-content. Give-content is stated in the diagram as J.

Finally, the target Device will evaluate the content as in the second part of the download content procedure described above.

Audit-record-related Operations

When a Device wants to clear an audit record (or a set of them) it contacts a Clearinghouse. The Clearinghouse will then evaluate the Device as a good source of audit-records. FIG. A-22 depicts the set of certificates involved in that proof. Referring to FIG. A-22, clearinghouse 0 authorizes device 0 for create-audit-record. Create-audit-record is stated in the diagram as B. Afterwards, the Device will verify that the Clearinghouse is authorized to clear audit records. FIG. A-23 depicts the set of certificates involved in that proof. Referring to FIG. A-23, device 0 authorizing clearinghouse 0 for clear-audit-record. Clear-audit-record is stated in the diagram as A.

Certificate Exchange Protocols

It is not easy for a requester to know which will be the certificates involved in a proof before the request is evaluated by the verifier. To overcome that problem each entity keeps two sets of certificates:

"From root": Contains the certificates received from the Root or the Renovators. They allow the entity to prove requests for operations to other entities.

"To root": This set of certificates allows the Root to be trusted by the entity and is used in the proofs for authorizations requested by other entities.

The basic mechanism used to select the certificates involved in a proof has three steps:

The requester entity computes a minimal proof with authorizer Root using the "From root" set as input. This allows the requester entity to select which of the certificates in the set are meaningful for the proof.

The requester entity sends the certificates involved in the minimal proof to the requested entity together with the request.

The requested entity adds to the received set of certificates those certificates contained in its "To root" set and evaluates the query.

The minimal proof computation consists in calling the trust engine with all the possible sub-sets of certificates. From those sub-sets where the answer of the trust engine is positive, the smallest one is picked up and returned as a result.

Using the aforementioned strategy the authorization network protocol depicted in FIG. A-24 is proposed. Note that in the embodiment shown in FIG. A-24, none of the certificates contains a full principal but a hash of it instead. The reason for that is space optimization. Not shown in FIG. A-24 is the precomputation of the minimal proof by the Device 2.

Apart from the certificate selection issue, FIG. A-24 depicts as well the mechanisms set in place for caching costly cryptographic signature verifications and the protocol used to transport the public-keys involved in the certificates. In FIG. A-24, Devices are depicted as interacting entities; however, this is a generic protocol, which can be used by the Content Providers and the Clearinghouses as well.

Renovation Operations

In one embodiment, renovations involve four steps:

Mutual trust evaluation

Requester verification in the "renovator" database ("renovator" can be the Root or a Renovator depending on the requester).

New certificate issue and delivery. The "renovator" sends to the requester the newly created certificates together with its "From root" set (Some of these can be unnecessary because the "renovator" cannot predict which of them will be useful by the requester).

The requester performs a certificate "purge". This allows it to throw away outdated or meaningless certificates. This operation involves a set of minimal proof evaluations.

Renovating a Renovator

The Renovator contacts the Root and verifies that it is a valid Renovator "renovator". This is represented by the operation renovate-renovator. Afterwards, the Root verifies that the Renovator is a valid one. This is performed in two steps:

Trust evaluation

Get-renovated-as-renovator-s if the requester is a Renovator S.

Get-renovated-as-renovator-d if the requester is a Renovator D.

Database verification: This makes sure that the renovator has not been blacklisted.

Finally, the following certificates are created:

In the case of a Renovator D:

(issuer d ren renovator) (delegate-and-authorize device renovator 0) (prime (*-range le 33) (*-set create-audit-record give-content receive-content renovate-device (set-counter (*-range le 33))))

In the case of a Renovator S:

(issuer spv/ch ren renovator) (delegate-and-authorize spv/ch renovator 0) (prime (*-range le 33) (*-set clear-audit-record (create-content) renovate-clearinghouse renovate-service-provider (set-counter (*-range le 33))))

Once Renovator has been successfully renovated, it can start renovating its own clients. Note that the new certificates received by the renovator should be at least as long-lived as the ones issued by it. However, it is recommended to keep them as short as possible to minimize the damage that a compromised Renovator can produce. FIG. A-25 depicts the certificates that a Renovator D holds after being renovated by the Root.

Renovating a Content Provider, Clearinghouse or a Device

The requester contacts the Renovator and verifies that it is a valid Renovator for its class.

renovate-service-provider: if the requester is a Content Provider.

renovate-clearinghouse: if the requester is a Clearinghouse.

renovate-device if the requester is a Device.

Afterwards the Renovator verifies that the requester is a valid one. This is performed in two steps:

Trust evaluation:

get-renovated-as service-provider: if the requester is a Content provider get-renovated-as-clearing-house: if the requester is Clearinghouse.

get-renovated-as-device: if the requester is a Device.

Database verification: This makes sure that the requester has not been blacklisted.

Finally, the following certificates are created:

In the case of a Content Provider:

(issuer spv/ch renovator 0) (authorize spv 0) (prime (*-range le 33) (create-content))

In the case of a Clearinghouse:

(issuer spv/ch enovator 0) (authorize ch 0) (prime (*-range le 33) clear-audit-record)

In the case of a Device.

(issuer device renovator 0) (authorize device 0) (prime (*-range le 33) (*-set create-audit-record give-content receive-content))

FIGS. A-26 and A-27 depict the certificates held by a Device and a Content Provider, respectively, after being renovated.

Secure Counter Update Protocol

As stated above, the validity of most of the certificates depends strongly on which point in time they are evaluated. It is easy to see that tampering with the time can compromise the integrity of the security domain in several ways. From that point of view, the Secure Time should be more trusted than the certificates themselves.

Our solution to that problem is the use of a "Secure Counter", which keeps track of the passage of the time. However, instead of using a fixed period clock as an update signal (like a quartz oscillator), it is event driven. Only those events on the scale of time that are relevant to the security infrastructure are used as an update signal for the Secure Counter.

The most powerful attack against the Secure Time is backdating it to render again valid certificates that have expired. By doing that, entities that may have been compromised will be trusted again by non-compromised entities. The damage inflicted to the security domain will vary depending on the role played by the compromised entity. For example:

Renovator D: It could issue valid certificates for blacklisted Devices.

Device Manufacturer: It could deploy bogus Devices. (To be fully successful, this attack will need to collide somehow with a Renovator D compromise.)

Clearinghouse: It could clear and forget audit records created by Devices.

Root: The whole security domain may be compromised.

To overcome this attack, no entity will be allowed to backdate its secure counter.

The second most important issue is that of an uncontrolled forwarding of the time. If an attacker is able to convince a victim to forward its Secure Counter to an arbitrary value it can render it useless, as this entity will not trust any certificate from that point on.

To overcome this attack, all entities will update their secure counter from trusted sources. Moreover, at any point in time, all trusted sources have a limit to which they can set the counters of their clients. This limits damage in case one of the trusted sources may become temporarily compromised.

Finally, it is important to realize that all entities will have their own source of time (their own Secure Counter), and that will be the only source of time when performing trust evaluations. In other words, for any given point of time, any two entities may have different Secure Counters. This should not compromise the integrity of the security domain, as explained in more detail below.

Events in the Security Domain

The events that trigger a counter update are those that are meaningful to the security domain (e.g., issue of new certificates), or in other words, when somebody gets renovated.

As main "Renovator", the Root will be the main source for the secure counter. To provide the system with some predictability, the Root will usually tick its secure counter at a given fixed peace (in our previous examples it is one day). This pace should be at least as short as the shortest renovation period of any entity in the security domain. That will allow us to represent the renovation events as ticks of the Secure Counter.

The Secure Counter Flow in the Security Domain

As mentioned above, normally the Root ticks its Secure Counter at given regular intervals. When contacted by the Renovators, the Root requests a counter update operation with the value that it wishes to update the Secure Counter of the Renovator.

This operation can be represented as (set-counter <value>). The corresponding actions that usually appear in the certificates can be:

- (set-counter (*-range le <value>)): Used to limit the range that the Secure Counter provider can set the Secure Counter of its client. This form protects the client from a denial of service attack performed by a bogus Secure Counter provider.
- (set-counter *). Used only by the Devices in the certificate that they issue over the "Manufacturer to Root" principal. This is needed because once deployed this principal is their ultimate source of trust.

(Both of them are represented as "Z" in all previous graphic examples)

Once the counter has been propagated from the Root to the Renovators the corresponding renovation certificates are issued by the Root. These will allow the Renovators to propagate it to their respective clients in the same fashion as a part of the client-renovation procedure.

This is the only mechanism that the entities will have to update their Secure Counters.

Two "Desynchronized" Entities Meet in the Field

Each time two entities meet they perform mutual authentication and trust evaluation. As an example, consider the situation in which a recently-renovated Content Provider and a long-time non-renovated Device meet to download content:

- The Content Provider will be able to convince the Device that it can perform the operation "create-content". This is true because the certificates contain only a maximum validity counter and not a minimum one. Therefore, no matter how low the Security Counter of the Device is it will authorize the Content Provider.
- The Device will be incapable of convincing the Content Provider of anything because its renovation certificates will be too old. This will force the Device to go through a renovation procedure, which will ultimately update its Secure Counter to the correct value.

The same logic applies between two Devices or between a Device and a Clearinghouse.

Compromise of Root

Of all the major security issues, the compromise of the Root is the most severe one. In order to recover from the compromise of the Root there is a mechanism that the Root itself can use if it detects that it has been compromised (e.g., its private key disclosed to a third party).

This mechanisms is embedded in the certificates and has the following basis:

- Root is trusted only for a given (long period of time)
- Root can set and propagate the Secure Counter ahead of its own validity period.

Thus, at any given instant, the Root can make itself untrusted by the rest of the security domain just by updating its Secure Counter ahead of a given threshold value.

Once the compromised Root has been eliminated, it is necessary to introduce a replacement for it; this is done in three steps:

- The creation of the new Root. Its Secure counter value should be at least as high as the value that has been set to invalidate the previous Root.
- Out-of band setup for Content Providers, Clearinghouses, and Device manufacturers. This procedure is essentially identical to the initialization procedure described above.
- Deployment of the new Device manufactures certificates issued "To root" and "From root" via the existing Renovators.

Alternate Time Management Mechanisms

This section provides additional detail and alternate embodiments of the secure time mechanism set forth above.

The main goal is to obtain a secure time service that will operate within a given window of precision. The primary service of the secure time is to support the evaluation of certificates. To support the portable-device environment, such a service will preferably be relatively lightweight in implementation and operation, and will support offline operation.

Security Rationale

Given a secret P and entity A and the fact that it is known that secret P has been created by A, we can assume that the secret P is only known by A when this is created. As time goes by, the secret P may be communicated (either voluntarily or involuntarily) to other entities.

If P is used to authenticate A, then any given entity E can only claim to be A if and only if it can demonstrate that it knows P and P is valid. Valid(p) is a function that returns true if the secret p is only known by the creator of p or false otherwise. As this function strongly depends on the time, we will make this fact explicit and denote this function as Valid (p,t).

If the implementation of Valid(p,t) is perfect, a given entity E different from A can only claim to be A if and only if it can claim the T is such that Valid(P,T) is true. As Valid(P,t) is a monotonic function where:

Valid(P,t)=true if $t<t_1$

Valid(P,t)=false if $t>=t_1$.

E can only claim to be A if and only if it can claim that t=T where $T<t_1$.

Therefore, the only attack that can compromise the evaluation of authenticity of A is backdating the time.

Consequently, we define in this context Secure Time Service (STS) as a mechanism that prevents the backdating of time.

As certificates depend on authentication and authentication depends on time (as shown above), we can deduct that certificates can not be used as a foundation tool to implement the STS.

Secure Time Service High Level Design

Given the fact that the absolute time references (i.e. UTC) is not necessary to fulfill the aforementioned requirements, we will use only relative time. This will allow us to separate this service from the normal time/date service, which has other requirements.

In one embodiment, the service is not centralized but on the contrary highly distributed, which makes it more resistant to attacks (because more entities have to be compromised); however, as we will see, the security of the service does not depend on that fact.

Each entity maintains a Secure Time Reference (STR), which is used to take trust-related decisions. The STR can be seen as a counter that is incremented by one at each clock tick.

We separate the domain of entities into two classes:
Providers: Entities that are highly trusted and provide the STS.
Consumers: Entities that consume the STS and modify their STR according to it.

The security of the design is based in the fact that no entity in the Consumers set can be forced to backdate its STR because of a potential compromise of an entity in the Providers set.

To implement that requirement we will define the updating procedure of the STR in a Consumer entity as:
If (obtained STS)>(local STR) then STR=STS else do nothing.

As physical clock implementation always has some drift, for a uniform clock period there is the risk that the STR maintained by a Consumer entity may run faster than the STS. This will result on a continuously increment of the difference between this particular STR and STS, which will finally render the Consumer entity useless. A priory, to resolve this problem it will be necessary to backdate the STR, which is in flagrant contradiction with the requirements.

This problem is solved as follows: Given D as the absolute maximal drift of a given clock implementation we define:
Providers' STR's clock period as $P_P$.
Consumers' STR's clock period as $P_c=(P_P-2*D)$.
In that way it is not possible that Consumers' STR>STS.

On the other hand, as D is typically much smaller than $P_P$, this condition does not introduce unacceptable difference between a running STR and the STS if the STR is updated with the STS in a reasonable pace.

Finally, there is a potential denial of service if a non-trusted entity E can claim to be a member of the Providers' group. E can artificially advance its STR and then propagate it as the STS, which will potentially render useless all the Consumers that may update their STR with the bogus STS.

To recover from that attack, the members of the Providers group should be properly credentialed and the STS service authenticated against them. To note that the security of the STS does not depend on that feature. Therefore, the Providers' authentication procedure can use the STS service as well. Consequently, time-dependent certificates and the usual authentication procedures can be used for the implementation of the Providers authentication.

Illustrative Implementation

Each Renovator will maintain a STR, which can be implemented as a 32(64 better) bit register that is incremented at one-second period.

The absolute time zero of the register can be fixed at any instant. The only important fact is that all the members of the PRIME domain should agree on it.

The Devices and the value chain members will maintain a tamper resistant STR as well, but their clock period will be in the order of $1$-$10^{-4}$ seconds. This difference is well above the average drift for quartz oscillators, which is $10^{-6}$ seconds. This will introduce a skew of a second each 10000 seconds (2.7 hours), which is more than acceptable if the update period is in the other of months (4.46 min per month).

When contacting the Renovators, the Devices will obtain the signed Renovators' STR value. Using this value, they will update their STR in accordance with the procedure described above.

Finally, the Devices will report the STR values to the Security Clearinghouses to detect the STR tampering.

Certificate Format

In all the previous examples, we used a readable format to express the certificates in a friendly and comprehensible way. It will be appreciated that other formats could be used, including:

Simplified SPKI: Simplified because only a subset of the SPKI specification is used, all certificates in this format are fully compatible with SPKI. It is used within the network exchange protocol and for cryptographic signature verification.

Compact: Used as an internal storage format and as a network format between those entities that do not have enough resources to parse SPKI certificates.

Additional information on preferred embodiments of certificates, certificate expression, certificate evaluation, and other trust management decisions can be found in commonly-assigned U.S. application Ser. No. 09/863,199, entitled "Trust Management Systems and Methods," filed May 21, 2001, which is hereby incorporated by reference in its entirety.

SPKI

Following SPKI's BNF specification (which is pasted here only to shown those parts that are meaningful to us):

```
<byte-string>:: <bytes>;
<bytes>:: <decimal> ":" {binary byte string of that length};
<cert>:: "(" "cert"<issuer> <subject> <deleg>? <tag>")";
<ddigit>:: "0" | <nzddigit>;
<decimal>:: <nzddigit> <ddigit>* "0";
<deleg>:: "(" "propagate" ")";
<display-type>:: "[" <bytes> "]";
<gte>:: "g" | "ge";
<hash-alg-name>:: "md5" "sha1" <uri>;
<hash-of-key>:: <hash>; (of a public key)
<hash-op>:: "(" "do" "hash" <hash-alg-name> ")";
<hash-value>:: <byte-string>;
<hash>:: "(" "hash" <hash-alg-name> <hash-value> ")";
<issuer>:: "(" "issuer" <principal> ")";
<k-val>:: <byte-string>;
<low-lim>:: <gte> <byte-string>;
<lte>:: "l" | "le";
<n-val>:: <byte-string>;
<nzddigit>:: "1" | "2" | "3" | "4" | "5" | "6" |"7" | "8" | "9";
<principal>:: <hash-of-key>;
<pub-key>:: "(" "public-key" <pub-sig-alg-id> <s-expr>* <uris> ")";
<pub-sig-alg-id>:: "rsa-pkcs1-md5" | "rsa-pkcs1-sha1" | "rsa-pkcs1" | "dsa-sha1" | <uri>;
<range-ordering>:: "alpha" | "numeric" | "time" | "binary" | "date";
<s-part>:: <byte-string> | <s-expr>;
<seq-ent>:: <cert> | <signature>
<sequence>:: "(" "sequence" <seq-ent> * ")";
<sig-val>:: <s-part>;
<signature>:: "(" "signature" <hash> <principal> <sig-val> ")";
```

```
<simple-tag>:: "(" <byte-string> <tag-expr>* ")";
<subj-obj>:: <principal> | <subj-thresh>;
<subj-thresh>:: "(" "k-of-n" <k-val> <n-val>
    <subj-obj>* ")";
<subject>:: "(" "subject" <subj-obj> ")";
<tag-expr>:: <simple-tag> | <tag-set> | <tag-string>;
<tag-prefix>:: "(" "*" "prefix" <byte-string> ")";
<tag-range>:: "(" "*" "range" <range-ordering> <low-
    lim>? <up-lim>? ")";
<tag-set>:: "(" "*" "set" <tag-expr>* ")";
<tag-star>:: "(" "tag" "(*)" ")";
<tag-string>:: <byte-string> | <tag-range> | <tag-prefix>;
<tag>:: <tag-star> | "(" "tag" <tag-expr> ")";
<up-lim>:: <lte> <byte-string>;
<uri>:: <byte-string>;
```
The entry point structure is <sequence>, which should contain only one certificate structure <cert> and one signature structure <signature>.

Compact

All certificates in the compact format follow the same pattern, which has been designed to be both easy to parse and compact.

```
<certificate>:: <issuer> <subject> <tag> <signature>
<issuer>:: <hash>
<subject>:: "a"<hash> | "d" <hash> | "k" <n-val> "("
    <hash>* ")"
<tag>:: As SPKI tag.
<hash>:: As SPKI <hash>
<signature>:: <bytes>
```

Appendix A: Certificates Held by a Device

Hash values are simulated. Signature values are represented by "$".

A. Certificates held by a Phase 1 and Phase 2 device

A.1 In SPKI format:

(8:sequence(4:Cert(6issuer(4hash4sha120:device renovator 0##)) (7:subject(4:hash4sha120:device 0###########))) (3:tag(5:prime(7:*raflge7flUmeriC2le232) (5:*-set12 give-content19: create-audit-record15: receive-content)))) (9:signature(4:hash4:sha120#################) (4:hash 4:sha120:device renovator 0##)
$$$$$$$$$$$$$$$$$$$$$$$$$$$$$$$$$$$$$$$$$$$$
$$$$$$$$$$$$$$$$
$$$$$$$$$$$$$$$$$$$$$$$$$$$$$$$$$$$$$$$$$$$$
$$$$$$$$$$$$$$$$$$$$$$$$ $$))

(8:sequence(4:cert(6:issuer(4:hash4:sha120:d ren renovator 0####)) (7:subject(4:hash4sha120device renovator 0##) ) (8:delegate) (3:tag(5:prime(7:*-range7:numeric2:le2:32) (5:*-set (5:*set12:give-content19:create-audit-record15:receive-content15:renovate-device) (11:set-counter(7:*-range7:numeric2le2:32)))))) (9:signature(4:hash4:sha120: ##################) (4:hash4:sha120:d ren renovator 0###) 128:$$$$$$$$$$$$$$$$$$$$$$$$$$$$$$$$$$$$$$$
$$$$$$$$$$$$$$$$$
$$$$$$$$$$$$$$$$$$$$$$$$$$$$$$$$$$$$$$$$$$$$
$$$$$$$$$$$$$$$$$$$$$ $$$))

(8:seguence(4:cert(6:issuer(4:hash4:sha12:device manfact 0####)) (7:subject(6k-of-nl:12:2(4:hash4:sha120device renovator 0##) (4:hash4:sha120:mfg bogus 0##########))) (8:delegate) (3:tag(5:prime(7:*-range7:numeric2:le3:366) (5:*-set19:create-audit-record12:give-content15:receive-content)))) (9:signature(4:hash4:sha1200################) (4:hash 4:sha120:device manfact Q####) 128:$$$$$$$$$$$$$$$$$$$$$$$$$$$$$$$$$$$$$$$$
$$$$$$$$$$$$$$$$$
$$$$$$$$$$$$$$$$$$$$$$$$$$$$$$$$$$$$$$$$$$$$
$$$$$$$$$$$$$$$$$$$$$$$$ $$$$))

(8:sequence(4:cert(6:issuer(4:hash4:sha120mfg bogus 0#########)) (7:subject(4:hash4:sha120device 0############)) (3:tag(5:prime(7:*range7:numeric2:le3:366) (5:*-set19:create-audit-record12:give-content15:receive-content)))) (9:signature(4:hash4sha120: ##################) (4:hash 4:sha120:mfg bogus 0#########)
128:$$$$$$$$$$$$$$$$$$$$$$$$$$$$$$$$$$$$$$$$
$$$$$$$$$$$$$$$$$$$
$$$$$$$$$$$$$$$$$$$$$$$$$$$$$$$$$$$$$$$$$$$$
$$$$$$$$$$$$$$$$$$$$$$$$ $$$$$$$$))

(8:sequence(4:cert(6:issuer(4:hash4:sha120:device manfact 0####)) (7:subject(4:hash4:sha120device 0############)) (3:tag(5:prime1:*(5:*-set23:get-renovated-as-device22:receive-content-phase1)))) (9:signature(4:hash4:sha120################) (4:hash4:sha120:device manfact 0####) 128:$$$$$$$$$$$$$$$$$$$$$$$$$$$$$$$$$$$$$$$$
$$$$$$$$$$$$$$$$$
$$$$$$$$$$$$$$$$$$$$$$$$$$$$$$$$$$$$$$$$$$$$
$$$$$$$$$$$$$$$$$$$$$$$$ $$$$))

(8:sequence (4: cert(6: issuer(4:hash4:sha120:root 0#############)) (7:subject(6:k-of-n1:21:2(4:hash4:sha120device manfact 0####) (4:hash4:sha120:d ren renovater Q###))) (8:delegate) (3:tag(5:prime(7:*range7:numeric2:1e3:366)(5:*-set12:give-content19:create-audit-record15:receive-content)))) (9:signature(4:hash:sha120#################) (4:hash 4:sha120:root 0#############)
128:$$$$$$$$$$$$$$$$$$$$$$$$$$$$$$$$$$$$$$$$
$$$$$$$$
$$$$$$$$$$$$$$$$$$$$$$$$$$$$$$$$$$$$$$$$$$$$
$$$$$$$$$$$$$$$$$$$$$$$$ $$$$$$$$$$$$$))

(8:sequence (4:cert (6:issuer (4:hash4:sha120:root 0#############)) (7:subject(4:hash4:sha120device manfact 0####)) (8:delegate) (3:tag(5:prime1:*(5:*:set23get-renovated-as-device22:receive-content-phase1)))) (9:signature(4:hash4:sha120#################) (4:hash4 : sha120:root 0#############)
128:$$$$$$$$$$$$$$$$$$$$$$$$$$$$$$$$$$$$$$$$
$$$$$$$$$$$$$$
$$$$$$$$$$$$$$$$$$$$$$$$$$$$$$$$$$$$$$$$$$$$
$$$$$$$$$$$$$$$$$$$$$$$$ $$$$$$$$$$$$$$))

(8:sequence (4:cert (6:issuer (4:hash4:sha120:device 0############)) (7:subject(4:hash4:sha120:mfg to root 0#######)) (8:delegate) (3:tag(5:prime1:*1:*))) (9:signature(4:hash4:s ha120:##################) (4:hash4:sha120:device 0############) 128:$$$$$$$$$$$$$$$$$$$$$$$$$$$$$$$$$$$$$$$$
$$$$$$$$$$
$$$$$$$$$$$$$$$$$$$$$$$$$$$$$$$$$$$$$$$$$$$$
$$$$$$$$$$$$$$$$$$$$$$$$ $$$$$$$$$$$$))

(8:sequence(4:cert(6:issuer(4:hash4:sha120:mfg to root 0#######)) (7:subject(4:hash4:sha120root 0#############)) (8:delegate) (3:tag(5:prime(7:*-range7:numeric2:le3:366) (5:*-set18:clear-audit-record(14:create-content1:*)21:create-content-phase119:create-audit-record12:give-content15:receive-content15:renovate-device (11:set-counter (7:-range7:numeric2:1e4:1001)))))) (9:signature(4:hash4:sha120:##################) (4:hash4:sha120:mfg to root 0#######)128:$$$$$$$$$$$$$$$$$$$$$$$$$$$$$$$$$$
$$$$$$$$$$$$$$$
$$$$$$$$$$$$$$$$$$$$$$$$$$$$$$$$$$$$$$$$$$$$
$$$$$$$$$$$$$$$$$$$$$$$$$ $$$$$$))

A.2 In Compact Format

4:sha120:device renovator 0##a4:sha120:device 0###########(5:prime(7:*-range7:numeric2:1e2:32) (5:*-set12:give-content19:create-audit-record15:receive-content)) 128:$$$$$$$$$$$$$$$$$$$$$$$$$$$$$$$$$$$$$$$
$$$$$$$$
$$$$$$$$$$$$$$$$$$$$$$$$$$$$$$$$$$$$$$$$$$
$$$$$$$$$$$$$$$$$$$$$$$$$ $$$$$$

4:sha120:d ren renovator 0###d4:sha120:device renovator Q##(5:prime(7:*:range7:numeric2:1e2:32) (5:*-set(5:*-set12:give-content19:create-audit-record15:receive-content15:renovate-device) (11:set-counter (7:*-range7:numeric2:1e2:32))))128:
$$$$$$$$$$$$$$$$$$$$$$$$$$$$$$$$$$$$$$$
$$$$$$$$$$$$$$$$$$$$$$$$$$$$$$$$$$$$$$$
$$$$$$$$$$$$$$$$$$$$$$$$$$
$$$$$$$$$$$$$$$$$$$$$$$$$

4:sha120:device manfact 0####k2 (4:sha120:device renovator 0##4:sha120:mfg bogus 0#########) (5:prine(7:*-range7:numeric2:1e3:366) (5:*-set19:create-audit-record12:give-content15:receive-cntent))
128:$$$$$$$$$$$$$$$$$$$$$$$$$$$$$$$$$$$$$$$$
$$$$$$$$$$$$$
$$$$$$$$$$$$$$$$$$$$$$$$$$$$$$$$$$$$$$$$$$
$$$$$$$$$$$$$$$$$$$$$$$$$ $$$$$$$

4:sha120:mfg bogus 0##########a:4:sha120:device 0############(5:prime(7:*-range7:numeric2:1e3:366) (5:*-set19:create-audit-record12:give-content15:receive-content))
128:$$$$$$$$$$$$$$$$$$$$$$$$$$$$$$$$$$$$$$$
$$$$$$$$$$$$$$$
$$$$$$$$$$$$$$$$$$$$$$$$$$$$$$$$$$$$$$$$$
$$$$$$$$$$$$$$$$$$$$$$$$$ $$$$$$$

4:sha120:device manufac 0####a4:sha120:device 0###########(5:prime1:*(5:*-set23:get-renovated-as-device22:receive-content-phase1))
128:$$$$$$$$$$$$$$$$$$$$$$$$$$$$$$$$$$$$$$$$
$$$$$$$$$$$$$$$$
$$$$$$$$$$$$$$$$$$$$$$$$$$$$$$$$$$$$$$$$$$
$$$$$$$$$$$$$$$$$$$$$$$$$ $$$$$$

4:sha12Q:root 0##############k2(4:sha120:device manfact 0####4:sha120:d ren renovator 0###) (5:prime(7:*-range7:numeric2:1e3:336) (5:*-set12::set12:give-content19:create-audit-record15:receive-content))
128:$$$$$$$$$$$$$$$$$$$$$$$$$$$$$$$$$$$$$$$$
$$$$$$$$$$$$$$$$
$$$$$$$$$$$$$$$$$$$$$$$$$$$$$$$$$$$$$$$$$$
$$$$$$$$$$$$$$$$$$$$$$$$$ $$$$$$$

4:sha120:root 0##############d4:sha120:device manfact 0####(5:prime1:* (5:*-set23:get-renovated-as-device22:receive-content-phase1))
128:$$$$$$$$$$$$$$$$$$$$$$$$$$$$$$$$$$$$$$$$
$$$$$$$$$$$$$$$
$$$$$$$$$$$$$$$$$$$$$$$$$$$$$$$$$$$$$$$$ $$$$$$

4:sha120:device 0##########d4:sha120:mfg to root 0#######(5:prime1:*)128:
$$$$$$$$$$$$$$$$$$$$$$$$$$$$$$$$$$$$$$$$$$$
$$$$$$$$$$$$$$$$$$$$$$$$$$$$$$$$$$$$$$$
$$$$$$$$$$$$$$$$$$$$$$$$$$
$$$$$$$$$$$$$$$$$$$$

4:sha120:mfg to root 0#####d4:sha120:root 0#############(5:prime(7:*-range7:numeric2:1e3:366) (5:*-set18:clear-audit-record (14:create-content1:*)21:create-content-phase119:create-audit-record12:give-content-15:receive-content15:renovate-device (11:set-counter (7:*-range7:numeric2:1e4:1001))))128:
$$$$$$$$$$$$$$$$$$$$$$$$$$$$$$$$$$$$$$
$$$$$$$$$$$$$$$$$$$$$$$$$$$$$$$$$$$$$$$$$$$
$$$$$$$$$$$$$$$$$$$$$$$$$
$$$$$$$$$$$$$$$$$$$$$$$$$

Appendix B: Improved Certificate Semantics and Syntax

As we found several limitations and incoherencies in the actual SPKI text, we have re-evaluated the choices for the best possible semantic constructions. We did that while trying to maintain the original philosophy behind the SPKI design.

B.1 Operation language

The operation language remains the same: free application-defined s-expressions. Given this, the fact that the first element of a s-expression should be an atom is reconsidered to be unnecessary.

B.2 Action language

In SPKI, the action language is intended to specify sets of operations (or more specifically s-expressions). We detected that this language was somehow out of balance, with more expressiveness in some fields than in others. Moreover, it was more biased to specify s-expressions sets than the operation sets themselves.

In that light, we tried to abstract the most useful constructions and discard those that we believe have been introduced in a more ad-hoc basis. We obtained the following constructions (here the tags follow the original SPKI convention, they will be modified further below):

Any:["*"]. It specifies the set that contains any operation.

Atom:["value"]. It specifies the set composed by exactly on atom of value "value.

Atom-range:["(*-range ("ge" Atom) ("le" Atom))]. Both "ge" and "le" components are optional but they order is fix and at least one of them should be present. "ge" and "le" denote the absolute limits of the integer interval denoted by the usual operation ">". Both atoms are interpreted as unsigned decimal integers (other types of atoms like "alphanumeric" names should be mapped into the integers at the application level if the atom-range operation is desired).

List:["(*-list Action+)"]. It specifies the set of all operations represented by lists in which each one of their members is in each one of the "action+" sets.

List-prefix:["(*-list-prefix Action+)"]. It specifies the set of all operations represented by lists of arbitrarily size for which their prefix is in the "action+".

Union:["(*-set Action+)"]. It specifies the set of the union of all the sets contained in each one of the elements.

To note that unlike the original pure-SPKI syntax, the semantics for the action language is not anymore linked to the fact that s-expressions are used to represent it. From now on, an arbitrarily s-expression is no longer accepted as an action, precluding possible miss-interactions with new operators to be defined in the future and legacy implementations.

The reader may think that this set of operands is somewhat limited, but it is more than sufficient for the trust applications discovered up to now. However, as mentioned above, we expect this language to be extended as the necessity for new operations appears.

B.3 Delegation Language

The biggest limitation that we encountered within the Delegation language is the lack of specific constructions that would allows us to control the ultimate authorized principals if a given assertion is enabling re-delegation.

In our previous design, we overcome that limitation by using the K-of-N construction together with the introduction of "superfluous" principals. E.g., "Manufacturer-bogus", above.

We studied the actual syntax for the K-of-N and finally generated a more powerful version that solves this problem in an elegant way. The new semantics is:

K-of-N k <delegees> <authorized>

Both <delegees> and <authorized> are lists of principals. If the <authorized> list is empty, the behavior is the same as the original K-of-N construction. If the <authorized> list is not empty, this construction is only valid if the operation requester is listed within it and K of the <delegees> authorized the operation as well. The graphical representation for this new construction is depicted in FIG. A-28.

B.4 Complete Certificate Syntax

We decided to further refine the compact form of the certificates and eliminate the original SPKI form for being both too close to humans (more processing required) and too redundant. This position can be further justified by the fact that the new semantics already produce non-SPKI compliant certificates. Furthermore, it is easy to demonstrate that application-level interoperability between completely SPKI-compliant implementation is jeopardized by the lack of standardization in the operation language semantics.

B.4.1 Syntactic Elements

There are only two classes of elements:

Atoms. The atoms are transparent byte-strings. The semantics of those atoms is context dependent and not explicitly expressed in the syntax.

Lists of Lists and Atoms. Lists can be either typed or untyped. Type semantics are context dependent.

This is their formal definition:

Length:=Two Byte little-endian two's complement positive integer.

The special value Zero is reserved as an escape sequence. After a Zero, a 32 bit unsigned little endian specifies the final length of the atom.

Atom:=Length Bytes+

As many Bytes as specified by length

Open-Bracket:=Two byte little-endian $FFFE_{hex}$

Close-Bracket:=Two byte little-endian $FFFF_{hex}$

Typed-Open-Bracket:=Two byte little endian in the range $8000_{hex}$ to $FFFD_{hex}$ List:=[Open-Bracket|Typed-Open-Bracket] [List|Atom] *Closed-Bracket B.4.2 Semantic Elements Here are the specific semantic constructions for the certificates. In the following definitions, "Open-Bracket" is represented by the character "(", "Closed-Bracket" by ")" and "Typed-Open-Bracket" by "($_{type}$". Finally, atoms are represented as quoted strings.

Certificate:=($_{c1}$ Assertion Signature[Assertion])

Signature algorithm should be the same as the Issuer public key algorithm. (Issuer is defined below)

Assertion:=($_{a1}$ Issuer Subject Action)

Issuer:=($_i$ Hash)

Hash is the hash of a public key in the form:

($_{px}$ . . . ); "($_{p1}$" stands for DSA with fixed common parameters.

Subject:=[($_{sa}$ Hash)|($_{sd}$ Hash)|($_{sk-of-n}$ "N" (Hash*) (Hash*))]

"N" is a big-endian binary integer.

Action:=[Action-*|Atom|Range-definition|Action-list|Action-list-prefix|Action-union]

Signature:=($_{sx}$ Bytes)

"($_{s1}$" stands for DSA.

Hash:=($_{hx}$ Bytes)

"($_{h1}$" stands for SHA-1.

Action-*:=(*)

Range-definition:=($_r$ Range-ge? Range-le?)

Action-list:=($_l$ Action*)

Action-list-prefix:=($_{lp}$ Action*)

Action-union:=($_u$ Action*)

Range-ge:=($_{ge}$ "N")

"N" is a big-endian binary integer.

Range-le:=($_{le}$ "N")

"N" is a big-endian binary integer.

B.5 New Certificate Definitions for Security Infrastructure

Only the Device manufacturers are changed. The "mfg-bogus" principal is eliminated as now is completely redundant. This may seem a little improvement, but it eliminates one mandatory certificate for the devices and one principal.

B.5.1 Device Manufacturers (Alternate Embodiment)

The main roles of the Device manufactures are to deploy devices and act as a trusted link for them. In order to full-fill these roles they control several principals:

Device Manufacturer principal:Root delegates to it the operations that will be performed by the devices.

To-Root principal(s):Devices trust it unconditionally and forever. It is used to designate which Root the devices should trust and for how long. In order to minimize the damage produced by the compromise of this principal, a given Device Manufacturer can create and control as many To Root principals as it may desire. However, to minimize the overhead, a given device only trusts one of the To Root principals.

The Device Manufacturer delegates to the Devices through a given Renovator D the following operations (by means of K-of N (K=1) certificate):

receive-content:Evaluated by the Content Providers and other Devices.

move-content:Evaluated by other Devices.

create-audit-record:Evaluated by the Clearinghouses.

Finally, the Device Manufacturer principal directly delegates to the Devices the get-renovated-as-device operation in the form of terminator certificates.

B.5.2 Creating a Device (Alternate Embodiment)

When a Device manufacture creates a Device (and the corresponding principal device 0 is created) in its secure premises it assigns it to one of the available Renovator Ds and finally it exchanges with it the following certificates:

($_{a1}$($_i$ device 0) ($_{sd}$ mfg to root 0) ($_1$ prime" (*)(*))). This certificate will be stored in the Device's "To root" certificate list.

($_{a1}$ ($_i$ device manufact 0) ($_{sk-of-n}$ "1" (d renovator 0) (device 0)) ($_1$ "prime" ($_r$ ($_{le}$ 365)) ($_u$ create-audit-record give-content receive-content)))

($_{a1}$($_i$ device manufact 0) ($_{sa}$ device 0) ($_1$ "prime"*get-renovated-as-device))

These certificates will be stored in the Device's "From root" certificate list.

B.6 Alternate General Layout for the Certificates

FIG. A-29 shows an alternate certificate layout for phase 2. Note that the certificates issued by the Root over the Content Providers and the Clearinghouses are modified as well. However, this modification is just a minor improvement, it does not eliminate any superfluous principal.

Appendix C: Improved Syntax for Security Infrastructure Operations

In one embodiment, we propose to use the syntax of the operation language with the same reduced identifiers proposed above, which is repeated slightly modified here for the reader's convenience.

C.1 Operations in the Phase 2 Environment
A: Clear audit record
B: Create audit record
C: Create content
E: Get renovated as clearinghouse
F: Get renovated as device
G: Get renovated as device renovator
H: Get renovated as content provider renovator
I: Get renovated as content provider
J: Give content
K: Receive content
M: Renovate clearinghouse
N: Renovate device
O: Renovate renovator
P: Renovate content provider
Q: Create security audit record
R: Clear security audit record
S: Get renovated as a security clearinghouse
T: Renovate security clearinghouse
Z: set-counter All these operations are represented within the assertions as atoms of the action language except for:

C "Create content": Which is an s-expression of the form:
  ($_{ip}$ "C"<content-provider-id>)
    The <content-provider-id> denotes which is the id that a given content provider is allowed to use. This id will be used by the Devices to select to which branch of the rights-tree a given piece of content is related. This id should be expressed as an atom of the action language (a free-string). The Root is in charge of making sure that the id cannot be shared between different Content Providers.

Z "Set counter": Which is an s-expression of the form:
  ($_l$ "Z" ($_r$ ($_{le}$ <counter>)))
    The <counter> integer value denotes which is the maximum counter value that the authorized entity is allowed to set on the authorizing entity.

With the introduction of the counter evaluation condition, operation-sets are expressed in the certificates in the form:
($_l$ RS <max-counter> <action>)
  Where <max-counter> can be:
  ($_r$ ($_{le}$ <counter>)): The certificate holds valid until the counter reaches the value expressed by <counter>
  (*): The certificate holds valid forever
    and <action> is any expression in the action language that contains the aforementioned atoms and expressions.

In order to be coherent with the certificate template, calls to the trust engine should use requests of the form:
("RS" <counter-value> <operation>)

Where <counter-value> is the actual secure counter value of the authorizer and <operation> can be any operation from the list introduced in this section.

Appendix D: List-Type Encodings

D.1 Top Level Objects

Top level objects have to share a $2^{15}$ typed list id space. We decided to split that space in $2^7$ top-level classes and $2^8$ sub-classes for every top-level class. This facilitates semantic parsing, as the MSB always denotes the top-level class and the LSB denotes the sub-class. In that scheme, one of the top-level classes is already reserved for untyped lists and closed-bracket.

D.1.1 Public Key:
  Top level class: $FExx_{Hex}$
  DSA with fixed common parameters "($_{p1}$"
    $FE00_{Hex}$
D.1.2 Hash
  Top level class: $FDxx_{Hex}$
  SHA1 "($_{h1}$"
    $FD00_{Hex}$
D.1.3 Signature
  Top level class: $FCxx_{Hex}$
  DSA "($_{s1}$"
    $FC00_{Hex}$
D.1.4 Certificate
  Top level class: $FBxx_{Hex}$
  Version 1 "($_{c1}$"
    $FB00_{Hex}$
D.1.5 Assertion
  Top level class: $FAxx_{Hex}$
  Version 1 "($_{a1}$"
    $FA00_{Hex}$ D.2 Context-Dependent Sub-Objects The encoding of these objects is not subject to the constrains imposed by the global name space. The only exception to this rule is the class represented by the un-typed open bracket and the closed bracket.

D.2.1 Assertion Subspace
  Issuer "($_i$"
    $8000_{hex}$
  Subject authorize "($_{sa}$"
    $8001_{hex}$
  Subject delegate and authorize "($_{sd}$"
    $8002_{hex}$
  Subject K of N "($_{s\text{-}kof\text{-}n}$"
    $8003_{hex}$
  Action-* "$_*$"
    $8004_{hex}$
  Range-definition "($_r$"
    $8005_{hex}$
  Action-list "($_l$"
    $8006_{hex}$
  Action-list-prefix "($_{lp}$"
    $8007_{hex}$
  Action-union
    $8008_{hex}$
D.2.2 Range Subspace
  Range-ge "($_{ge}$"
    $8000_{hex}$
  Range-le "($_{le}$"
    $8001_{hex}$ Although the foregoing invention has been described in some detail for purposes of clarity, it will be apparent that certain changes and modifications may be made without departing from the principles of the present invention. It should be noted that there are many alternative ways of implementing both the processes and apparatuses of the present invention. Accordingly, the present embodiments are to be considered as illustrative and not restrictive, and the invention is not to be limited to the specific details given herein.

The invention claimed is:

1. A method of distributing from a sender's site to a receiver's site a first original electronic work, the first original electronic work having a securely and persistently associated first electronic attribute indicating that it is an original, the method comprising the steps of:
   (a) establishing communication between the sender's site and the receiver's site;
   (b) exchanging authentication information between the sender's site and the receiver's site;
   (c) creating, at the sender's site, a first copy of the first original electronic work and securely and persistently associating with the first copy a second electronic attribute indicating that it is a copy;
   (d) transmitting the first copy from the sender's site to the receiver's site;
   (e) sending a first acknowledgement from the receiver's site to the sender's site, the first acknowledgement indicating the receipt of the first copy by the receiver's site;
   (f) receiving, at the sender's site, the first acknowledgement, and, responsive thereto, changing the first electronic attribute to indicate that it is a copy, thereby creating a second copy of the first original electronic work;
   (g) sending an authorization from the sender's site to the receiver's site authorizing the receiver's site to change the second electronic attribute to indicate that it is an original; and
   (h) receiving the authorization at the receiver's site, and, responsive thereto, securely changing the second electronic attribute to indicate that it is an original, thereby creating a second original electronic work, wherein the first and second copies are prevented from being successfully passed off as original electronic works and the second electronic attribute associated with the first copy of the electronic work is configured to be authenticated independently by the receiver's site after receipt of the first copy by the receiver's site.

2. A method as in claim 1, further comprising:
   (i) sending a second acknowledgement from the receiver's site to the sender's site, the second acknowledgement indicating that the receiver successfully changed the second electronic attribute associated with the first copy to indicate that it is an original; and
   (j) receiving the second acknowledgement at the sender's site.

3. The method of claim 1, wherein the sender's site and the receiver's site each have protected computing environments, the protected computing environments being operable to substantially impede users of the sender's site or the receiver's site from successfully tampering with the first and second electronic attributes.

4. The method of claim 3, wherein the step of exchanging authentication information between the receiver's site and the sender's site includes exchanging information between the receiver's site and the sender's site regarding the presence or nature of the protected computing environments at the receiver's site and the sender's site.

5. The method of claim 1, further comprising:
   sending a second acknowledgement from the receiver's site to the sender's site, the second acknowledgement indicating that the receiver's site successfully changed the second electronic attribute associated with the first copy to indicate that it is an original;
   failing to receive the second acknowledgement at the senders site within a predetermined period of time following the sending of the authorization; and
   notifying a system administrator of said failure to receive the second acknowledgement.

6. The method of claim 1, wherein the receiver's site is operable to notify a system administrator if the receivers site fails to receive the authorization within a predetermined period of time following the sending of the first acknowledgement.

7. The method of claim 1, wherein the original electronic work is selected from the group consisting of:ebooks, music, documents, bearer bonds, currency, movies, and software.

8. The method of claim 1, wherein at most one electronic work with an electronic attribute indicating that it is an original exists at the sender's site and the receiver's site during the performance of steps (a) through (h).

9. A method of receiving a first copy of a first original electronic work at a receiver's site from a sender's site, the first copy having a first electronic attribute securely and persistently associated with it indicating, it is an copy, the first original electronic work being located at the sender's site, the method comprising the steps of:
   (a) establishing communication, by the receiver's site, with a sender's site;
   (b) exchanging authentication information, by the receiver's site, with the sender's site;
   (c) receiving, at the receiver's site, the first copy from the sender's site;
   (d) sending, by the receiver's site, a first acknowledgement to the sender's site, the first acknowledgement indicating the receipt of the first copy and directing the sender's site to change a second electronic attribute securely and persistently associated with the first original electronic work to indicate that is a copy, thereby creating a second copy of the first original electronic work;
   (e) receiving, at the receiver's site, authorization from the sender's site authorizing that the first electronic attribute associated with the first copy be changed to indicate that it is an original; and
   (f) securely changing, by the receiver's site, the first electronic attribute associated with the first copy to indicate that it is an original, thereby creating a second original electronic work, wherein the first and second copies are prevented from being successfully passed off as original electronic works and the first electronic attribute associated with the first copy is configured to be authenticated independently by the receiver's site after receipt of the first copy by the receiver's site.

10. A method as in claim 9, further comprising:
    (g) sending, by the receiver's site, a second acknowledgement to the receiver's site, the second acknowledgement indicating that the first electronic attribute associated with the first copy was changed to indicate that it is an original.

11. The method of claim 9, wherein the receiver's site has a protected computing environment, the protected computing environment being operable to substantially impede users of the receiver's site from successfully tampering with the first electronic attribute associated with the first copy.

12. The method of claim 11, wherein the step of exchanging authentication information includes exchanging information regarding the presence or nature of a protected computing environment at the sender's site and the protected computing environment at the receiver's site.

13. The method of claim 9, further comprising:
sending, by the receiver's site, a second acknowledgement to the sender's site, the second acknowledgement indicating that the first electronic attribute associated with the first copy was changed to indicate that it is an original.

14. The method of claim 9, wherein the receiver's site is operable to notify a system administrator if the receiver's site fails to receive the authorization within a predetermined period of time following the sending of the first acknowledgement.

15. The method of claim 9, wherein the original electronic work is selected from the group consisting of:ebooks, music, documents, bearer bonds, currency, movies, and software.

16. The method of claim 9, wherein at most one electronic work with an electronic attribute indicating that it is an original exists at the sender's site and the receiver's site during the performance of steps (a) through (f).

17. A method of sending an original electronic work from a sender's site to a receiver's site, the method comprising the steps of:
(a) establishing communication, by a sender's site, with a receiver's site;
(b) exchanging authentication information, by the sender's site, with the receiver's site;
(c) creating, at the sender's site, a first copy of a first original electronic work, and securely and persistently associating a first electronic attribute with the first copy indicating that it is a copy;
(d) sending the first copy, by the sender's site, to the receiver's site;
(e) receiving, at the sender's site, a first acknowledgement from the receiver's site, the first acknowledgement indicating the receipt of the first copy by the receiver's site, and, responsive thereto, changing a second electronic attribute associated with the first original electronic work to indicate that it is a copy, thereby creating a second copy of the first original electronic work;
(f) sending, by the sender's site, an authorization to the receiver's site authorizing and directing the receiver's site to securely change the first electronic attribute associated with the first copy to indicate that it is an original, thereby creating a second original electronic work, wherein the first and second copies are prevented from being successfully passed off as original electronic works and the first electronic attribute associated with the first copy is configured to be authenticated independently by the receiver's site after receipt of the first copy by the receiver's site.

18. A method as in claim 17, further comprising:
(g) receiving a second acknowledgement, at the sender's site, from the receiver's site, the second acknowledgement indicating that the receiver's site successfully changed the first electronic attribute associated with the first copy to indicate that it is an original.

19. The method of claim 17, wherein the sender's site has a protected computing environment, the protected computing environment being operable to substantially impede users of the sender's site from successfully tampering with the first and second electronic attributes.

20. The method of claim 19, wherein the step of exchanging authentication information includes exchanging information regarding the presence or nature of the protected computing environment at the sender's site and a protected computing environment at the receiver's site.

21. The method of claim 17, further comprising:
receiving, at the sender's site, a second acknowledgement from the receiver's site, the second acknowledgement indicating that the receiver's site successfully changed the first electronic attribute associated with the first copy to indicate that it is an original; and
notifying a system administrator if the second acknowledgement is not received from the receiver's site within a predetermined period of time.

22. The method of claim 17, wherein the original electronic work is selected from the group consisting of:ebooks, music, documents, bearer bonds, currency, movies, and software.

23. The method of claim 17, wherein at most one electronic work with an electronic attribute indicating that it is an original exists at the sender's site and the receiver's site during the performance of steps (a) through (f).

* * * * *

UNITED STATES PATENT AND TRADEMARK OFFICE
CERTIFICATE OF CORRECTION

PATENT NO.       : 7,580,988 B2                                    Page 1 of 1
APPLICATION NO. : 10/118215
DATED            : August 25, 2009
INVENTOR(S)      : James M. Rudd It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 864 days.

Signed and Sealed this

Fourteenth Day of September, 2010

David J. Kappos
*Director of the United States Patent and Trademark Office*